United States Patent
Schaefer et al.

(10) Patent No.: US 11,249,309 B2
(45) Date of Patent: Feb. 15, 2022

(54) AUGMENTED REALITY DISPLAY HAVING MULTI-ELEMENT ADAPTIVE LENS FOR CHANGING DEPTH PLANES

(71) Applicant: Magic Leap, Inc., Plantation, FL (US)

(72) Inventors: Jason Schaefer, Coral Springs, FL (US); Hui-Chuan Cheng, Cooper City, FL (US); David Manly, Fort Lauderdale, FL (US); Jahja I. Trisnadi, Cupertino, CA (US); Clinton Carlisle, Parkland, FL (US); Michael Anthony Klug, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 626 days.

(21) Appl. No.: 16/006,080

(22) Filed: Jun. 12, 2018

(65) Prior Publication Data
US 2018/0356639 A1 Dec. 13, 2018

Related U.S. Application Data

(60) Provisional application No. 62/518,539, filed on Jun. 12, 2017, provisional application No. 62/536,872, filed on Jul. 25, 2017.

(51) Int. Cl.
*G02F 1/03* (2006.01)
*G02B 27/01* (2006.01)
(Continued)

(52) U.S. Cl.
CPC ....... *G02B 27/0172* (2013.01); *G02F 1/0136* (2013.01); *G02F 1/1326* (2013.01);
(Continued)

(58) Field of Classification Search
CPC .......... G02B 27/0172; G02B 2027/014; G02B 2027/0127; G02B 27/017; G02F 1/29;
(Continued)

(56) References Cited

U.S. PATENT DOCUMENTS 6,850,221 B1 2/2005 Tickle
D514,570 S 2/2006 Ohta
(Continued)

FOREIGN PATENT DOCUMENTS

EP 2 649 485 7/2020
KR 10-2016-0091402 8/2016
(Continued)

OTHER PUBLICATIONS

Tabiryan, et al., "Superlens in the skies: liquid-crystal-polymer technology for telescopes," SPIE, 2016, 10.1117/2.1201601.00631.
(Continued)

*Primary Examiner* — James C. Jones
(74) *Attorney, Agent, or Firm* — Fish & Richardson P.C.

(57) ABSTRACT

In some embodiments, an augmented reality system includes at least one waveguide that is configured to receive and redirect light toward a user, and is further configured to allow ambient light from an environment of the user to pass therethrough toward the user. The augmented reality system also includes a first adaptive lens assembly positioned between the at least one waveguide and the environment, a second adaptive lens assembly positioned between the at least one waveguide and the user, and at least one processor operatively coupled to the first and second adaptive lens assemblies. Each lens assembly of the augmented reality system is selectively switchable between at least two different states in which the respective lens assembly is configured to impart at least two different optical powers to light passing therethrough, respectively. The at least one processor is configured to cause the first and second adaptive lens assemblies to synchronously switch between different states in a manner such that the first and second adaptive lens assemblies impart a substantially constant net optical power to ambient light from the environment passing therethrough.

16 Claims, 36 Drawing Sheets

(51) Int. Cl.
*G02F 1/29* (2006.01)
*G02F 1/01* (2006.01)
*G02F 1/13* (2006.01)
*G02F 1/1337* (2006.01)

(52) U.S. Cl.
CPC .......... *G02F 1/29* (2013.01); *G02F 1/133757* (2021.01); *G02F 1/294* (2021.01)

(58) Field of Classification Search
CPC ...... G02F 1/0136; G02F 1/1326; G02F 1/294; G02F 1/133757
USPC ......................................................... 359/259
See application file for complete search history.

(56) References Cited

U.S. PATENT DOCUMENTS

| | | |
|---|---|---|
| 9,081,426 B2 | 7/2015 | Armstrong |
| 9,215,293 B2 | 12/2015 | Miller |
| D752,529 S | 3/2016 | Loretan et al. |
| 9,348,143 B2 | 5/2016 | Gao et al. |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch et al. |
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0248046 A1 | 9/2015 | Schowengerdt |
| 2015/0268415 A1 | 9/2015 | Schowengerdt et al. |
| 2015/0301356 A1 | 10/2015 | Tabirian et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0209560 A1 | 7/2016 | Tabirian et al. |
| 2017/0010469 A1* | 1/2017 | Samec ................. A61B 3/0008 |

FOREIGN PATENT DOCUMENTS

| | | |
|---|---|---|
| WO | WO 2012/078410 | 6/2012 |
| WO | WO 2015/081313 | 6/2015 |
| WO | WO 2015/231784 | 12/2018 |

OTHER PUBLICATIONS

Invitation to Pay Additional Fees, re PCT Application No. PCT/US18/37039, dated Aug. 27, 2018.
International Search Report and Written Opinion, re PCT Application No. PCT/US18/37039, dated Oct. 30, 2018.
International Preliminary Report on Patentability, re PCT Application No. PCT/US18/37039, dated Dec. 17, 2019.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapei Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Chen, et al., "Electrically adjustable location of a projected image in augmented reality via a liquid-crystal lens," Optics Express, vol. 23, No. 22, Oct. 19, 2015.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

AUGMENTED REALITY DISPLAY HAVING MULTI-ELEMENT ADAPTIVE LENS FOR CHANGING DEPTH PLANES

CROSS-REFERENCE TO RELATED APPLICATIONS

This application claims the benefit of priority to U.S. Provisional Patent Application No. 62/518,539, filed Jun. 12, 2017, entitled "AUGMENTED REALITY DISPLAY HAVING MULTI-ELEMENT ADAPTIVE LENS FOR CHANGING DEPTH PLANES," and to U.S. Provisional Patent Application No. 62/536,872, filed Jul. 25, 2017, entitled "AUGMENTED REALITY DISPLAY HAVING MULTI-ELEMENT ADAPTIVE LENS FOR CHANGING DEPTH PLANES." The content of each is hereby incorporated by reference herein in its entirety.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

In one aspect, an augmented reality system may include at least one waveguide that is configured to receive and redirect light toward a user, and is further configured to allow ambient light from an environment of the user to pass therethrough toward the user. The augmented reality system may also include a first adaptive lens assembly positioned between the at least one waveguide and the environment, a second adaptive lens assembly positioned between the at least one waveguide and the user, and at least one processor operatively coupled to the first and second adaptive lens assemblies. The first adaptive lens assembly may be selectively switchable between a state in which the first adaptive lens assembly is configured to impart a first optical power to light passing therethrough, and at least one other state in which the first adaptive lens assembly is configured to impart optical power different from the first optical power to light passing therethrough. The second adaptive lens assembly may be selectively switchable between a state in which the second adaptive lens assembly is configured to impart a second optical power different from the first optical power to light passing therethrough, and at least one other state in which the second adaptive lens assembly is configured to impart optical power different from the second optical power to light passing therethrough. The at least one processor may be configured to cause the first and second adaptive lens assemblies to synchronously switch between different states in a manner such that the first and second adaptive lens assemblies impart a substantially constant net optical power to ambient light from the environment passing therethrough.

In some embodiments, the augmented reality system may further include a micro-display. In such embodiments, the at least one waveguide may be configured to receive and redirect light from the micro-display toward the user.

In some examples, the first optical power and the second optical power may be opposite in sign. In at least some of these examples, the first optical power and the second optical power may be substantially equal in magnitude.

In some embodiments, each of the first and second adaptive lens assemblies may be configured to receive one or more control signals as input and, in response thereto, switch from one state to another state within a period of time thereafter of less than 400 milliseconds. For example, the period of time within which each of the first and second adaptive lens assemblies is configured to switch from one state to another state may be between 200 and 400 milliseconds, between 100 and 200 milliseconds, or less than 100 milliseconds.

In some examples, the at least one waveguide may include an output area through which it is configured to redirect light toward the user and allow ambient light from the environment of the user to pass therethrough toward the user. The output area of the at least one waveguide may be positioned between a portion of the first adaptive lens assembly within which a clear aperture of the first adaptive lens assembly is formed and a portion of the second adaptive lens assembly within which a clear aperture of the second adaptive lens assembly is formed. In at least some of these examples, the portions of the first and second adaptive lens assemblies within which clear apertures of the first and second adaptive lens assemblies are formed, respectively, may each be larger in size than the output area of the at least one waveguide.

In some embodiments, the first and second adaptive lens assemblies may each include at least one optical element that is single-pole switchable between two states. In at least some of these embodiments, the at least one optical element may be single-pole switchable between a first state in which the at least one optical element is configured to impart a first polarization state to light passing therethrough toward the user, and a second state in which the at least one optical element is configured to impart a second polarization state different from the first polarization state to light passing therethrough. Furthermore, in one or more of such embodiments, the first and second adaptive lens assemblies may each include at least one waveplate lens positioned between the at least one optical element and the user. The at least one waveplate lens may be configured to impart one optical power to light of the first polarization state passing therethrough and another, different optical power to light of the second polarization state passing therethrough.

In at least some of these embodiments, the first and second adaptive lens assemblies may each include a quantity of optical elements that are single-pole switchable between two states. The quantity of optical elements included in each of the first and second adaptive lens assemblies may be equal to a first value. The first and second adaptive lens assemblies may each be selectively switchable between states from among a quantity of different states. The quantity of different states may be equal to a second value that exponentially depends upon the first value. For example, the second value may be equal to an exponentiation of two with an exponent, where the exponent is equal to the first value. In one or more of such embodiments, the at least one waveguide may be configured to receive and redirect light representing virtual content toward the user, and the at least one processor may be configured to cause the first and second adaptive lens assemblies to synchronously switch between different states from among the quantity of different states to adjust a distance away from the user at which virtual content represented by light passing therethrough is to be perceived by the user. In addition, the distance away from the user at which virtual content represented by light passing therethrough is to be perceived by the user may, in one or more of the embodiments described immediately above, selectively switchable to any of a quantity of different distances. The quantity of different distances may be equal to the second value.

In another aspect, a display device may include a waveguide assembly, which may include a waveguide configured to output outcoupled light along an output surface of the waveguide. The display device may additionally include a first adaptive lens assembly having a major surface facing the output surface. The first adaptive lens assembly may include a first waveplate lens, a second waveplate lens, and a first switchable waveplate interposed between the first waveplate lens and the second waveplate lens. The first switchable waveplate may be selectively switchable between a first state configured to pass the outcoupled light without altering a polarization state of the outcoupled light, and a second state configured to alter the polarization state of the outcoupled light passing therethrough. The display device may further include a second adaptive lens assembly having a second major surface facing an external scene opposite the output surface. The second adaptive lens assembly may include a third waveplate lens, a fourth waveplate lens, and a second switchable waveplate interposed between the third waveplate lens and the fourth waveplate lens. The second switchable waveplate may be selectively switchable between a third state configured to pass light from the external scene without altering a polarization state of the light from the external scene, and a fourth state configured to alter the polarization state of the light from the external scene passing therethrough.

In some embodiments, each of the first and second waveplate lenses may be configured to alter a polarization state of the outcoupled light passing therethrough, and to converge or diverge the outcoupled light. In at least some of these embodiments, each of the third and fourth waveplate lenses may be configured to alter a polarization state of the light from the external scene passing therethrough, and to converge or diverge the outcoupled light.

In another aspect, a display device may include a pair of adaptive lens assemblies in an optical path. Each of the adaptive lens assemblies may further include a corresponding switchable waveplate configured to switch between first and second states to selectively alter a polarization state of light passing therethrough. The adaptive lens assemblies may have optical powers with opposite signs.

In some embodiments, each of the adaptive lens assemblies may have a respective optical power that is adjustable based upon a state of the switchable waveplate of the adaptive lens assembly. In at least some of these embodiments, the display device may further include a controller configured such that, when a first optical power of a first one of the pair of adaptive lens assemblies is a first value, a second optical power of a second one of the pair of adaptive lens assemblies is correspondingly adjusted to a second value. In one or more of such embodiments, a net optical power from a combination of the first one of the pair of adaptive lens assemblies with the second one of the pair of adaptive lens assemblies may remain at about a constant value. For instance, the constant value may be about 0 $m^{-1}$.

In some examples, the display device may further include a waveguide assembly interposed between the pair of adaptive lens assemblies. In these examples, the waveguide assembly may include a waveguide configured to outcouple the light propagating therein into one of the adaptive lens assemblies. In at least some of these examples, each of the adaptive lens assemblies may include a plurality of waveplate lenses and a plurality switchable waveplates. The waveplate lenses and the switchable waveplates may be alternatingly stacked. In addition, different ones of the switchable waveplates and waveplate lenses may have different optical powers.

In some embodiments, each of the adaptive lens assemblies may include first and second waveplate lenses interposed between the corresponding switchable waveplate of the lens assembly. In these embodiments, each of the waveplate lenses may be configured to alter a polarization state of light passing therethrough.

In yet another aspect, an adaptive lens assembly may include one or more waveplate lenses and one or more switchable waveplates aligned in an optical path. Each of the one or more waveplate lenses may be configured to alter a polarization state of light passing therethrough, to provide first optical power for light having a first polarization, and to provide a second optical power for light having a second polarization. Each of the one or more switchable waveplates may be selectively switchable between a first state configured to pass the light therethrough without altering a polarization state of the light, and a second state configured to alter the polarization state of the light passing therethrough.

In some embodiments, one or both of the waveplate lenses and the switchable waveplates may include liquid crystals. Additionally or alternatively, each of the one or more switchable waveplates in the second state may, in some embodiments, be a half waveplate configured to invert a handedness of circularly polarized light.

In some examples, each of the switchable waveplates is interposed between a pair of the one or more waveplate lenses. In at least some of these embodiments, the adaptive lens assembly may include a plurality of the waveplate lenses and a plurality of the switchable waveplates. The waveplate lenses and the switchable waveplate may be alternatingly stacked.

In yet another aspect, a wearable augmented reality head-mountable display system may include a light modulating system configured to output light to form an image. The system may also include a head mountable frame. One or more waveguides may be attached to the frame and configured to receive the light from the light modulating system. The system may additionally include a pair of adaptive lens assemblies, where the one or more waveguides are disposed between the adaptive lens assemblies. Each of the adaptive lens assemblies may in turn include one or more waveplate lenses configured to provide a first optical power for light having a first polarization, and to provide a second optical power for light having a second polarization. Each of the adaptive lens assemblies may additionally include one or more switchable waveplates in an optical path, where each of the one or more switchable waveplates is configured to selectively alter a polarization state of light passing therethrough. The adaptive lens assemblies may additionally be configured to provide a respective optical power that is adjustable upon application of a respective electrical signal.

In yet another aspect, an augmented reality system may include a first adaptive lens assembly, as well as a second adaptive lens assembly positioned between the first adaptive lens assembly and a user. Each of the adaptive lens assemblies may include at least one switchable optical element that is selectively switchable between at least (i) a first state in which the at least one switchable optical element is configured to impart a first polarization state to light passing therethrough toward the user, and (i) a second state in which the at least one switchable optical element is configured to impart a second polarization state to light passing therethrough toward the user. Each of the adaptive lens assemblies may further include at least one waveplate lens that is positioned between the at least one switchable optical element and the user. The at least one waveplate lens may be configured to impart a first respective optical power to light of the first polarization state passing therethrough toward the user, and impart a second respective optical power to light of the second polarization state passing therethrough toward the user. Each of the adaptive lens assemblies may further include at least one waveguide positioned between the first adaptive lens assembly and the second adaptive lens assembly. The at least one waveguide may be configured to direct light representing virtual content through the second lens assembly and toward the user.

Figure 1:
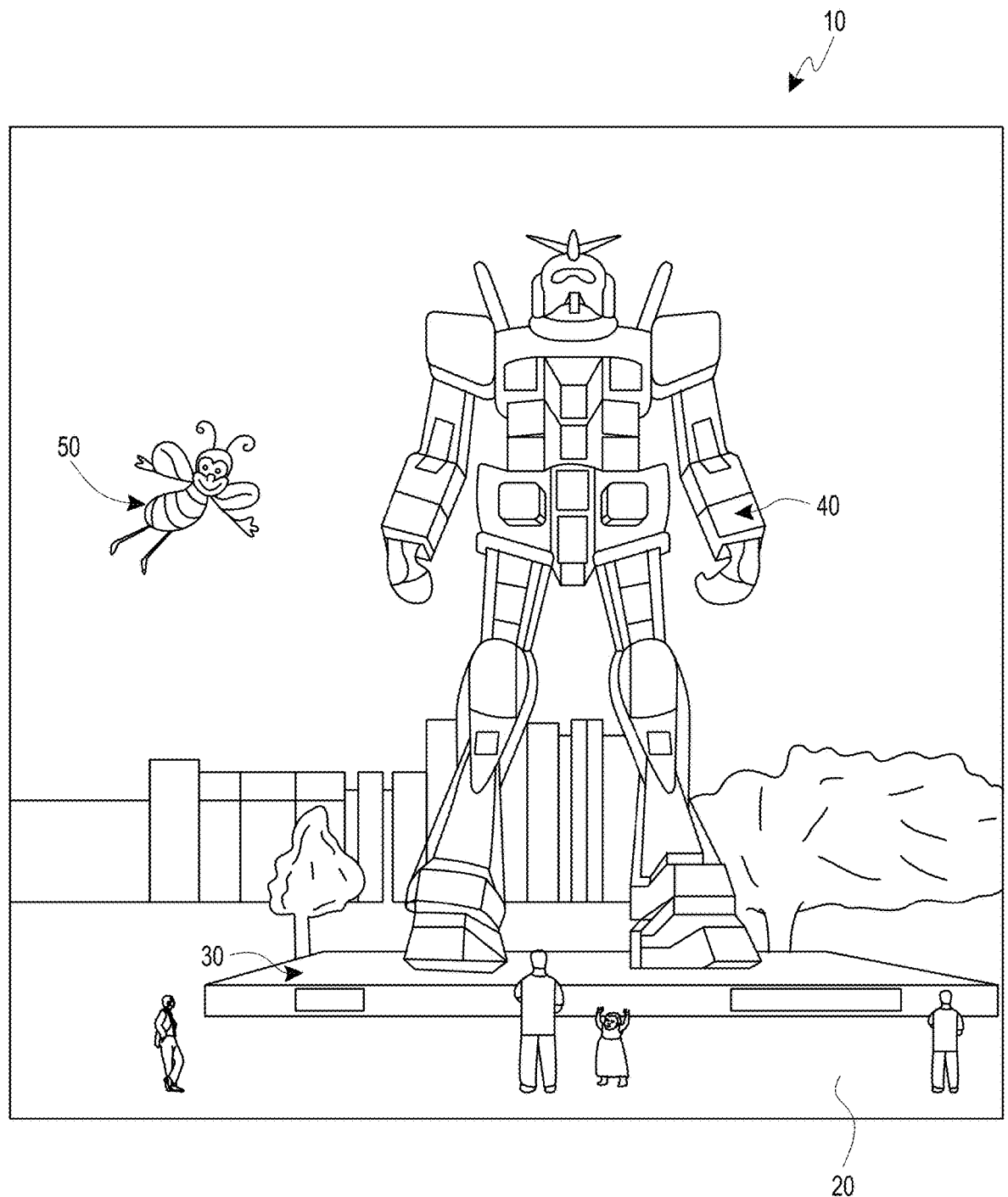
FIG. 1 illustrates a user's view of augmented reality (AR) through an AR device.

Throughout the drawings, reference numbers may be re-used to indicate correspondence between referenced elements. The drawings are provided to illustrate example embodiments described herein and are not intended to limit the scope of the disclosure.

DETAILED DESCRIPTION

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some AR systems, a plurality of waveguides may be configured to form virtual images at a plurality of virtual depth planes (also referred to simply a "depth planes" herein). Different waveguides of the plurality of waveguides may have different optical powers and may be formed at different distances from the user's eye. The display systems may also include a plurality lenses that provide or additionally provide optical powers. The optical powers of the waveguides and/or the lenses may provide images at different virtual depth planes. Undesirably, each of the waveguides and lenses may increase the overall thickness, weight and cost of the display.

Advantageously, in various embodiments described herein, an adaptive lens assembly may be utilized to provide variable optical power to, e.g., modify the wavefront divergence of light propagating through the lens assembly to provide virtual depth planes at different perceived distances from a user. The adaptive lens assembly may include a pair of waveplate lenses having a switchable waveplate disposed between them. Each of the first and second waveplate lenses may be configured to alter a polarization state of the light passing therethrough, and the switchable waveplate may be switchable between a plurality of states, e.g., a first state that allows light to pass without changing a polarization of the light and a second state that alters the polarization of the light (e.g., by changing the handedness of the polarization). In some embodiments, one or both of the waveplate lenses may be switchable between these first and second states and the intervening switchable waveplate noted above may be omitted.

It will be appreciated that the adaptive lens assembly may comprise a stack of a plurality of waveplate lenses and a plurality of switchable waveplates. For example, the adaptive lens assembly may comprise multiple subassemblies comprising a pair of waveplate lenses with an intervening switchable waveplate. In some embodiments, the adaptive lens assembly may include alternating waveplate lenses and switchable waveplates. Advantageously, such alternating arrangement allows a reduction in thickness and weight by having neighboring switchable waveplates share a common waveplate lens. In some embodiments, by switching the states of the various combinations of the switchable plates in the stack, more than two discrete levels of optical power may be provided.

In some embodiments, the adaptive lens assembly forms a display device with a waveguide assembly to form images at different virtual depth planes. In various embodiments, the display device comprises a pair of adaptive lens assemblies interposed by a waveguide assembly. The waveguide assembly includes a waveguide configured to propagate light (e.g., visible light) therein (e.g., via total internal reflection) and to outcouple the light. For example, the light may be outcoupled along an optical axis direction normal to a major surface of the waveguide. One of the pair of adaptive lens assemblies may be formed on a first side of the waveguide assembly and may be configured to provide variable optical power to modify the wavefront of light passing through the adaptive lens assembly to form images at each of a plurality of virtual depth planes. For example, the adaptive lens assemblies may converge or diverge outcoupled light received from the waveguide assembly. To compensate for modifications of real world views due to the convergence or divergence of ambient light propagating through the adaptive lens assembly and/or the waveguide assembly, the other of the pair of adaptive lens assemblies is additionally provided on a second side of the waveguide assembly opposite the first side. When the switchable waveplates of each adaptive lens assembly assume a corresponding state, the adaptive lens assemblies may have optical powers with opposite signs, such that the other of the adaptive lens assemblies correct for distortions caused by the adaptive lens assembly on the first side of the waveguide assembly.

Advantageously, relative to a continuously variable adaptive lens having continuously variable optical elements, utilizing a switchable waveplate that is switchable between two states simplifies the driving of the adaptive lens assembly and reduces the computational power needed to determine how to appropriately activate the adaptive lens assembly for a desired optical power. In addition, by allowing the adaptive lens assembly to modify the wavefront divergence of light outputted by a waveguide, the number waveguides needed to provide a plurality of depth planes is reduced relative to an arrangement in which each waveguide provides a particular amount of wavefront divergence.

Reference will now be made to the drawings, in which like reference numerals refer to like parts throughout. Unless indicated otherwise, the drawings are schematic not necessarily drawn to scale.

Example Display Systems

Figure 2:
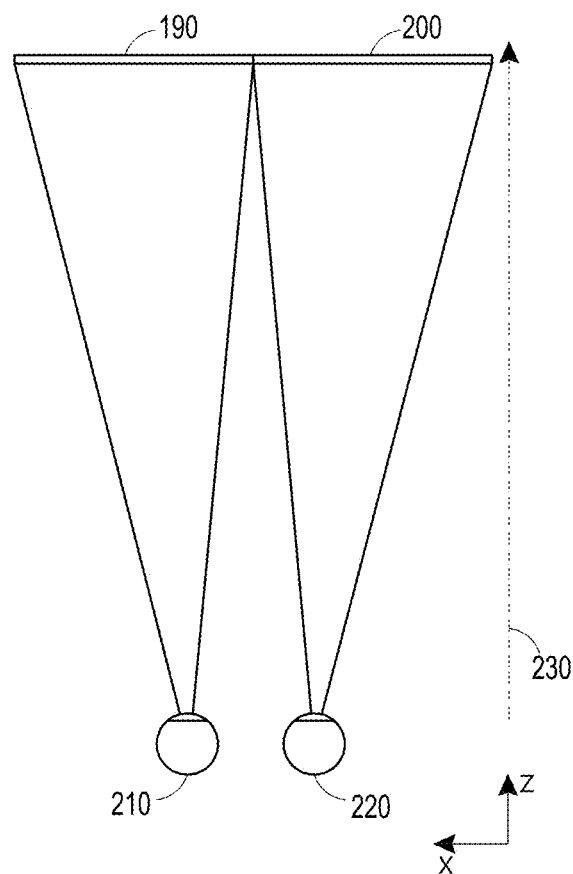
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
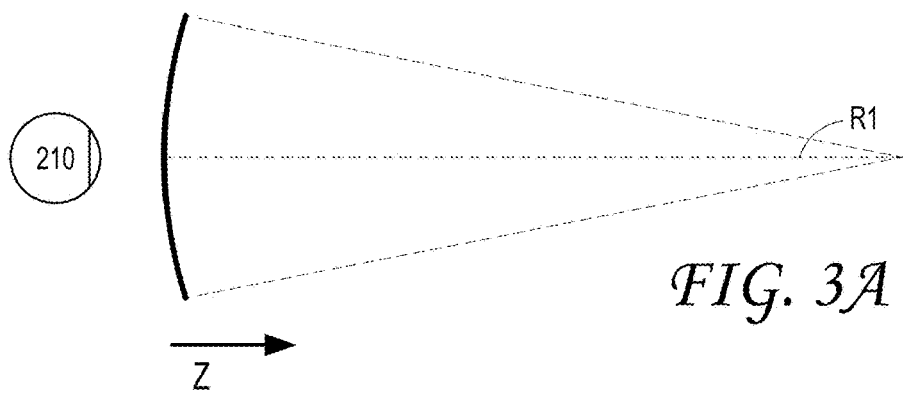
FIGS. 3A-3C illustrate relationships between radius of curvature and focal radius.
Figure 3B:
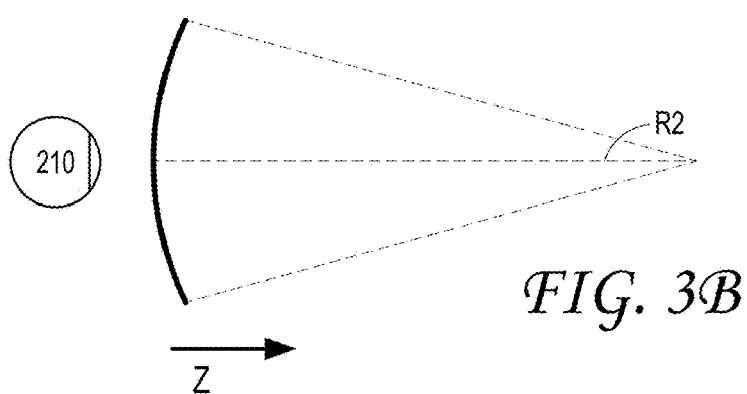
Figure 3C:
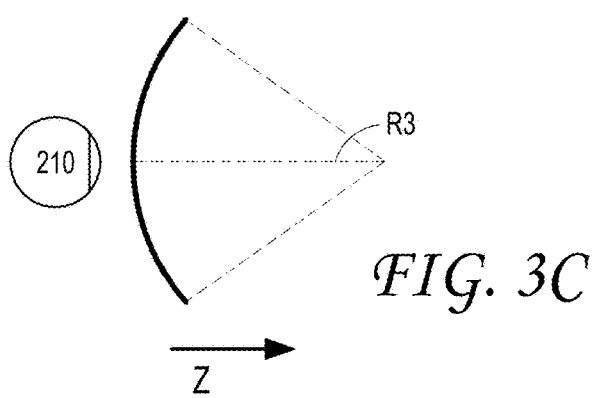

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
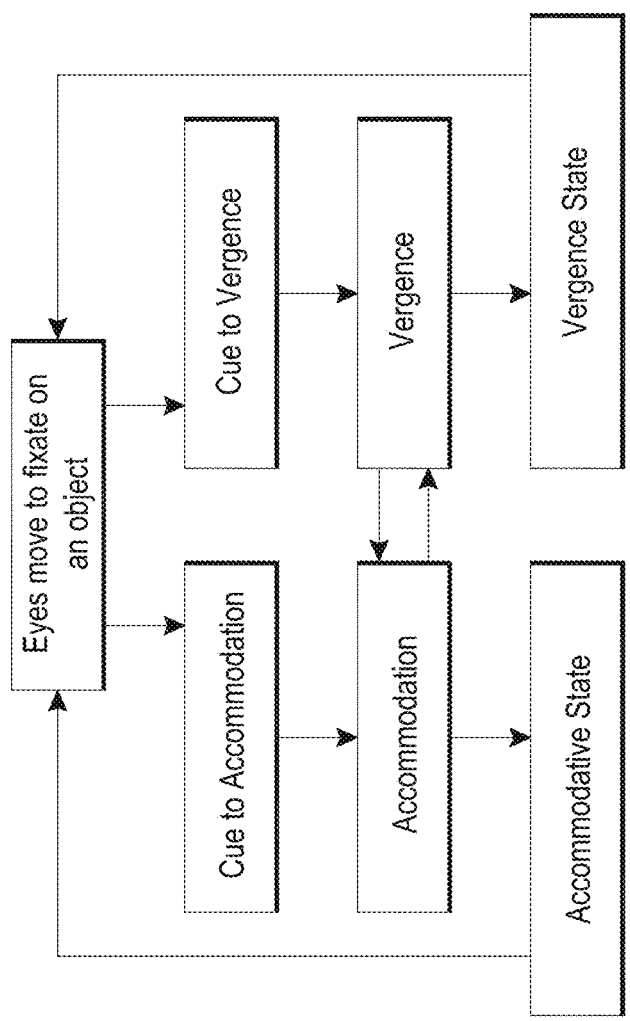
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
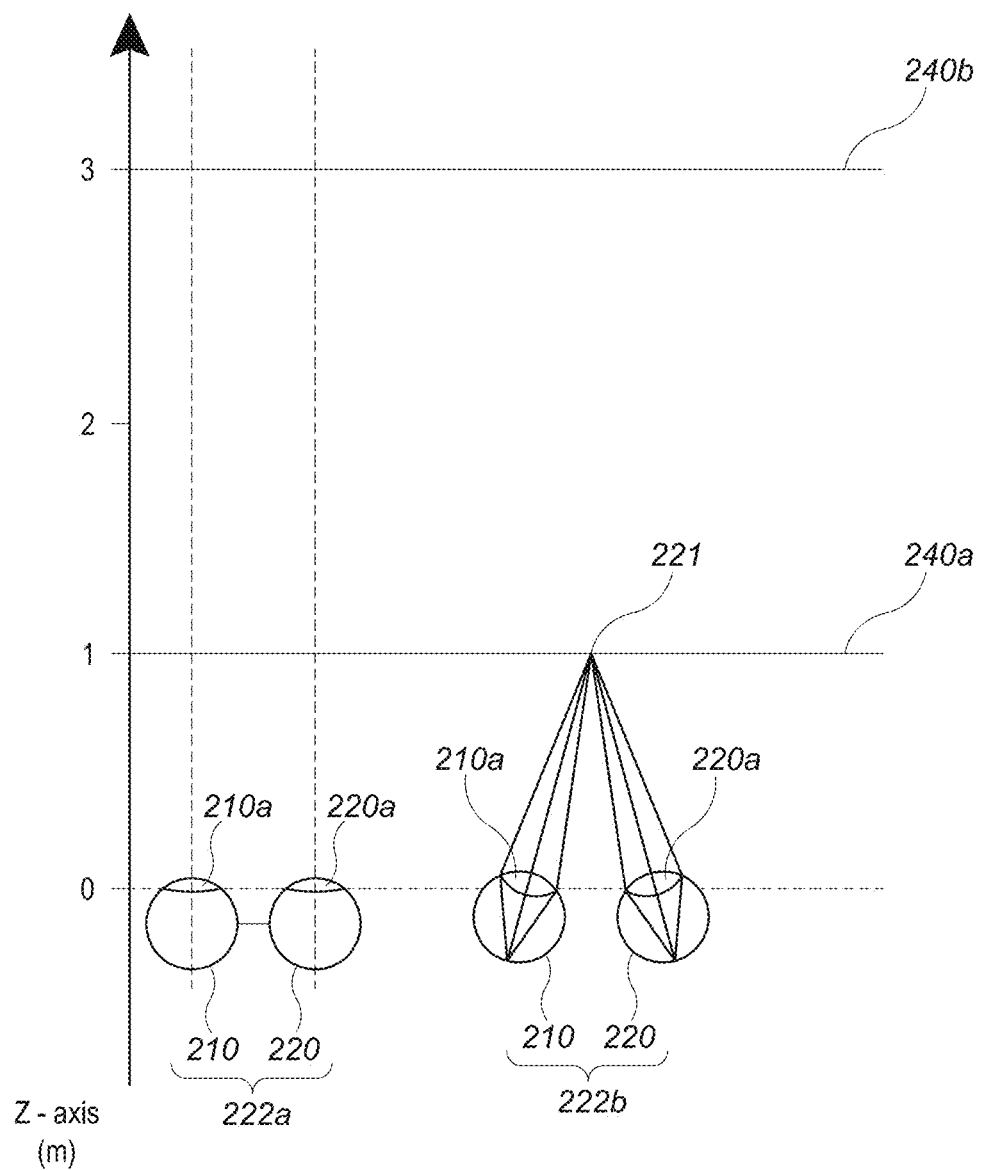
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
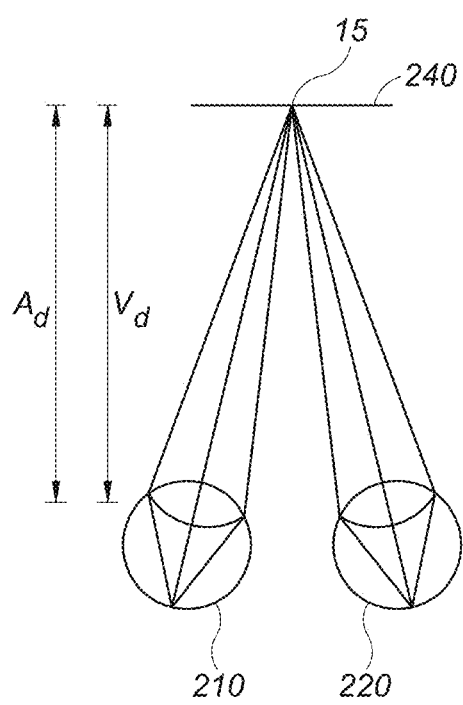
FIG. 4C illustrates an example of a representation of a top-down view of a user viewing content via a display system.
Figure 4D:
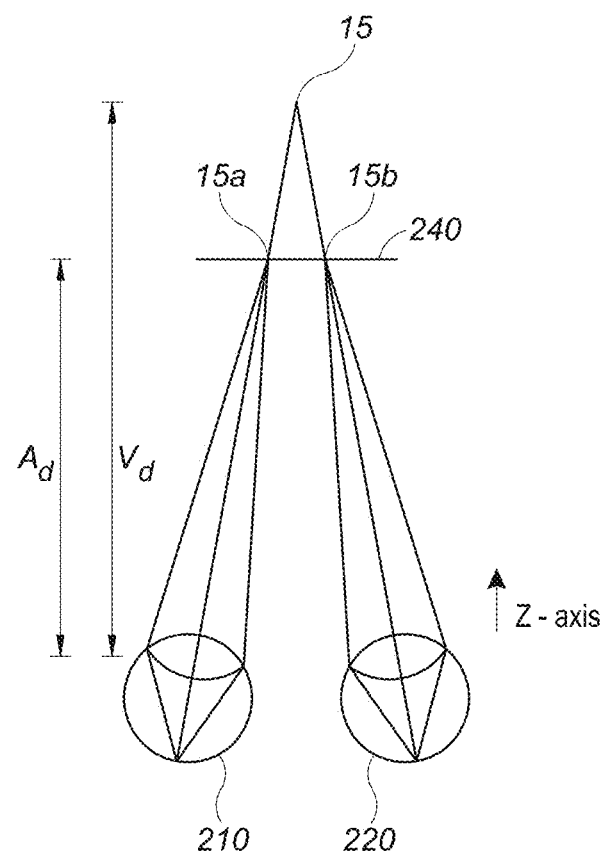
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d - A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
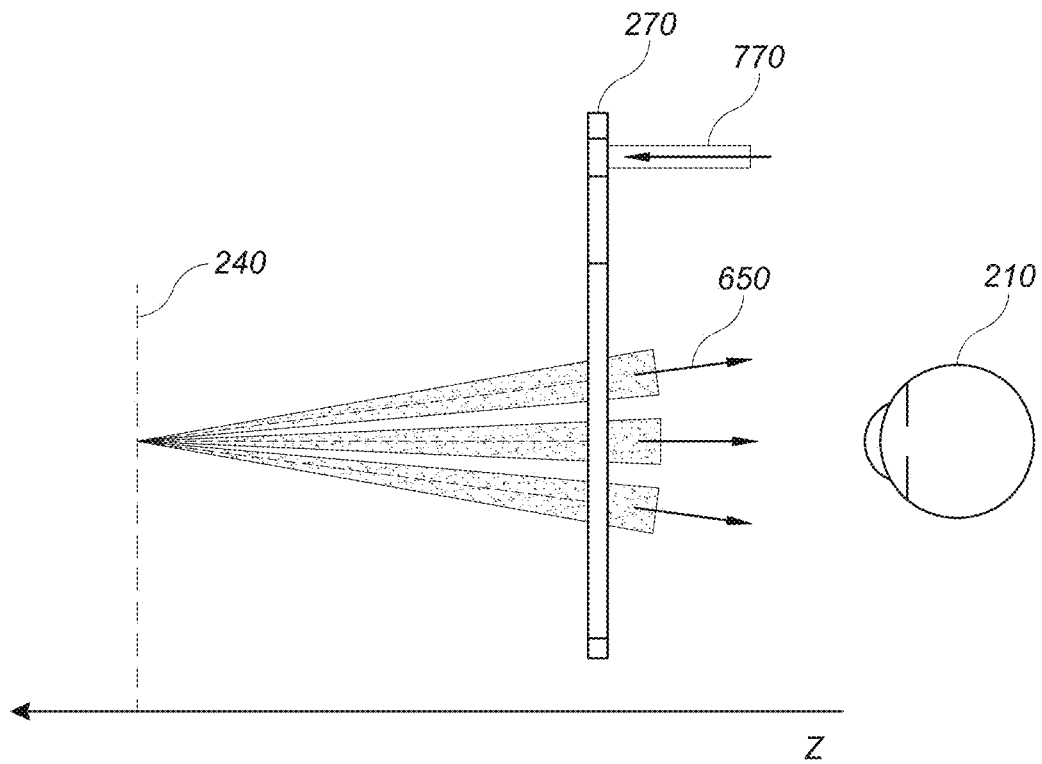
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
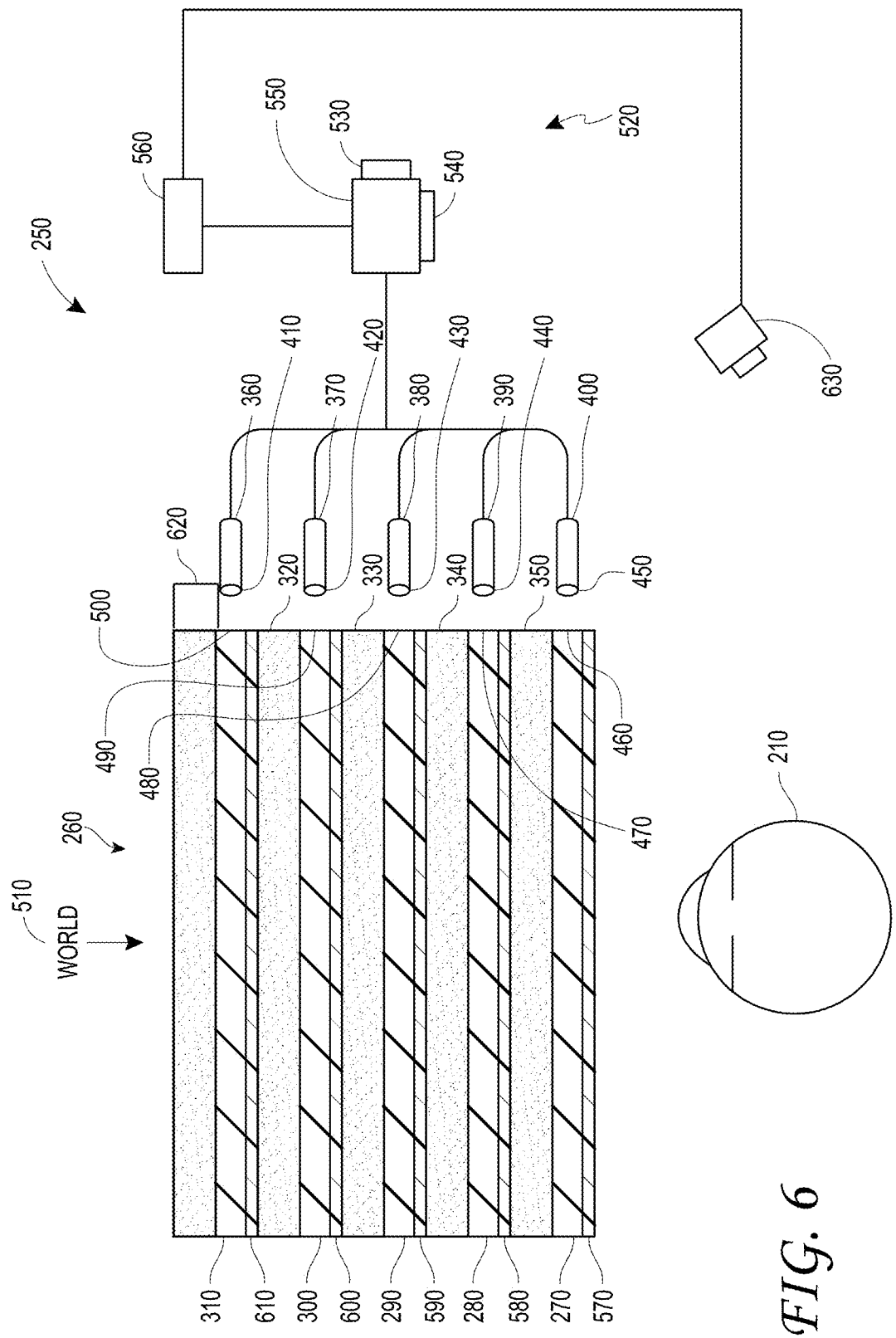
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. In this way, the light modulator 540 may effectively serve as a micro-display component of the display system 250. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
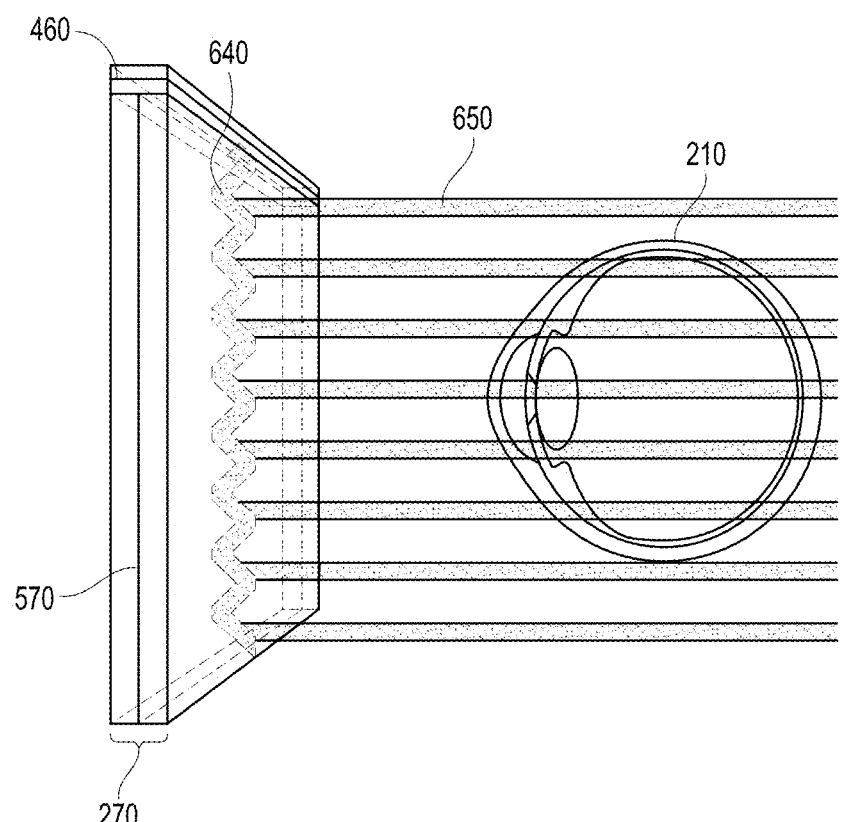
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
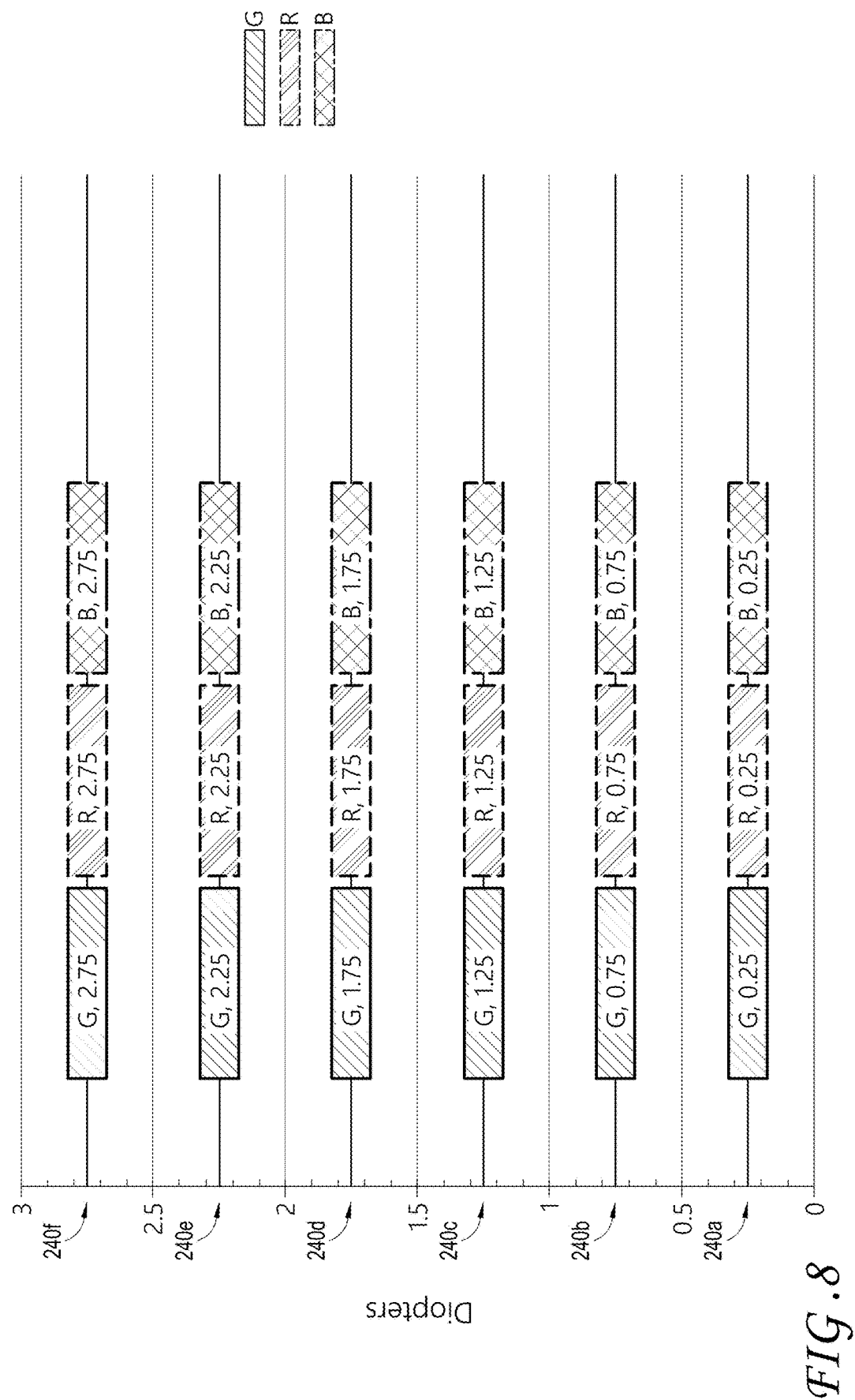
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
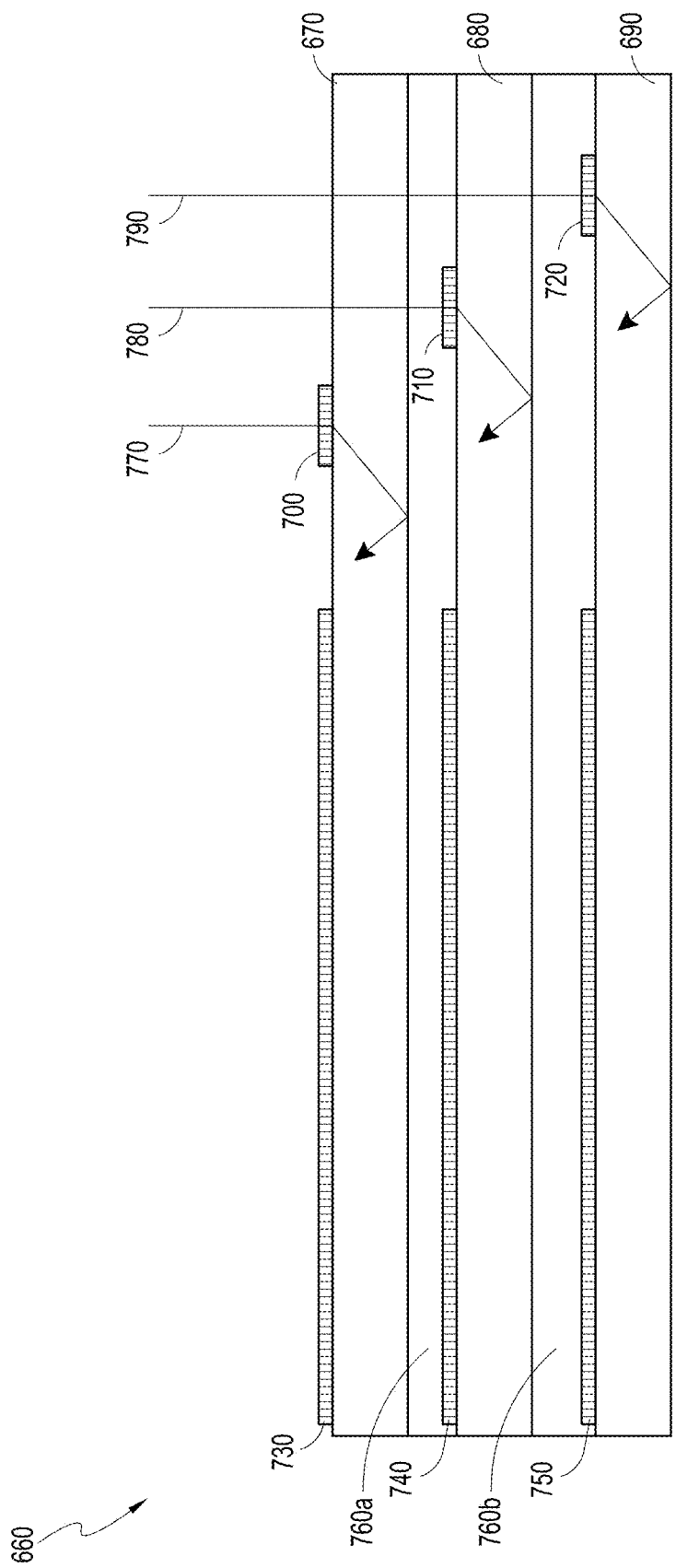
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
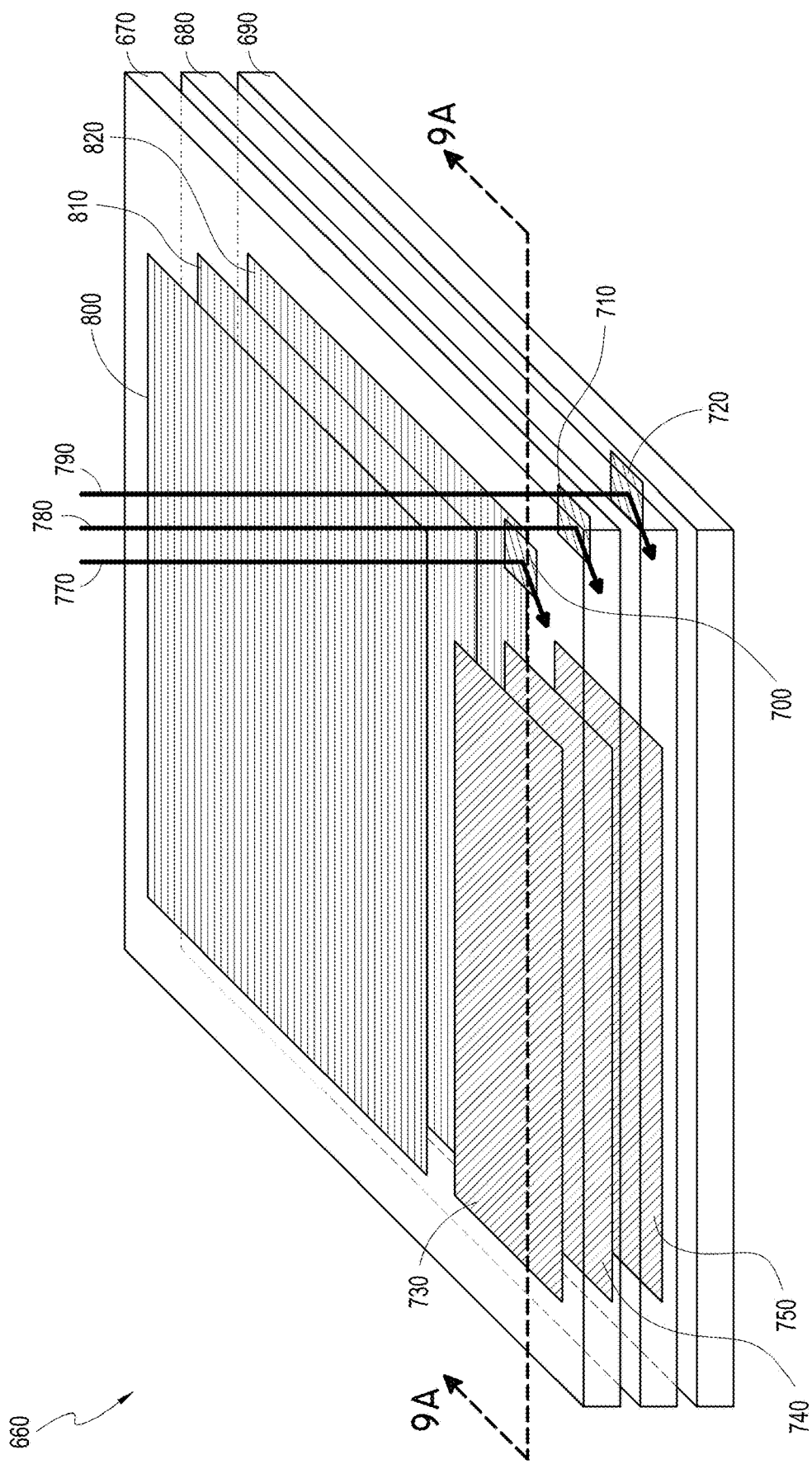
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
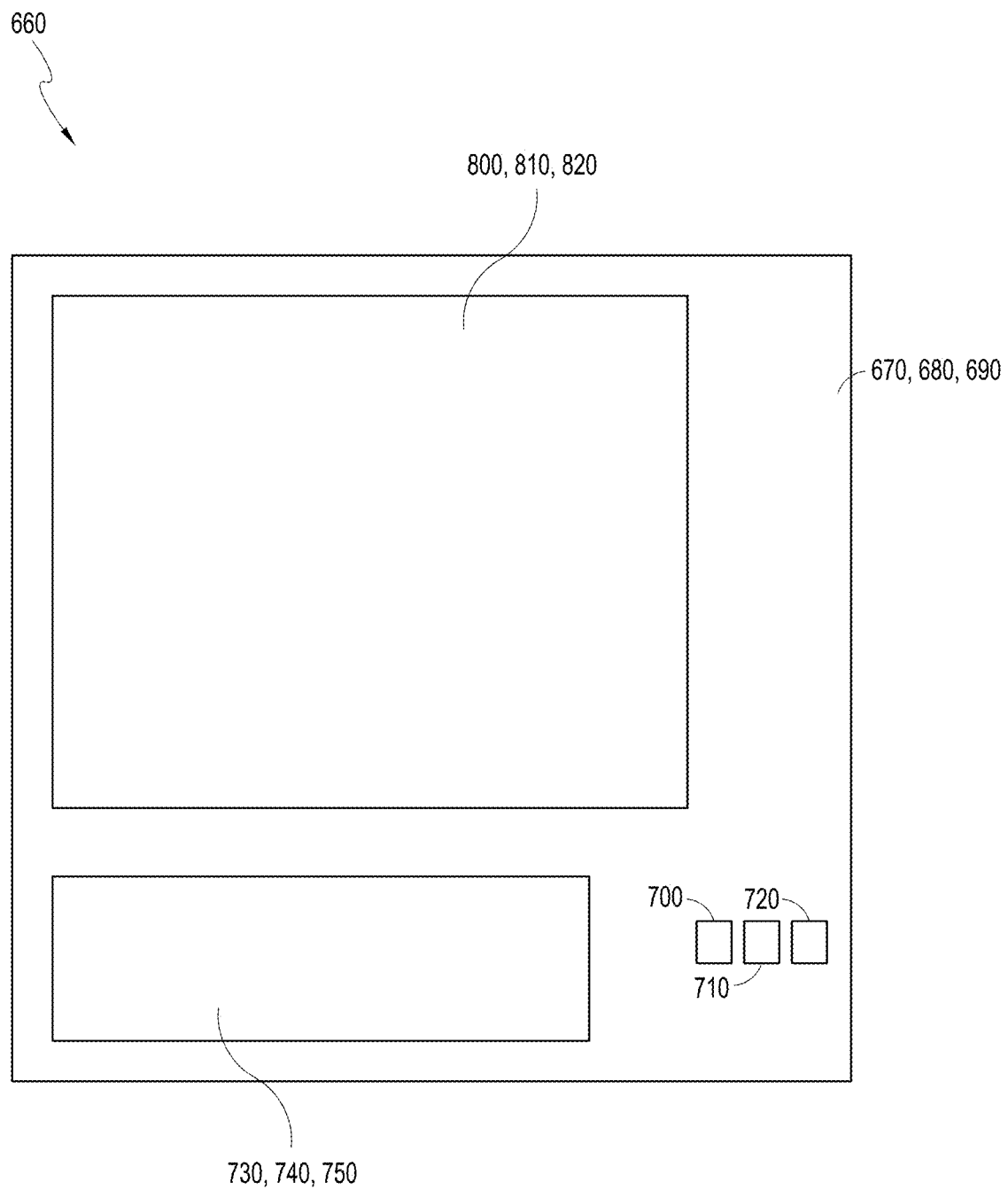
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
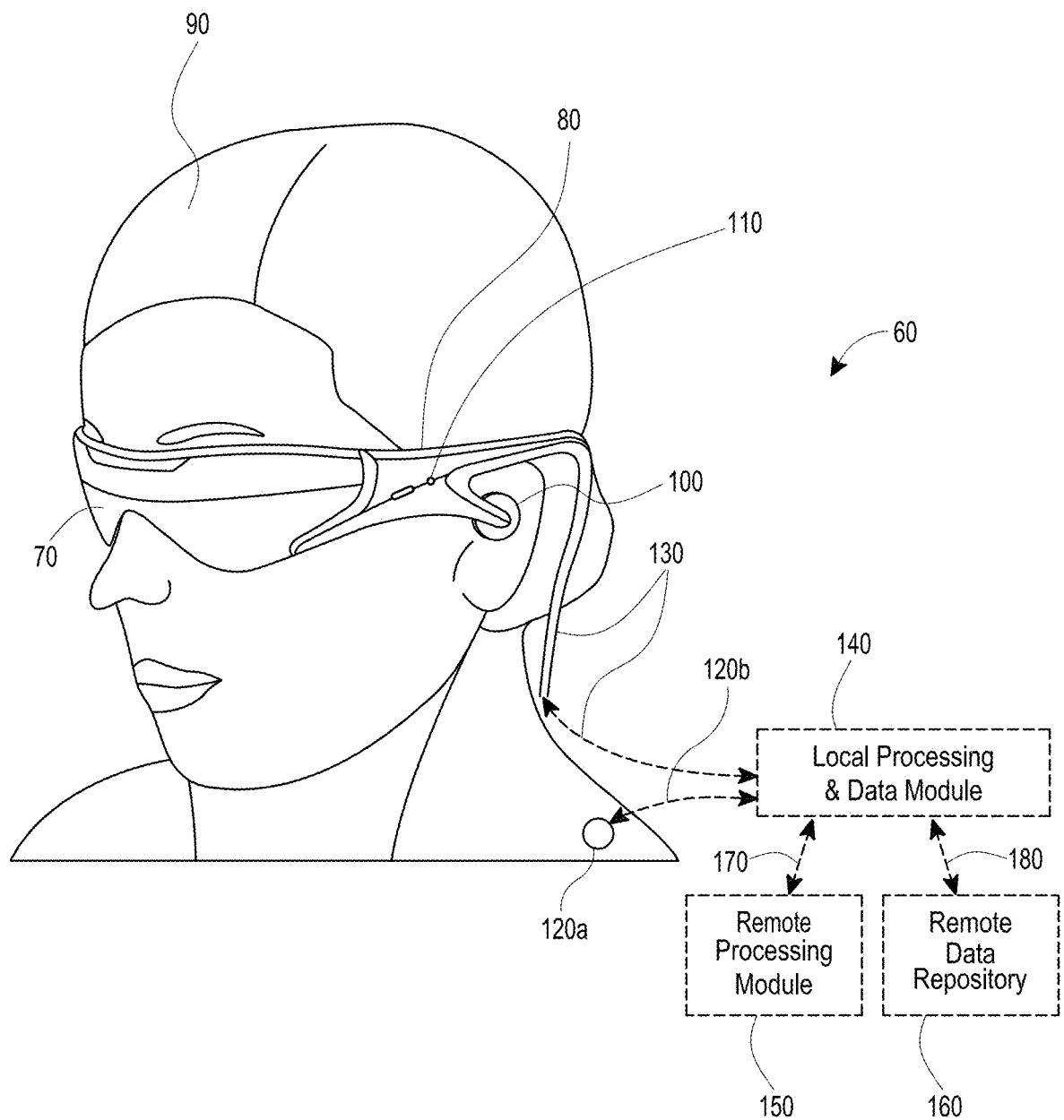
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120*a* may be operatively coupled by communications link 120*b*, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Adaptive Lens Assemblies

As described supra in reference to FIG. 6, some display systems according to embodiments include a waveguide assembly 260 configured to form images at a plurality of virtual depth planes. In the illustrated embodiment, the images may be formed using, e.g., a plurality waveguides 270, 280, 290, 300, 310 configured to form an image at one of the different depth planes. The waveguide assembly 260 may also optionally include a plurality of lenses 320, 330, 340, 350 between the waveguides. The waveguides 270, 280, 290, 300, 310 and/or the plurality of lenses 320, 330, 340, 350 may have various optical powers to form images at different virtual depth planes.

However, because each of the waveguides 270, 280, 290, 300, 310 increases the overall thickness, weight and cost to the waveguide assembly 260, it would be desirable to form images at a plurality of virtual depth planes with fewer waveguides. In addition, when formed of a conventional lens material, each of the optional lenses 320, 330, 340, 350 may add millimeters or tens of millimeters in thickness and corresponding weight to the displays.

In various embodiments described herein, display devices are configured to form images at different virtual depth planes using a waveguide assembly and one or more adaptive lens assemblies. In some embodiments, the adaptive lens assemblies comprise liquid crystals that are significantly lighter and thinner (microns) compared to conventional lenses, and may advantageously be configured to be switchable (e.g., electrically switchable). Advantageously, such adaptive lens assemblies may reduce the number, thickness and weight of a waveguide assembly such as the assembly 260. As used herein, optical power (also referred to as refractive power, focusing power, or convergence power) is the degree to which a lens, mirror, or other optical system converges or diverges light. It is equal to the reciprocal of the focal length of the device: $P=1/f$. That is, high optical power corresponds to short focal length. The SI unit for optical power is the inverse meter ($m^{-1}$) which is commonly called the diopter. As described herein, converging lenses are described to have positive optical power, while diverging lenses are described to have negative power. Without being bound by theory, when light passes through two or more thin lenses that are relatively close to each other, the optical power of the combined lenses may be approximated as a sum of the optical powers of the individual lenses. Thus, when light passes through a first lens having a first optical power P1 and further passes through a second lens having a second optical power P2, the light may be understood to converge or diverge according to the sum of optical powers $P=P1+P2$.

Figure 10:
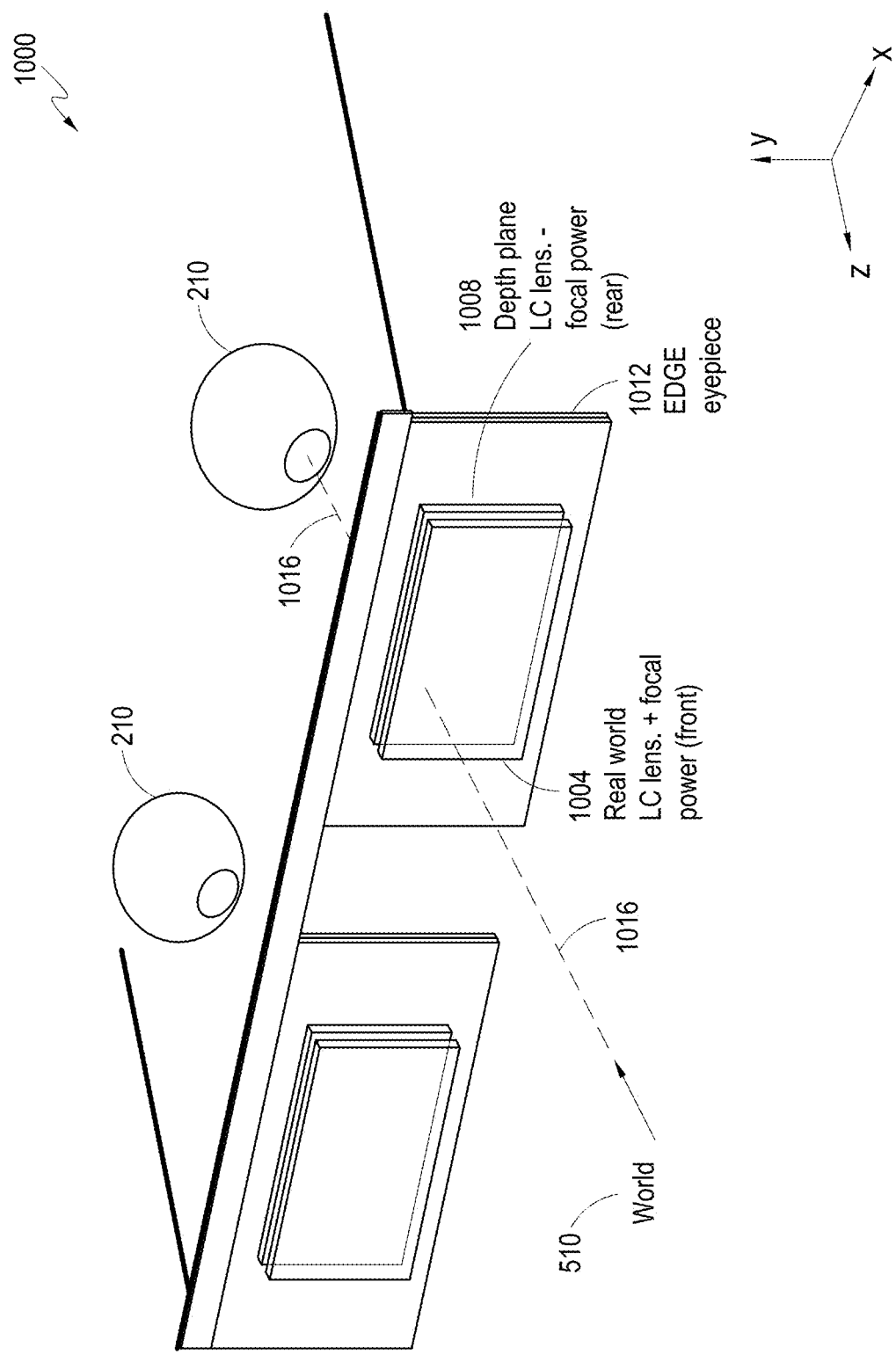
FIG. 10 illustrates an example of a display system comprising a pair of adaptive lens assemblies.

FIG. 10 illustrates an example of a display device 1000, e.g., a wearable display device, comprising one or more adaptive lens assemblies, e.g., a pair of adaptive lens assemblies 1004, 1008 in an optical path 1016 that are interposed by a waveguide assembly 1012. As described supra, the waveguide assembly includes a waveguide configured to propagate light (e.g., visible light) under total internal reflection and to outcouple the light in an optical axis extending from (e.g., in a direction direction normal to) a light output surface of the waveguide (e.g., a major surface of the waveguide). The light may be outcoupled by a diffraction grating in some embodiments. Each of the adaptive lens assemblies 1004, 1008 may be configured to at least partially transmit outcoupled light therethrough. In the illustrated embodiments, each of the adaptive lens assemblies may be configured to receive outcoupled light from the waveguide assembly 1012 and to converge or diverge the outcoupled light in the optical axis direction. Each of the adaptive lens assemblies 1004, 1008 comprises first and second waveplate lenses interposed by a switchable waveplate. Each of the first and second waveplate lenses may be configured to alter a polarization state of the outcoupled light passing therethrough. The switchable waveplate may be configured to alter a polarization state of the outcoupled light passing therethrough when activated (e.g., electrically activated).

As used herein, an adaptive lens assembly, refers to a lens assembly having at least one optical property that may be adjusted, e.g., reversibly activated and deactivated, using an external stimulus. Example optical properties that may be reversibly activated and deactivated include, among other properties, optical power (focal length), phase, polarization, polarization-selectivity, transmissivity, reflectivity, birefringence and diffraction properties, among other properties. In various embodiments, adaptive lens assemblies are capable of electrically varying the optical power and the polarization state of light passing therethrough.

In the illustrated embodiment, each of the pair of adaptive lens assemblies 1004, 1008 is configured to be electrically activated and deactivated, where, in a deactivated state, each of the adaptive lens assemblies 1004, 1008 provide a first optical power, while in an activated state, each of the adaptive lens assemblies 1004, 1008 provide a second optical power that is different than the first optical power. In addition, in an activated state, each of the adaptive lens assemblies 1004, 1008 alters a polarization state of light (e.g., visible light) passing therethrough, while in a deactivated state, each of the adaptive lens assemblies 1004, 1008 preserves a polarization state of the light passing therethrough. For example, when activated, each of the adaptive lens assemblies 1004, 1008 reverses the handedness of circularly polarized light, while when deactivated each of the adaptive lens assemblies 1004, 1008 preserves the handedness of circularly polarized light. Although polarization states are primarily described herein with reference to circular polarization states, it is to be understood that some or all of the systems and techniques described herein may serve to impart other types of polarization states to light (e.g., linear polarization states, elliptical polarization states, etc.) and discriminately interact with light of such other types of polarization states.

Still referring to FIG. 10, the display device 1000 further comprises a waveguide assembly 1012 interposed between the pair of adaptive lens assemblies 1004, 1008. The waveguide assembly 1012 may be similar to the waveguide assembly 260 described above with respect to FIG. 6, which comprises one or more waveguides, similar to one or more waveguides 270, 280, 290, 300, 310 in FIG. 6. As described supra, e.g., with respect to FIGS. 6 and 7, the waveguide may be configured to propagate light under total internal reflection in a lateral direction parallel to a major surface of the waveguide. The waveguide may further be configured to outcouple the light, e.g., in a direction normal to the major surface of the waveguide.

Still referring to FIG. 10, a first adaptive lens assembly 1004 of the pair of adaptive lens assemblies is disposed on a first side of the waveguide assembly 1012, e.g., the side of the world 510 observed by a user, and a second adaptive lens assembly 1008 of the pair of lens assemblies is disposed on a second side of the waveguide assembly 1012, e.g., the side of the eye 210 of the user. As described infra, the pair of adaptive lens assemblies as configured provides to a user virtual content from the waveguide assembly 1012 at a plurality of virtual depth planes, as well the view of the real world. In some embodiments, there is little or no distortion due to the presence of the adaptive lens assemblies. The virtual content and the view of the real world are provided to the user upon activation of the first and second adaptive lens assemblies 1004, 1008, as described infra with respect to FIGS. 11A and 11B.

In various embodiments described herein, display devices comprise a pair of adaptive lens assemblies for displaying augmented reality content while adjusting for possible distortion of the world view. However, it will be understood that embodiments are not so limited and in some implementations, the display device may only have one adaptive lens assembly. Such configuration may be suitable for situations in which the display device is configured to provide virtual reality (VR) content, rather than augmented reality (AR) content. In such configurations, there may not be a need for a second adaptive lens assembly between the waveguide assembly and the real world. Thus, it will be understood that any of the embodiments disclosed herein can have either one adaptive lens assembly or a pair of adaptive lens assemblies.

Figures 11A, 11B:
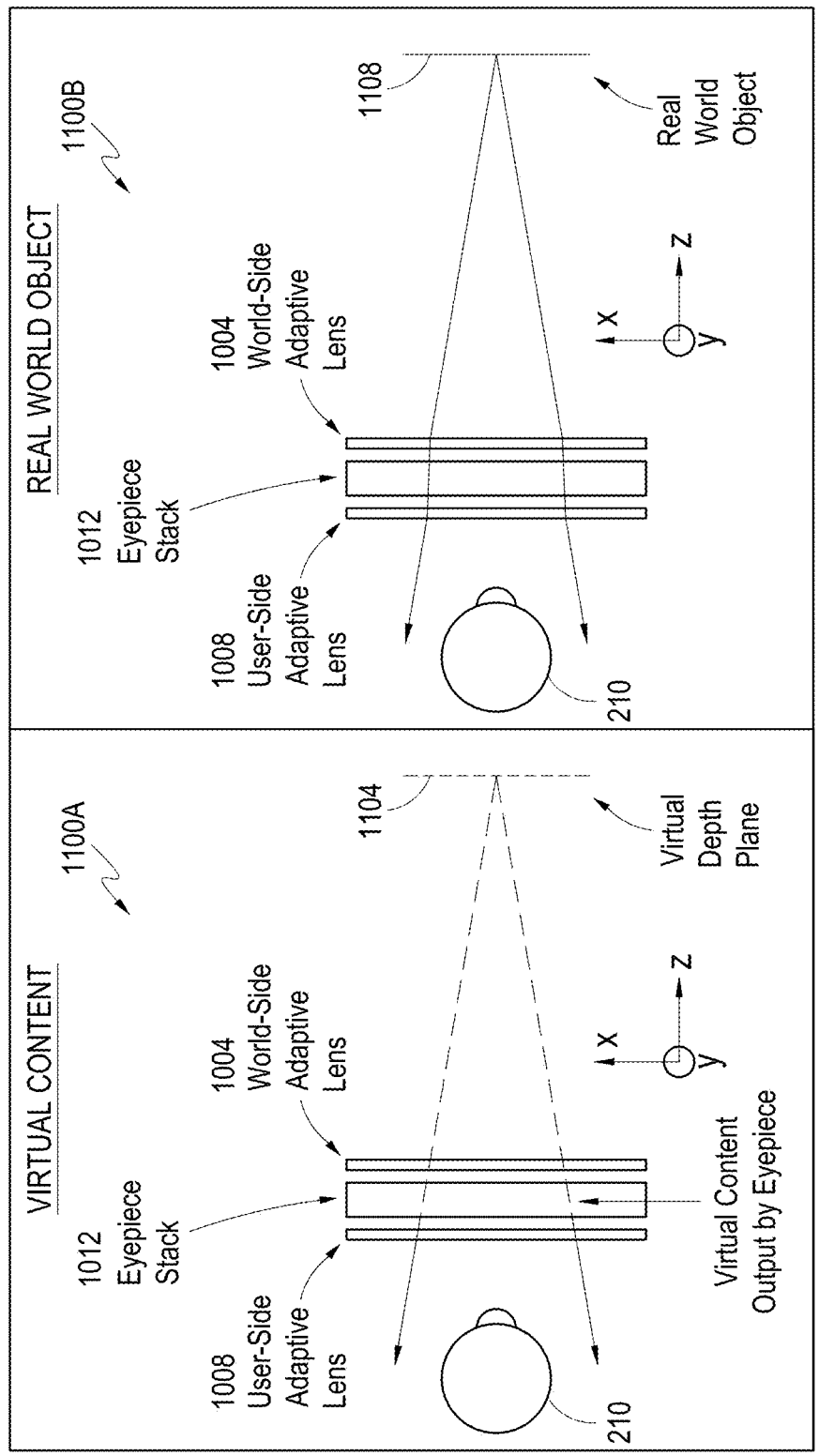
FIG. 11A illustrates an example of the display system of FIG. 10 displaying virtual content to a user at a virtual depth plane.
FIG. 11B illustrates an example of the display system of FIG. 10 providing a view of real world content to a user.

FIGS. 11A and 11B illustrate examples of display devices 1100A/1100B, each comprising adaptive lens assemblies in operation to output image information to a user. The display devices 1100A and 1100B in unpowered state are structurally identical. The display device 1100A is used herein to describe outputting virtual image to the user, while the display device 1100B is used herein to describe transmitting a real world image through the display device 1100B to the user. The display device 1100A/1100B includes a pair of the switchable lenses assemblies 1004, 1008 that are configured to be electrically activated by, e.g., application of a voltage or a current. In some embodiments, in a deactivated state, e.g., when no voltage or current is applied, each of the first and second switchable lenses assemblies 1004, 1008 has a low, e.g., about zero, optical power. In some embodiments, in an activated state, e.g., when a voltage or a current is applied, the first adaptive lens assembly 1004 on the side of the world may provide a first net optical power (Pnet1) having a first sign, e.g., a positive optical power. When in an activated state, the second adaptive lens assembly 1008 on the side of the user may provide a second net optical power (Pnet2) having a second sign, e.g., a negative optical power.

FIG. 11A illustrates an example of the display system of FIG. 10 displaying virtual content to a user at a virtual depth plane, according to some embodiments. As described supra, the waveguide assembly 1012 interposed between the pair of the adaptive lens assemblies 1004, 1008 comprises a waveguide configured to receive light containing virtual image information and propagate the light under total internal reflection. The waveguide assembly 1012 is further configured to outcouple the light through, e.g., a diffraction grating, towards the eye 210. The outcoupled light passes through the second adaptive lens assembly 1008 prior to entering the eye 210. When activated, the second adaptive lens assembly 1008 has a second net optical power, Pnet2, which may have a negative value, such that the user sees the virtual image at a virtual depth plane 1104.

In some embodiments, the second net optical power Pnet2 may be adjusted electrically to adjust the second net optical power (Pnet2) of the second adaptive lens assembly 1008, thereby adjusting the distance to the virtual depth plane 1104. For example, as a virtual object "moves" closer and further relative to the eye 210 within a virtual three dimensional space, the second net optical power Pnet2 of the second adaptive lens assembly 1008 may be correspondingly adjusted, such that the virtual depth plane one 1104 adjusts to track the virtual object. Thus, the user may experience relatively little or no accommodation/vergence mismatch beyond an acceptable threshold. In some embodiments, the magnitude of the distance to the virtual depth plane 1104 may be adjusted in discrete steps, while in some other embodiments, the magnitude of the distance to the virtual depth plane 1104 may be adjusted continuously.

FIG. 11B illustrates an example of the display system of FIG. 10 providing a view of real world content to a user, according to some embodiments. When the second adaptive lens assembly 1008 is activated to have the second net optical power (Pnet2) to display the virtual content at the virtual depth plane 1104, light from the real world passing through the second adaptive lens assembly 1008 may also be converged or diverged according to Pnet2 of the activated second adaptive lens assembly 1008. Thus, objects in the real world may appear out of focus. To mitigate such distortion, according to embodiments, when activated, the first and second adaptive lens assemblies 1004, 1008 may be configured to have optical powers having opposite signs. In some embodiments, light passing through the first and second adaptive lens assemblies 1004, 1008 converges or diverges according to a combined optical power having a magnitude that is about a difference between magnitudes of first and second net optical powers Pnet1, Pnet2, of the first and second adaptive lens assemblies 1004, 1008, respectively. In some embodiments, the waveguide assembly 1012 may also have optical power and the adaptive lens assembly 1008 may be configured to account for the distortions caused by both the lens assembly 1004 and the waveguide assembly 1012. For example, the optical power of the adaptive lens assembly 1008 may be opposite in sign to the sum of the optical powers of the lens assembly 1004 and the waveguide assembly 1012.

In some embodiments, the first adaptive lens assembly 1004 is configured to have the first net optical power Pnet1 that has a magnitude that is close to or the same as the magnitude of the second net optical power Pnet2 of the second adaptive lens assembly 1008. As a result, when both the first and second adaptive lens assemblies 1004, 1008 are activated simultaneously, objects in the real world appear relatively unaffected by the optical power of the second adaptive lens assembly 1008 provided for displaying the virtual content.

In some embodiments, first adaptive lens assembly 1004 may be configured such that when activated, the first net optical power Pnet1 dynamically matches the second net optical power Pnet2 of the second adaptive lens assembly 1008. For example, as the second net optical power Pnet1 of the second switchable assembly 1008 is adjusted to track moving virtual objects within the virtual three dimensional space, the first net optical power Pnet1 of the first adaptive lens assembly 1004 may be dynamically adjusted, such that the magnitude of the combined optical power P=Pnet1+Pnet2 may be kept less than a predetermined value. Thus, according to embodiments, the objects in the real world may be prevented from being unacceptably out of focus by compensating the second net optical power (Pnet2) of the second adaptive lens assembly 1008, which may have a negative value, with the first net optical power (Pnet1) of the first adaptive lens assembly 1004, such that the combined optical power P=Pnet1+Pnet2 remains small, e.g., near about 0 $m^{-1}$.

Adaptive Lens Assemblies Including a Switchable Half Waveplate and Waveplate Lenses As discussed above, one of the advantages of forming images at a plurality of depth planes with fewer waveguides is the overall reduction in thickness and weight of the display device (e.g., display device 1000 in FIG. 10). As such, traditional lenses including, e.g., glass lenses or Fresnel lenses, may be unsuitable as component lenses for the adaptive lens assemblies discussed herein. Thus, various embodiments herein provide adaptive lens assemblies that are compact, lightweight and provide additional optical functionalities, e.g., polarization inversion. In some embodiments, optical components included in the adaptive lens assemblies (e.g., 1004, 1008 in FIGS. 10, 11A, 11B) include switchable waveplates and/or waveplate lenses formed of a thin film of birefringent material. For example, switchable waveplates and/or waveplate lenses may be formed of, e.g., liquid crystal-based waveplates having liquid crystals whose orientations in the plane of the waveplate are adapted for focusing and/or altering the polarization state of light transmitted therethrough.

Efficient light focusing and polarization alteration may be a challenge in designing a waveguide-based see-through displays, e.g., for virtual/augmented/mixed displaapplications. For these and other applications, it is desirable to have lenses and waveplates formed of a material whose structure is configurable to optimize various optical properties, including optical power and polarization alteration with high efficiencies. In the following, various embodiments of lenses and waveplates formed of liquid crystals, e.g., cholesteric liquid crystals, are described.

Liquid crystal molecules of a cholesteric liquid crystal (CLC) layer in a chiral (nematic) phase or a cholesteric phase is characterized by a plurality of liquid crystal molecules that are arranged to have successive azimuthal twists of the director as a function of position in the film in a normal direction, or a depth direction, of the liquid crystal layer. As described herein, the liquid crystal molecules that are arranged to have the successive azimuthal twists are collectively referred to herein as a chiral structure. As described herein, an angle ($\phi$) of azimuthal twist or rotation is described as the angle between the directors of the liquid crystal molecules, relative to a direction parallel to the layer normal. The spatially varying director of the liquid crystal molecules of a chiral structure may be described as forming a helical pattern in which the helical pitch (p) is defined as the distance (e.g., in the layer normal direction of the liquid crystal layer) over which the director has rotated by 360°, as described above.

In some embodiments described herein, waveplate lenses and/or switchable waveplate comprise a cholesteric liquid crystal (CLC) layer comprising a plurality of chiral structures, wherein each chiral structure comprises a plurality of liquid crystal molecules that extend in a layer depth direction by at least a helical pitch and are successively rotated in a first rotation direction. The helical pitch is a length in the layer depth direction corresponding to a net rotation angle of the liquid crystal molecules of the chiral structures by one full rotation in the first rotation direction.

Figure 12A:
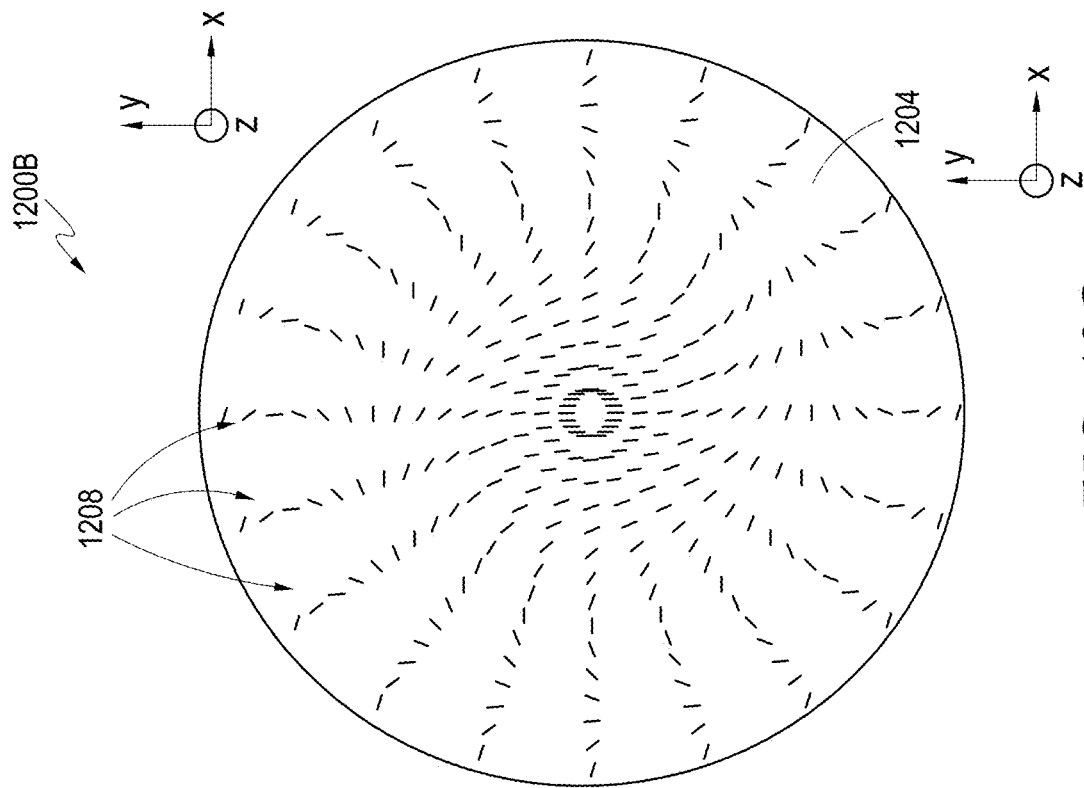
FIG. 12A illustrates an example of a waveplate lens comprising liquid crystals.
Figure 12B:
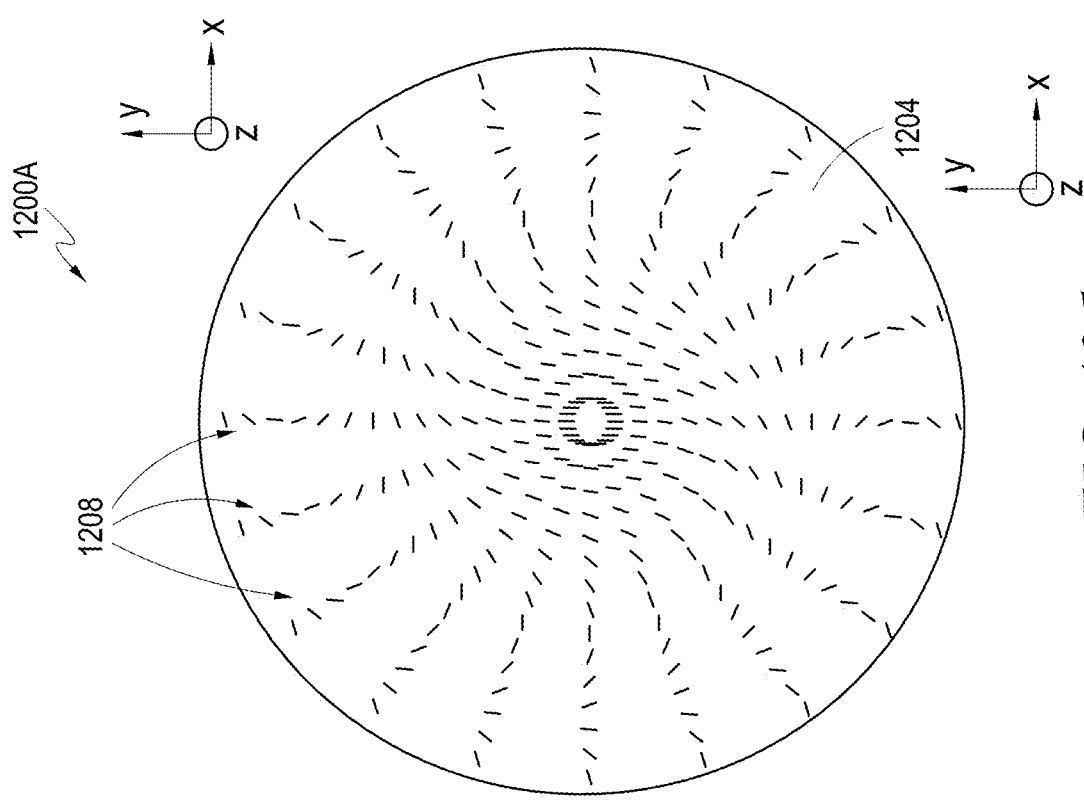
FIG. 12B illustrates an example of a waveplate lens comprising liquid crystals.

One example of liquid crystal-based waveplate lenses is illustrated with respect to FIGS. 12A and 12B.

FIGS. 12A and 12B illustrate examples of waveplate lenses 1200A and 1200B, respectively, each comprising a transparent substrate 1204, e.g., a glass substrate, having formed thereon liquid crystal molecules 1208 elongated along different elongation directions relative to a direction parallel to an axial direction (e.g., x-direction or y-direction) along a major surface of the substrate 1204. That is, the liquid crystal molecules 1208 are rotated about a direction (e.g., z-direction) normal to a major surface of the substrate 1204 by different angles ($\phi$) of rotation, where $\phi$ is described as the angle between the direction of elongation of the liquid crystal molecules relative to a direction parallel to the layer normal (e.g., x-direction or y-direction).

In the illustrated implementations, the liquid crystal molecules 1208 at a given radius from a central axis C have the same angle ($\phi$) of rotation. As arranged, the liquid crystal molecules 1208 are configured to focus a collimated beam of light to a point at a focal length. Without being bound to any theory, the angle ($\phi$) of rotation of liquid crystal molecules 1208 may be proportional to $+/-k_0 r^2/f$, $r^2$ where r is the radial distance from C and $k_0 = 2\pi/\lambda$ is the wavenumber of the light that is to be focused by the diffractive waveplate lens, l is the wavelength of the light, f is the focal length of the waveplate lenses 1200A, 1200B. The + and − sign can correspond to the direction of rotation of the liquid crystal molecules 1208 relative to the liquid crystal molecules 1208 nearest to the center C of the waveplate lenses 1200A, 1200B.

It will be appreciated that the patterns of liquid crystal molecules 1208 of waveplate lenses 1200A and 1200B represent flipped images of each other. That is, one of the waveplate lenses 1200A and 1200B may be obtained by rotating the other of the waveplate lenses 1200B and 1200B around an axial direction (e.g., x-direction or y-direction) by 180 degrees. As configured, focal lengths and optical powers of the waveplate lenses 1200A and 1200B are the same in magnitude but opposite in sign.

In some implementations, each of waveplate lenses 1200A and 1200B may serve as half waveplate lenses. When configured as a half-waveplate lens, each of the waveplate lenses 1200A and 1200B rotates the plane of a linearly polarized light by an angle 2a with respect to the polarization of an input beam, where a is the angle between the input polarization direction and the waveplate axis. For a circular polarized beam, this change in angle translates into a phase shift and reversal of the polarization handedness. Thus, a ±2α phase shift may be generated in a circularly polarized beam with the sign of the phase shift depending on the polarization handedness.

Figure 12C:
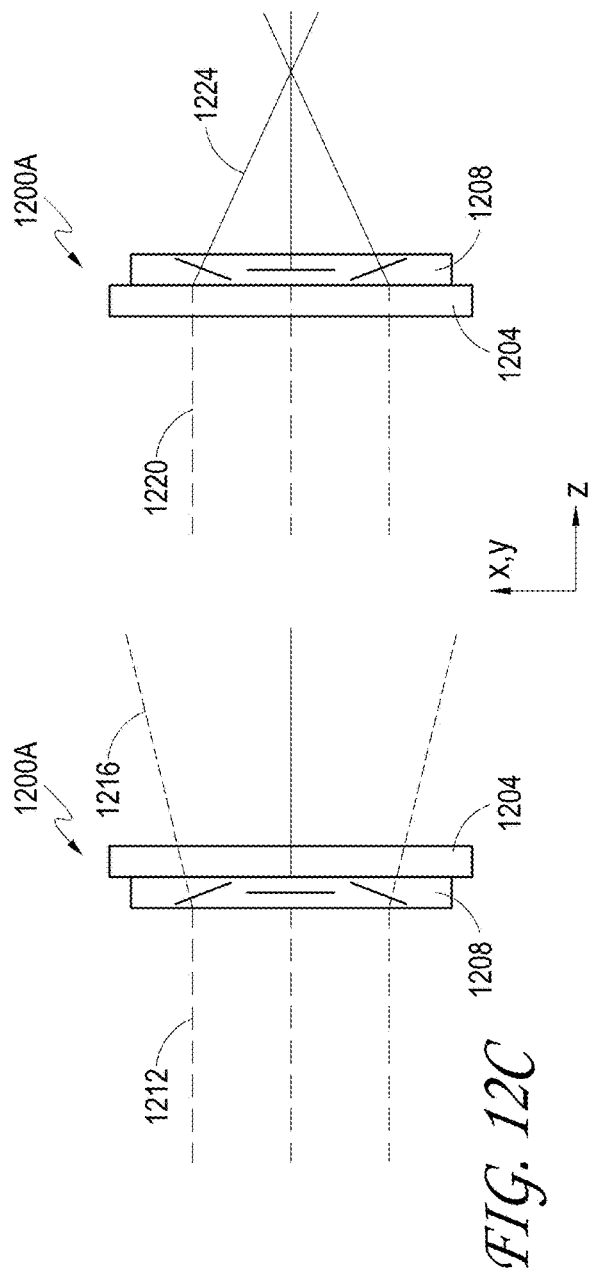
FIG. 12C illustrates an example of a waveplate lens that provides different optical power to diverge or converge light passing therethrough depending on the polarization of light and the side on which the light is incident.

FIG. 12C illustrates examples of a waveplate lens that diverges or converges light passing therethrough depending on the polarization of light and the side on which the light is incident, according to some embodiments. When configured as a half-waveplate lens, the illustrated waveplate lens 1200A may be configured to diverge a right-hand circular polarized (RHCP) light beam 1212 incident on a first side into a left-hand circular polarized (LHCP) beam 1216. On the other hand, the waveplate lens 1200A may be configured to converge a RHCP light beam 1220 incident on a second side opposite to the first side into a left-hand circular polarized (LHCP) beam 1224.

Figure 12D:
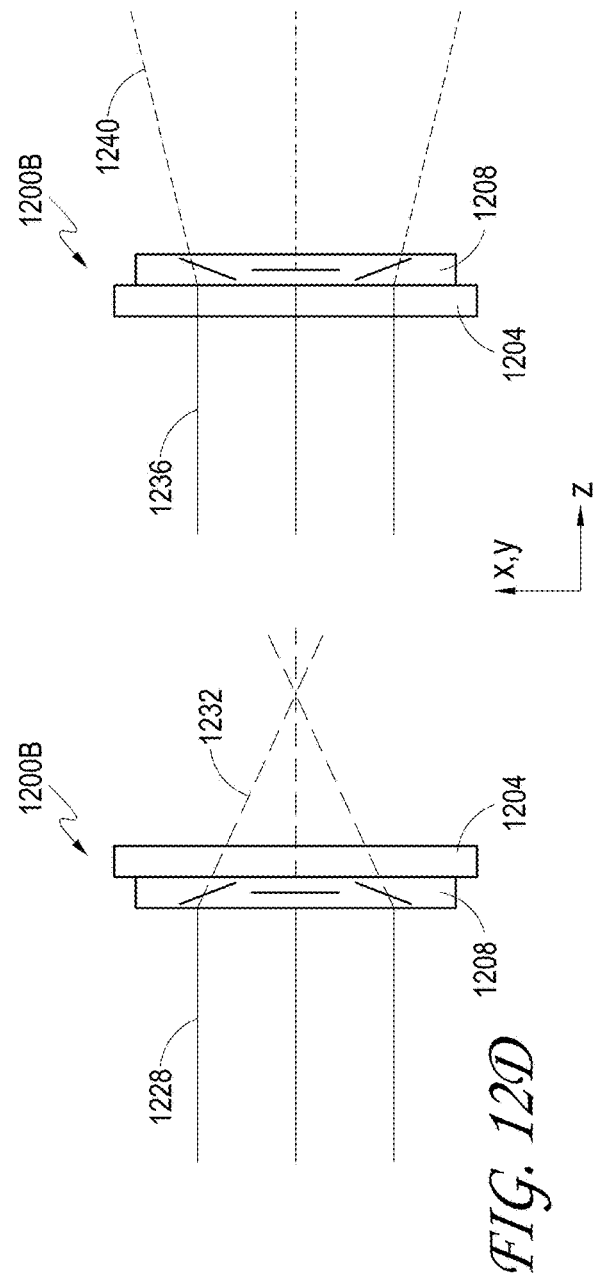
FIG. 12D illustrates an example of a waveplate lens that provides different optical power to diverge or converge light passing therethrough depending on the polarization of light and the side on which the light is incident.

For waveplate lens 1200B, the situation is reversed. As illustrated in FIG. 12D, when configured as a half-waveplate, the waveplate lens 1200B may be configured to converge a LHCP light beam 1228 incident on a first side into a RHCP beam 1232. On the other hand, the waveplate lens 1200B may be configured to diverge a LHCP light beam 1236 incident on a second side opposite the first side into a RHCP beam 1240.

Thus, by controlling the direction of angle of rotation and the radial distribution of the liquid crystals 1208, the waveplate lens may be configured to converge or diverge circularly polarized light having either handedness. It will be appreciated that, based on the relationship between the angles of rotation of the liquid crystals, the optical power may be increased or decreased. In addition, in some embodiments, the liquid crystals may be aligned and unaligned by applying an electric field. Thus, it will be appreciated that in the limit where the optical power is near zero, the waveplate lenses may be used as waveplates, e.g., switchable waveplates.

Figure 13A:
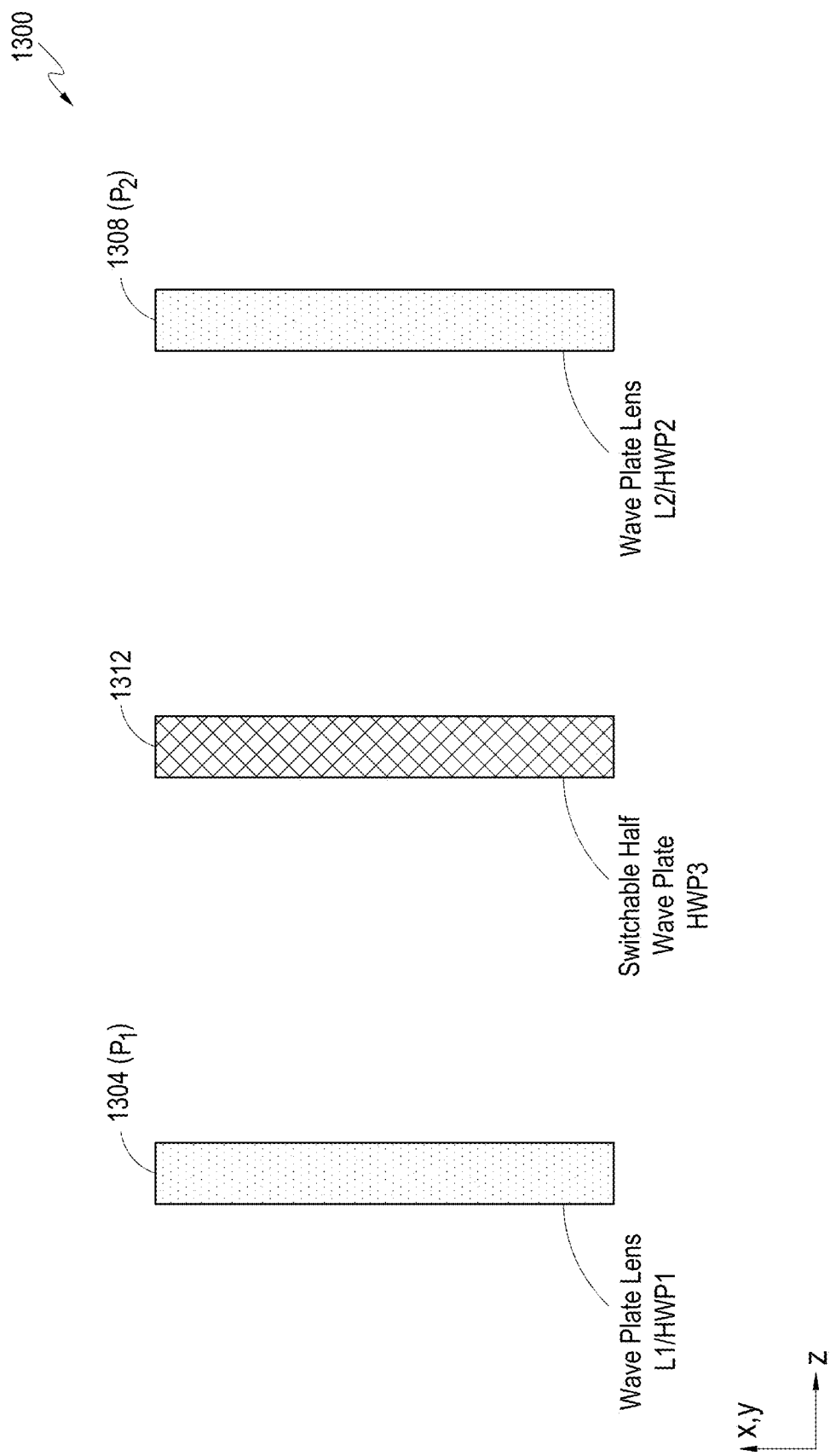
FIG. 13A illustrates an example of an adaptive lens assembly comprising waveplate lenses and a switchable waveplate.
Figure 13B:
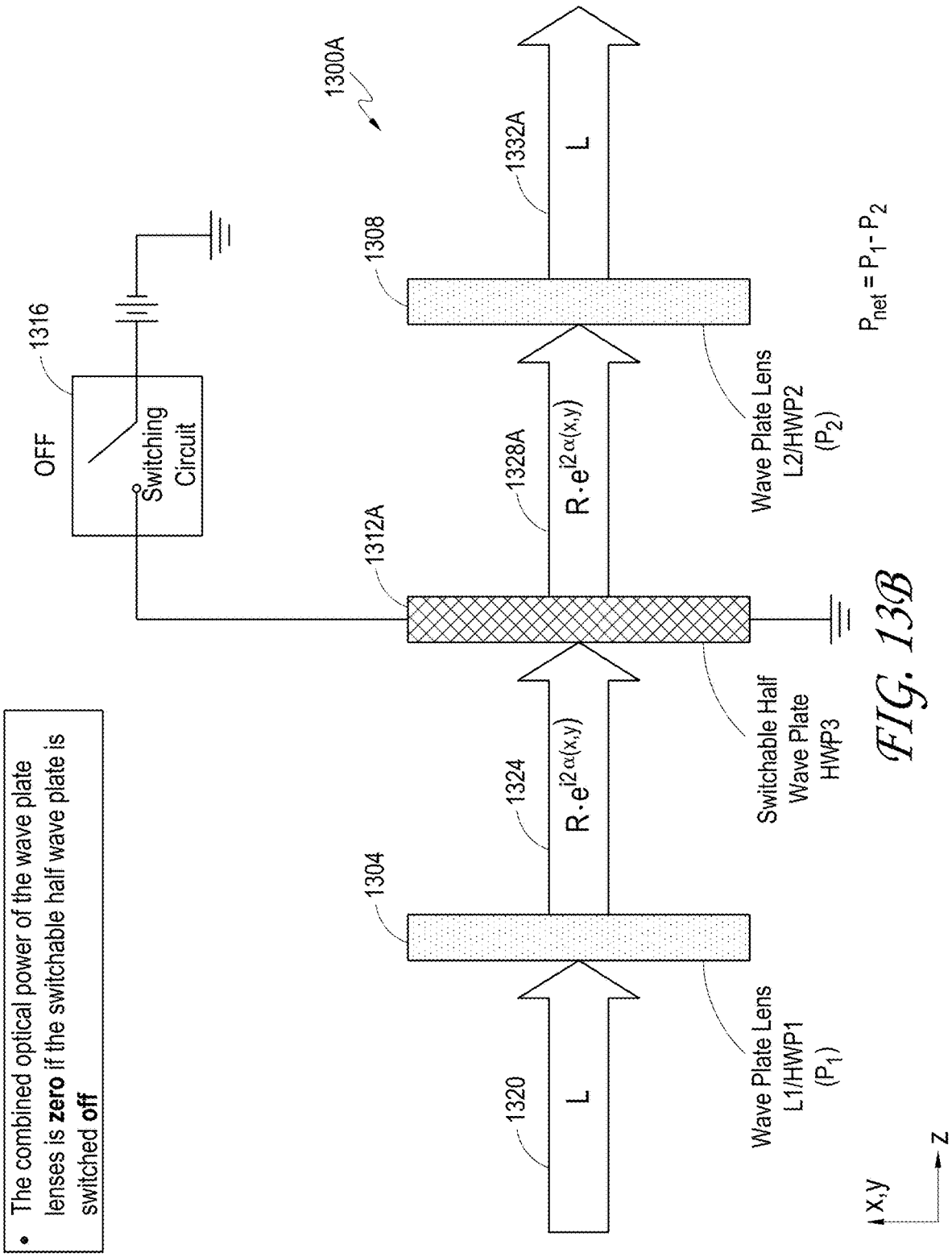
FIG. 13B illustrates an example of the adaptive lens assembly of FIG. 13A in operation with the switchable waveplate deactivated.
Figure 13C:
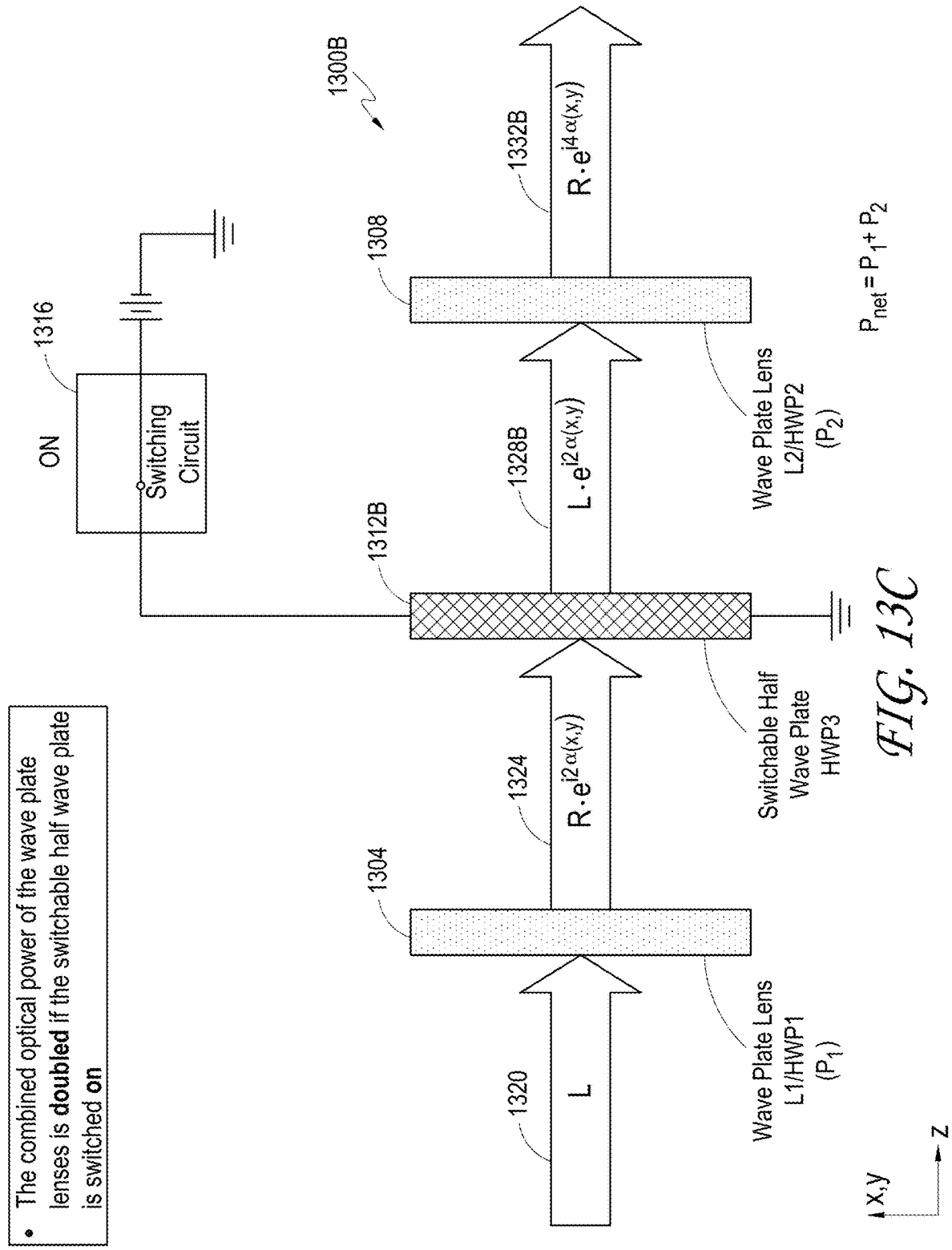
FIG. 13C illustrates an example of the adaptive lens assembly of FIG. 13A in operation with the switchable waveplate activated.

FIG. 13A illustrates an example of an adaptive lens assembly comprising waveplate lenses and a switchable waveplate, according to some embodiments. The adaptive lens assembly 1300 may be configured, e.g., as either one of the pair of switchable waveplate assemblies 1004, 1008 described supra with respect to FIGS. 10, 11A and 11B. FIG. 13B illustrates the switchable waveplate assembly 1300A in operation when the switchable waveplate of the adaptive lens assembly 1300 illustrated in FIG. 13A is deactivated, whereas FIG. 13C illustrates the switchable assembly 1300B in operation when the switchable waveplate of the adaptive lens assembly 1300 illustrated in FIG. 13A is activated. The adaptive lens assembly 1300 is configured to couple and to transmit therethrough the light outcoupled from the waveguide assembly 1012 (FIGS. 10, 11A, 11B). The adaptive lens assembly 1300 comprises a first waveplate lens (L1/HWP1) 1304, e.g., a first half-waveplate lens, a second waveplate lens (L2/HWP2) 1308, e.g., a second half-waveplate lens, and a switchable waveplate (HWP3) 1312, e.g., a switchable half waveplate.

In various embodiments, each of the L1/HWP1 1304 and L2/HWP2 1308 is configured to serve as a lens and a half waveplate. As described above with respect to FIGS. 12A and 12B, when configured as a half-waveplate, each of the L1/HWP1 1304 and L2/HWP2 1308 is configured to convert light having a circular polarization of first handedness (first HCP) to light having a circular polarization of second handedness (second HCP). That is, each of the L1/HWP1 1304 and L2/HWP2 1308 is configured to convert light passing therethrough from light having LHCP or RHCP, and to convert light having RHCP or LHCP, respectively.

In various embodiments, each of the L1/HWP1 1304 and L2/HWP2 1308 is configured to serve as a lens, for a given polarization, having a first lensing effect or a second lensing effect opposite the second lensing effect. That is, each of the L1/HWP1 1304 and L2/HWP2 1308 is configured to either converge or diverge light passing through. In various embodiments, each of the L1/HWP1 1304 and L2/HWP2 1308 may be configured to have opposite lensing effects depending on the polarization state of the incident light. For example, each of the L1/HWP1 1304 and L2/HWP2 1308 may be configured to focus light incident thereon having a first HCP while being configured to defocus light incident thereon having a second HCP.

In some embodiments, the L1/HWP1 1304 and L2/HWP2 1308 are configured to have the same lensing effect for light having a given HCP. That is, both of the L1/HWP1 1304 and L2/HWP2 1308 may be configured to focus light having LHCP, focus light having RHCP, defocus light having LHCP or defocus light having RHCP.

In some embodiments, each of the L1/HWP1 1304 and L2/HWP2 1308 may comprise liquid crystal molecules that are elongated and rotated such that liquid crystals at a given radius from a central axis of the respective waveplate lenses 1304, 1308 have the same angle ($\phi$) of rotation, as described above with respect to FIGS. 12A and 12B. Each of the first and second waveplate lenses 1304, 1308 is configured to alter a polarization state, e.g., invert a polarization state, of light passing therethrough. The switchable waveplate 1312 is configured to alter a polarization state, e.g., invert a polarization state, of light passing therethrough when electrically activated, while being configured to substantially pass light without altering the polarization state of light passing therethrough when deactivated. The electrical signal, e.g., a current signal or a voltage signal, for switching the switchable waveplate 1312 may be provided by a switching circuit 1316 electrically connected thereto.

In various embodiments, when activated, e.g., electrically activated using a voltage or a current signal provided by the switching circuit 1316, the HWP3 1312B (FIG. 13C) serves as a half waveplate. That is, when activated, the HWP3 1312B (FIG. 13C) serves as a half waveplate configured to convert light passing therethrough from light having LHCP or RHCP to light having RHCP or LHCP, respectively. Thus, each of the L1/HWP1 1304, the L2/HWP2 1308, and the HWP3 1312B when activated (FIG. 13C) is configured to convert light having a circular polarization of first handedness (first HCP) to light having a circular polarization of second handedness (second HCP).

In various embodiments, when deactivated, e.g., electrically deactivated using a voltage or a current signal provided by the switching circuit 1316, e.g., by removing the voltage or the current signal, the HWP3 1312A (FIG. 13B) serves as transmitting medium for light without affecting the polarization or providing any lensing effect.

In some embodiments, a single waveplate lens 1304 and/or 1308 may function both as a waveplate lens and as a switchable half waveplate. In such embodiments, the dedicated switchable half waveplate 1312 may be omitted.

FIG. 13B illustrates an example of the adaptive lens assembly of FIG. 13A in operation with the switchable waveplate deactivated, according to some embodiments. The adaptive lens assembly 1300A may be deactivated when the switchable waveplate 1312 is deactivated, e.g., when no current or voltage is applied to the switchable waveplate 1312 by the switching circuit 1316. The adaptive lens assembly 1300A may correspond to the first adaptive lens assembly 1004 (on the world side) or the second adaptive lens assembly 1008 (on the user side). By way of example only, the adaptive lens assembly 1300A will be described as corresponding to the first adaptive lens assembly 1004 or the second adaptive lens assembly 1008, as part of the display device 1000 (FIG. 10) that is displaying the view of the real world to the user without displaying a virtual image. For example, the display device 1000 (FIG. 10) may be used as an ordinary eyeglass or an ordinary goggle. Each of the L1/HWP1 1304 and L2/HWP2 1308 may be configured to have a first lensing effect, e.g., diverging effect, on light having a first HCP, e.g., LHCP, passing therethrough. Each of the L1/HWP1 1304 and L2/HWP2 1308 may also be configured to have a second lensing effect opposite the first lensing effect, e.g., converging effect, on light having the opposite HCP, e.g., RHCP, passing therethrough.

In the illustrated embodiment, the light beam 1320 may represent light beam from the world that is incident on either the first adaptive lens assembly 1004 (on the world side) or the second adaptive lens assembly 1008 (on the user side) while the display device 1300A is being used as ordinary eyeglasses or a goggle, without displaying virtual content. By way of example only, the light beam 1320 having a first HCP, e.g., LHCP, travels, e.g., in a positive z-direction, until the beam 1320 impinges on the L1/HWP 1304, to be transmitted therethrough. The L1/HWP1 1304 converts the light beam 1320 having LHCP into a light beam 1324 having RHCP. Because the L1/HWP1 1304 is also configured as a lens, the L1/HWP1 1304 also diverges the light beam 1320 according to a first optical power P1 of the L1/HWP1 1304.

The light beam 1324 having RHCP is subsequently incident on the HWP3 1312A in the deactivated state. Because the HWP3 1312A is deactivated, the light beam 1324 having RHCP transmits through the HWP3 1312A without being substantially affected in terms of polarization or lensing effect, to be incident on the L2/HWP2 1308, as light beam 1328A having RHCP. As described above, when configured as an adaptive lens assembly on the user side (e.g., second adaptive lens assembly 1004 in FIG. 10), the L2/HWP2 1308 is configured similarly to L1/HWP1 1304 in the illustrated embodiment, i.e., to convert the polarization and to diverge light having LHCP while converging light having RHCP. Thus, the light beam 1328A having RHCP is converted back to light beam 1332 having LHCP. Thus, when HWP3 1312A is deactivated, the L1/HWP1 1304 and the L2/HWP2 1304 transmit light beams having opposite polarizations, such that the L1/HWP1 1304 and the L2/HWP2 1308 have opposite lensing effect on light passing therethrough. That is, because the light beam 1328A incident on the L2/HWP2 1304 has RHCP, the light beam 1332A exiting the L2/HWP2 1308 is converged according to a second optical power P2, unlike the light beam 1324 exiting the L1/HWP1 1304 that is diverged according to a first optical power P1. Thereafter, upon exiting the adaptive lens assembly 1300A in the deactivated state, the light beam 1332A may be viewed by the eye.

In some embodiments, when the HWP3 1312A is deactivated, the first optical power P1 of L1/HWP1 1304, which may be negative (i.e., diverging), and the second optical power P2 of L2/HWP2 1308, which may be positive (i.e., converging), may have substantially the same or matched magnitudes. In these embodiments, the net optical power Pnet of the adaptive lens assembly 1300A, which may be approximately P1+P2, may be substantially zero because of the compensation of the lensing effects of the L1/HWP1 1304 and the L2/HWP2 1308. However, embodiments are not so limited, and the first and second optical powers P1, P2 may have different magnitudes, such that the net optical power Pnet may have a nonzero value. For example, in some embodiments, the nonzero Pnet may be equal to an eyeglass prescription of the user, thereby allowing for corrections to focusing errors (e.g., refractive focusing errors) of the eyes of the user.

It will be appreciated that, while in the illustrated embodiment, the incident light beam 1320 has LHCP, a similar outcome would result when the incident light beam 1320 has RHCP. That is, when the light beam 1320 has RHCP, the light beams 1324 and 1328A have LHCP, and unlike the illustrated embodiment, the light beams 1324 and 1328A are converged relative to the light beam 1320. Likewise, the L2/HWP2 1308 diverges the light beam 1328A converged by the L1/HWP1 1304, such that the net optical power Pnet may be substantially zero.

It will be appreciated that the lensing effects of the L1/HWP1 1304 and L2/HWP2 1308 and the selectivity of the lensing effects to the polarization state of incident light beams described above with respect to FIG. 13B serves as but one example, and other configurations are possible. For example, while in FIG. 13B, the L1/HWP1 1304 and L2/HWP2 1308 is configured to diverge light having LHCP while converging light having RHCP, in other embodiments, the L1/HWP1 1304 and L2/HWP2 1308 may be configured to converge light having LHCP while diverging light having RHCP.

In summary, in some embodiments, when the HWP3 1312A of the adaptive lens assembly 1300A is in a deactivated state, the exiting light beam 1332A has the same HCP as the incident light beam 1320, and may be substantially matched to the incident light beam 1320 in terms of the lens effect because of the compensation of the lens effects between P1 of L1/HWP1 1304 and P2 of L2/HWP2 1308.

As a result, when the user is not viewing virtual content, the view of the world is relatively unaffected by the presence of the adaptive lens assemblies (1004, 1008 in FIGS. 10, 11A, 11B).

FIG. 13C illustrates an example of the adaptive lens assembly of FIG. 13A in operation with the switchable waveplate activated, according to some embodiments. The adaptive lens assembly 1300B may be activated when the switchable waveplate 1312B is activated, e.g., when a current or a voltage is applied to the switchable waveplate 1312B by the switching circuit 1316. The adaptive lens assembly 1300B may, e.g., correspond to the first adaptive lens assembly 1004 (on the world side) or the second adaptive lens assembly 1008 (on the user side). In the following, by way of example, the adaptive lens assembly 1300B will be first described as being configured as the second adaptive lens assembly 1008 on the user side, as part of the display device (e.g., display device 1100A in FIG. 11A) that is outputting virtual image to the user. Subsequently, the adaptive lens assembly 1300B will be described as being configured as the first adaptive lens assembly 1004 on the world side, as part of the display device 1100B (FIG. 11B) that is simultaneously transmitting the view of the real world while outputting the virtual image to the user, to reduce or essentially eliminate distortion of the view of the real world resulting from the lens effects of the second adaptive lens assembly 1008.

When configured as the second adaptive lens assembly 1008 on the user side (FIG. 11A), each of the L1/HWP1 1304 and L2/HWP2 1308 may be configured to diverge light having one of HCP, e.g., LHCP, passing therethrough. Each of the L1/HWP1 1304 and L2/HWP2 1308 may also be configured to converge light having the other HCP, e.g., RHCP, passing therethrough.

As described above with respect to FIG. 11A, some of the light propagating in the x-direction, e.g., by total internal reflection, within the waveguide assembly 1012 may be redirected, or out-coupled, in the z-direction. The light out-coupled from the waveguide assembly 1012 (FIG. 11A) may be incident on the switchable lens assembly 1300B as a circularly polarized light beam 1320 having LHCP. The light beam 1320 travels, e.g., in a positive z-direction, until the light beam 1320 impinges on the L1/HWP 1304, to be transmitted therethrough. The L1/HWP1 1304 converts the light beam 1320 having LHCP into a light beam 1324 having RHCP. Because the L1/HWP1 1304 is configured to diverge light having LHCP, the light beam 1324 is also diverged according to the first optical power P1 of the L1/HWP1 1304.

The light beam 1324 having RHCP is subsequently incident on the HWP3 1312B in the activated state. Unlike the deactivated HWP 1312A illustrated above with respect to FIG. 13B, because the HWP3 1312B is activated, the light beam 1324 having RHCP transmitting through the HWP3 1312B is converted to light beam 1328B having LCHP. Subsequently, the light beam 1328B having LHCP is incident on the L2/HWP2 1308. Because, unlike the light beam 1328A illustrated above with respect to FIG. 13B, the light beam 1328B incident on the L2/HWP2 1308 has LHCP, the L2/HWP2 1308 further diverges the light beam 1328B according to a second optical power P2 into light beam 1332B having RHCP. That is, unlike the deactivated state of HWP 1312A illustrated with respect to FIG. 13B, because the HWP 1312B is activated, L1/HWP1 1304 and the L2/HWP1 1304 are configured to transmit light beams having the same polarization, LHCP. Thus, unlike the L1/HWP1 1304 and the L2/HWP2 1308 having the compensating effect illustrated with respect to FIG. 13B, the L1/HWP1 1304 and the L2/HWP2 1308 in FIG. 13C have additive lensing effect on the light passing therethrough. That is, because the light beam 1320 incident on L1/HWP1 and the light beam 1328B incident on L2/HWP2 1304 both have LHCP, light beam 1332B exiting the L2/HWP2 1308 will be further diverged, in addition to being diverged by the L1/HWP1 1304. Thereafter, upon exiting the adaptive lens assembly 1300B in the activated state, the light beam 1332A may be viewed by the eye.

In some embodiments, the first optical power P1 of L1/HWP1 1304 and the second optical power P2 of L2/HWP2 1308 may both be negative (i.e., diverging) and may have substantially the same or matched magnitudes. In these embodiments, the net optical power Pnet of the adaptive lens assembly 1300B, which may be approximately P1+P2, may be substantially double that of P1 or P2 because of the additive lens effect of the combination of L1/HWP1 1304 and L2/HWP2 1308. However, embodiments are not so limited, and the first and second optical powers P1, P2 may have different magnitudes.

It will be appreciated that, while in the illustrated embodiment, the incident light beam 1320 has LHCP, parallel outcome will result when the incident light beam 1320 has RHCP. That is, when the light beam 1320 has RHCP, unlike the illustrated embodiment, the resulting light beam 1332B has LHCP and is converged by L1/HWP1 1304 and L2/HWP2 1308 according to a net optical power Pnet, which has a magnitude that is approximately a sum of the magnitudes of the first and second optical powers P1 and P2.

It will be appreciated that the lensing effects of the L1/HWP1 1304 and L2/HWP2 1308 and the dependence of the lensing effects on the polarization state of incident light beams described above with respect to FIG. 13C serves as but one example, and other configurations are possible. For example, while in FIG. 13B, the L1/HWP1 1304 and L2/HWP2 1308 are configured to diverge light having LHCP while converging light having RHCP, in other embodiments, the L1/HWP1 1304 and L2/HWP2 1308 may be oppositely configured to diverge light having LHCP while converging light having RHCP.

Consequently, in some embodiments, when the switchable half waveplate 1312B of the adaptive lens assembly 1300B is in an activated state, the exiting light beam 1332B has the opposite HCP relative to the incident light beam 1320, and may be diverged according to additive optical powers P1 of L1/HWP1 1304 and P2 of L2/HWP2 1308. As a result, when the user is viewing a virtual content, the virtual content is focused into the eye 210 according to a net optical power whose value is approximately Pnet=P1+P2.

In the above, the adaptive lens assembly 1300B in the activated state has been described when configured as the second adaptive lens assembly 1008 on the user side in the display device 1100A described supra with respect to FIG. 11A. As described supra with respect to FIG. 11B, however, activating the second adaptive lens assembly 1008 to display virtual content to the user's eye 210, without any compensating effect, may result in a defocusing or distortion of the view of the real world, which may be undesirable. Thus, it may be desirable to configure the first adaptive lens assembly 1004 on the world side to at least partially compensate or negate the lens effect of the second adaptive lens assembly 1008 when activated to display the virtual content.

Referring back to FIG. 13C, when configured as the first adaptive lens assembly 1004 (FIG. 11B) on the world side to negate the lens effect of the second adaptive lens assembly 1008 (FIG. 11B) on the user side, components of the adaptive lens assembly 1300B may be configured similarly as described supra with respect to FIG. 11B. That is, as light transmitted from the world 510 to the eye 210 traverses the first and second adaptive lens assemblies 1004, 1008, each may be configured as described above with respect to the adaptive lens assembly 1300B described with respect to FIG. 13C. In operation, as described above, the polarization of the light transmitted from the world through the first adaptive lens assembly 1004 is converted from a first polarization state to a second polarization state, e.g., from RHCP to LHCP. Subsequently, the polarization of the light transmitted through the second adaptive lens assembly 1008 is converted back from the second polarization state to the first polarization state, e.g., from LHCP to RHCP. Furthermore, as described above with respect to FIG. 11B, the light transmitted from the world through the first adaptive lens assembly 1004 undergoes a first lens effect, e.g., converging effect, according to a first net optical power Pnet1=P1+P2 having a first sign, e.g., positive sign. Subsequently, the light transmitted through the second adaptive lens assembly 1008 undergoes a second lens effect opposite to the first lens effect, e.g., diverging effect, according to a second net optical power Pnet2=P1'+P2' having a second sign, e.g., negative sign, because the light incident on the second adaptive lens assembly 1008 has an opposite polarization as the light incident on the first adaptive lens assembly 1004. When Pnet1 and Pnet2 have substantially similar magnitudes, the overall lens effect, approximated by P=Pnet1+Pnet2 may be substantially zero. As a result, when the user is viewing virtual content by activating the second lens assembly 1008, as well as viewing real objects in the surrounding world, the view of the world is relatively unaffected by the compensating effect of the first lens assembly 1004.

In various embodiments, when activated, each of the first and second adaptive lens assemblies 1004, 1008 may provide a net optical power (positive or negative) in the range between about ±5.0 diopters and 0 diopters, ±4.0 diopters and 0 diopters, ±3.0 diopters and 0 diopters, ±2.0 diopters and 0 diopters, ±1.0 diopters and 0 diopters, including any range defined by these values, for instance ±1.5 diopters.

Figure 14A:
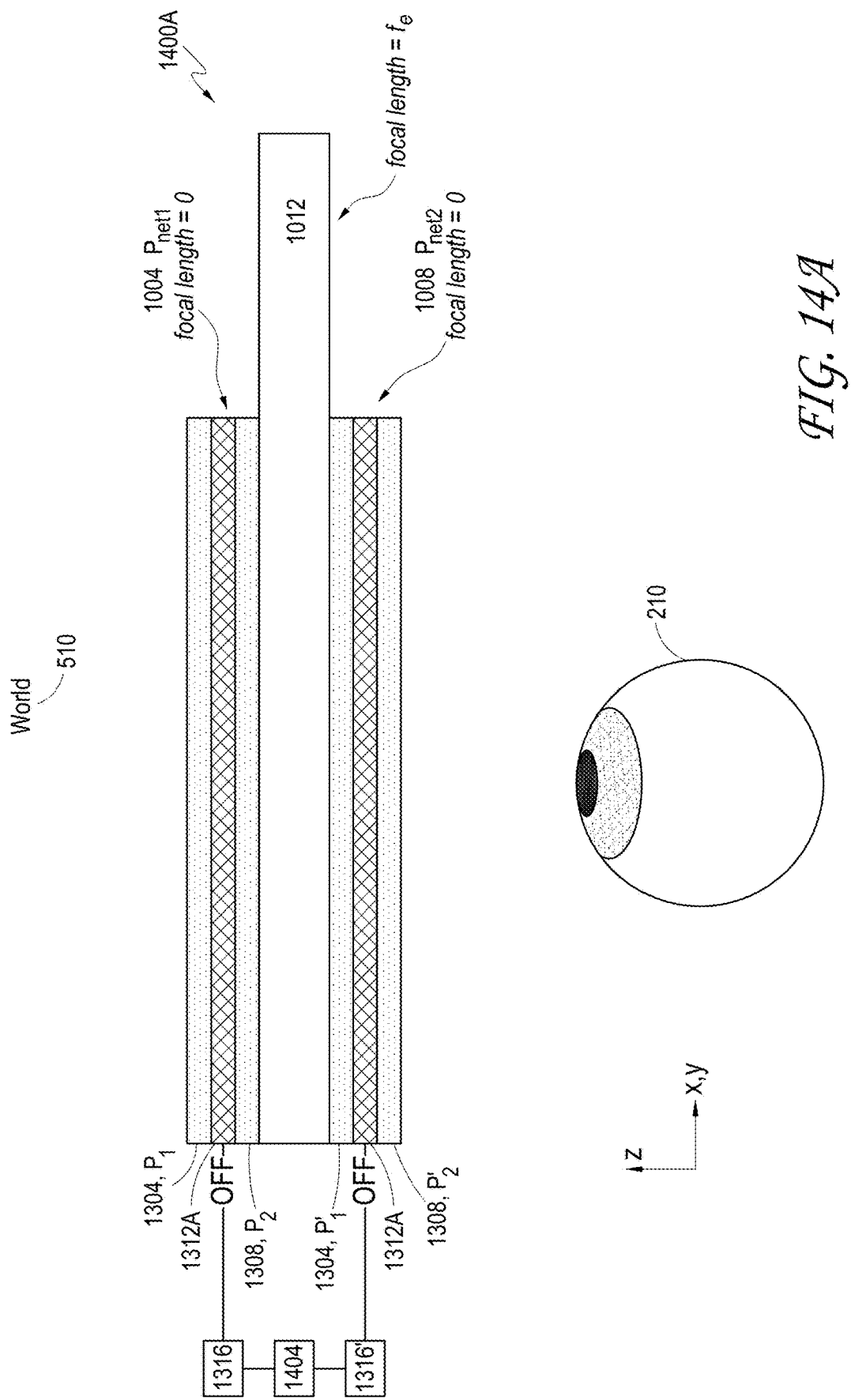
FIG. 14A illustrates an example of a display device comprising a pair of adaptive lens assemblies each comprising waveplate lenses and a switchable waveplate, in operation with the switchable waveplate deactivated.
Figure 14B:
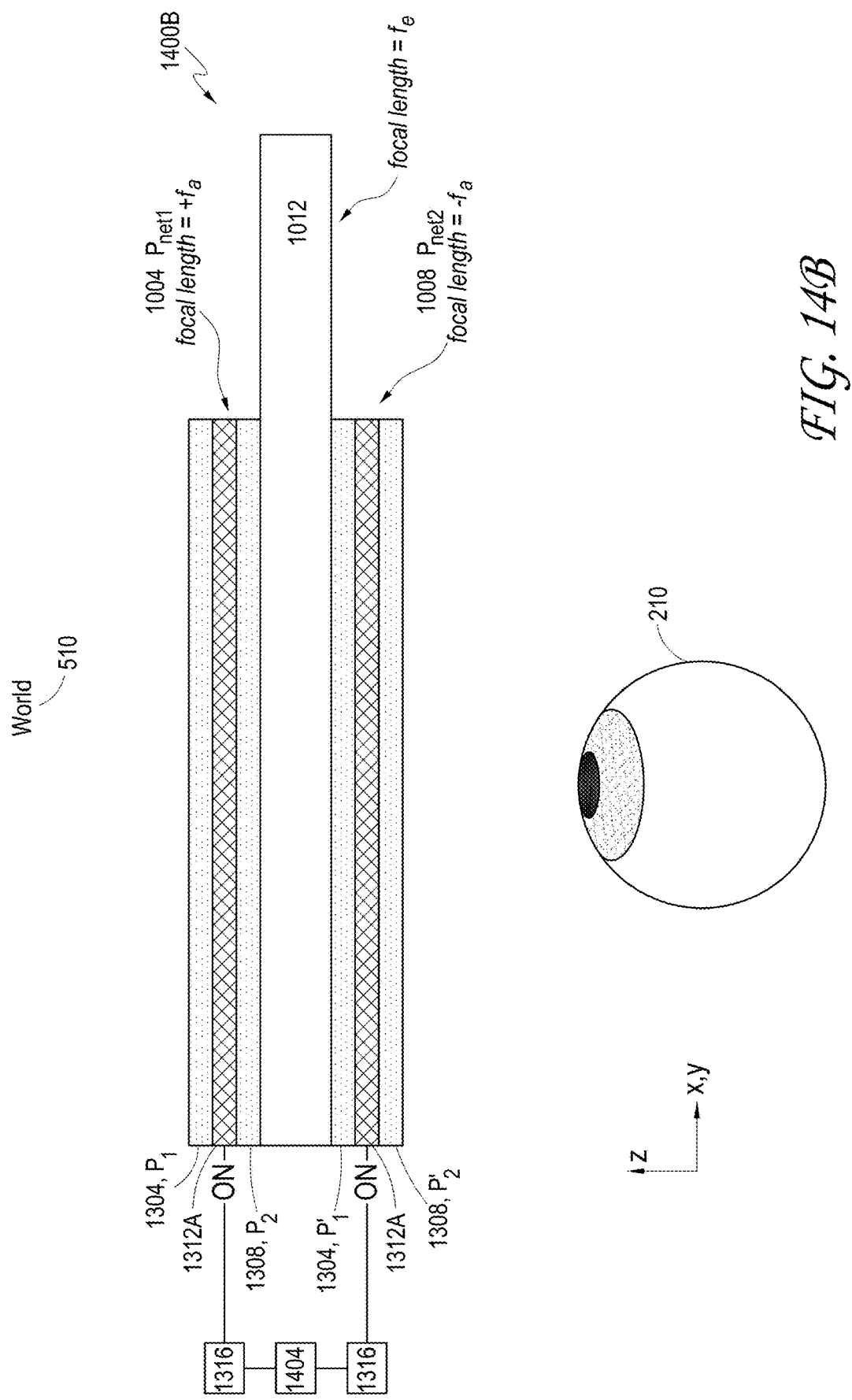
FIG. 14B illustrates an example of the display device of FIG. 14A, in operation with the switchable waveplate activated.

Display Devices Including Adaptive Lens Assemblies Having a Switchable Half Waveplate and Waveplate Lenses FIGS. 14A and 14B illustrate example display devices 1400A/1400B, each including a waveguide assembly 1012 interposed between a first adaptive lens assembly 1004 and a second adaptive lens assembly 1008. The display device 1400A is similar to the display device 1100A/1100B described above with respect to FIG. 11A/11B, where each of the first and second adaptive lens assemblies 1004, 1008 comprises a first waveplate lens (L1/HWP1) 1304, e.g., a first half-waveplate lens, a second waveplate lens (L2/HWP2) 1308, e.g., a second half-waveplate lens, and a switchable waveplate (HWP3) 1312, e.g., a switchable half waveplate.

Referring to FIG. 14A, the display device 1400A in operation is described, when the first and second adaptive lens assemblies 1004, 1008 described above with respect to FIG. 13A are both deactivated. The first and second adaptive lens assemblies 1004, 1008 may be deactivated when the switchable waveplate 1312 (FIG. 13A) is deactivated, e.g., when no current or voltage is applied to the switchable waveplate 1312 by the switching circuits 1316, 1316'. As configured, the display device 1400A may be configured for, e.g., displaying the real world view to the user, without displaying a virtual image. For example, the display device 1400A may be configured to be used as an ordinary eyeglass or an ordinary goggle, as described in detail with respect to FIG. 13B. Similar to FIG. 13A, each of first and second adaptive lens assemblies 1004, 1008 include a first waveplate lens (L1/HWP1) 1304, e.g., a first half-waveplate lens, a second waveplate lens (L2/HWP2) 1308, e.g., a second half-waveplate lens, and a switchable waveplate (HWP3) 1312, e.g., a switchable half waveplate. As described with respect to FIG. 13A, each of L1/HWP1 1304 and L2/HWP2 1308 may be configured to have a first lensing effect, e.g., diverging effect, on light having a first HCP, e.g., LHCP, passing therethrough. In addition, each of the L1/HWP1 1304 and L2/HWP2 1308 may also be configured to have a second lensing effect opposite the first lensing effect, e.g., converging effect, on light having the opposite HCP, e.g., RHCP, passing therethrough. When activated, e.g., electrically activated using a voltage or a current signal provided by the switching circuit 1316, 1316', the HWP3 1312B (FIG. 13C) serves as a waveplate, e.g., a half waveplate. As described above with respect FIG. 13C, when activated, the HWP3 1312B (FIG. 13C) serves as a half waveplate configured to convert light passing therethrough from light having LHCP or RHCP to light having RHCP or LHCP, respectively. On the other hand, when deactivated, e.g., electrically deactivated using a voltage or a current signal provided by the switching circuit 1316, 1316', e.g., by removing the voltage or the current signal, the HWP3 1312A (FIG. 13B) serves as transmitting medium for light without affecting the polarization. The detailed operational principles of the first and second adaptive lens assemblies 1004, 1008 that include the L1/HWP1 1304, L2/HWP2 1308 and HWP3, 1312A have been provided above with respect to FIGS. 13A and 13B, and are omitted herein.

Based on the operational principles described in detail with respect to FIGS. 13A and 13B, when the first and second adaptive lens assemblies 1004, 1008 are in a deactivated state, the light beam (e.g., 1332A in FIG. 13B) exiting from each of the first and second adaptive lens assemblies 1004, 1008, has the same HCP as the light beam incident thereon (e.g., 1320 in FIG. 13B). In addition, the incident light beam 1320 and the exiting light beam 1332A may be substantially matched in terms of the magnitudes of the lens power because of the compensation of the net optical powers of the first and second lens assemblies 1004, 1008, as described above with respect to FIG. 13B.

FIG. 14B illustrates an example of the display device of FIG. 14A, in operation with the switchable waveplate activated, according to some embodiments. The first and second adaptive lens assemblies 1004, 1008 by activating the respective switchable waveplates 1312 (FIG. 13A), e.g., by applying current or voltage to the switchable waveplate 1312 using the switching circuit 1316, 1316'. In the following, the operation of the display device 1400B that is outputting a virtual image to the user, while also transmitting light from an object in the real world with reduced or essentially eliminated distortion resulting from the lens effects of the adaptive lens assemblies 1004, 1008, is described.

When displaying a virtual image, as described above with respect to FIGS. 11A and 13C, some of the light propagating in the x-direction within the waveguide within the waveguide assembly 1012 may be redirected, or outcoupled, in the z-direction. The light beam 1320 travels, e.g., in a positive z-direction, until the light beam 1320 impinges on the L1/HWP 1304 of the second adaptive lens assembly 1008. Based on the operational principles of the second adaptive lens assembly 1008 described above with respect to FIG. 13C, when the second adaptive lens assembly 1008 is in an activated state, the exiting light beam (e.g., 1332B in FIG. 13C) has the opposite HCP as the incident light beam (e.g., 1320 in FIG. 13C), and is diverged according to the second net optical power Pnet2, for displaying the virtual content at a corresponding virtual depth plane.

In various embodiments, when activated, each of the first and second adaptive lens assemblies 1004, 1008 may provide a net optical power (positive or negative) in the range between about ±5.0 diopters and 0 diopters, ±4.0 diopters and 0 diopters, ±3.0 diopters and 0 diopters, ±2.0 diopters and 0 diopters, ±1.0 diopters and 0 diopters, including any range defined by these values, for instance ±1.5 diopters. In some embodiments, the first adaptive lens assembly 1004 between the waveguide assembly 1012 and the world may have a positive optical power, whereas the second adaptive lens assembly 1008 between the waveguide assembly 1012 and the user may have a negative optical power, such that the optical powers of the first and second switchable assemblies 1004, 1008 compensate each other in viewing the world.

Consequently, still referring to FIGS. 14A and 14B, the display device 1400A/1400B comprise a pair of adaptive lens assemblies 1004, 1008 in the optical path between the world 510 and the eye 210, where each of the pair of adaptive lens assemblies 1004, 1008 comprises a switchable waveplate (e.g., 1312A/1312B in FIGS. 13A/13B) configured to alter a polarization state of light passing therethrough when electrically activated. When electrically activated, the pair of adaptive lens assemblies have net optical powers (Pnet 1, Pnet2) having opposite signs such that light passing through the pair of adaptive lens assemblies converges or diverges according to a combined optical power having a magnitude that is about a difference between magnitudes of optical powers the pair of adaptive lens assemblies. The virtual content may be observed by the user at a depth plane according to Pnet2, which may be negative, while the view of the world is relatively unaffected by Pnet2 that is at least partially compensated by Pnet, which may be positive.

In some embodiments, each of the pair of adaptive lens assemblies has a respective net optical power (Pnet1, Pnet2) that is electrically adjustable or tunable to one of a plurality of values using the switching circuit 1316, 1316'. As described supra, as the images of virtual objects produced by light outcoupled by the waveguide assembly 1012 move in 3D, the second net optical power (Pnet2) of the second adaptive lens assembly 1008 on the user side is adjusted to adapt to the changing depth of the virtual depth plane. Simultaneously, according to embodiments, the first net optical power (Pnet1) of the first adaptive lens assembly 1004 is correspondingly adjusted using the switching circuit 1316, 1316', such that the view of the real world does not undesirably become defocused or distorted. To address this and other needs, in some embodiments, the display device 1400A/1400B comprises a controller 1404 configured such that, when the first net optical power (Pnet1) of a first one of the pair of adaptive lens assemblies 1004, 1008 is electrically adjusted, a second optical power (Pnet2) of a second one of the pair of adaptive lens assemblies is correspondingly adjusted, such that the combined optical power (Pnet1+Pnet2) remains about constant, e.g., about zero. The controller circuitry and the switchable waveplate 1312 are configured such the time to switch the first and second net optical powers Pnet, Pnet2, to adjust the virtual depth planes using the second adaptive lens assembly 1008 and to compensate the real world view using the first adaptive lens assembly 1004 as described herein, is less than about 100 milliseconds, less than about 50 milliseconds, less than about less than about 10 milliseconds, less than about 5 milliseconds, less than about 1 millisecond, or a value within a range defined by any of these values. As mentioned above with reference to FIG. 13B, in some embodiments, a single waveplate lens may function both as a waveplate lens and as a switchable half waveplate. For example, a single, integrated optical element may be configured to impart a selectively switchable polarization to light passing therethrough, and further impart optical power to light passing therethrough in accordance with a waveplate lens function. Similarly, in some embodiments, the first and second adaptive lens assemblies 1004 and 1008 of FIGS. 14A and 14B may each take the form of a single, integrated optical element that provides the functionality of the first waveplate lens 1304 and/or the second waveplate lens 1308, as well as the switchable waveplate 1312.

Still referring to FIGS. 14A and 14B, as discussed above with reference to FIG. 10, optical properties that can be adjusted by each of first and second adaptive lens assemblies 1004, 1008 may include, among other properties, polarization and polarization-selectivity. In some implementations, one or both of first and second adaptive lens assemblies 1004, 1008 may include or be positioned adjacent to at least one polarization selective turning element (e.g., polarizer) for blocking or otherwise filtering out certain unwanted components of light passing therethrough toward the eye 210 from the world 510 and optionally also from the waveguide assembly 1012. For example, in such implementations, the display device 1400A/1400B may include a polarization selective turning element interposed between the waveguide assembly 1012 and the first waveplate lens (L1/HWP1) 1304 of the second adaptive lens assembly 1008, a polarization selective turning element interposed between the second waveplate lens (L2/HWP2) 1308 of the second adaptive lens assembly 1008 and eye 210, or both. Furthermore, alternatively or additionally, in some of such implementations, the display device 1400A may include a polarization selective turning element interposed between the waveguide assembly 1012 and the second waveplate lens (L2/HWP2) 1308 of the first adaptive lens assembly 1004, a polarization selective turning element interposed between the first waveplate lens (L1/HWP1) 1304 of the first adaptive lens assembly 1004 and the world 510, or both. The polarization selective turning element include one or more polarization gratings, diffractive optical elements, and/or holographic optical elements and may comprise liquid crystal structures such as liquid crystal polarization gratings. In some embodiments, the waveguide assembly 1012 may be configured to outcouple polarized light.

Figure 15:
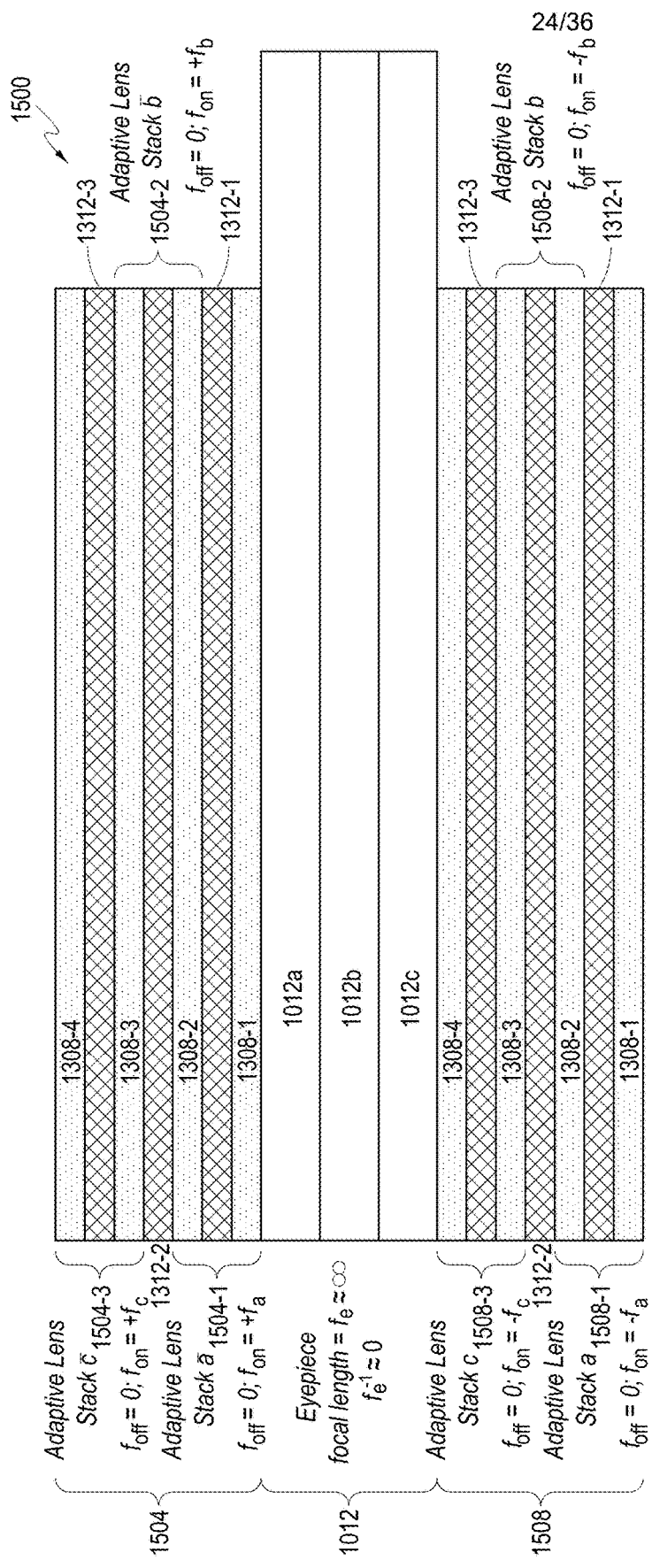
FIG. 15 illustrates an example of a display device comprising a pair of adaptive lens assemblies each comprising alternatingly stacked waveplate lenses and switchable waveplates.
Figure 15:
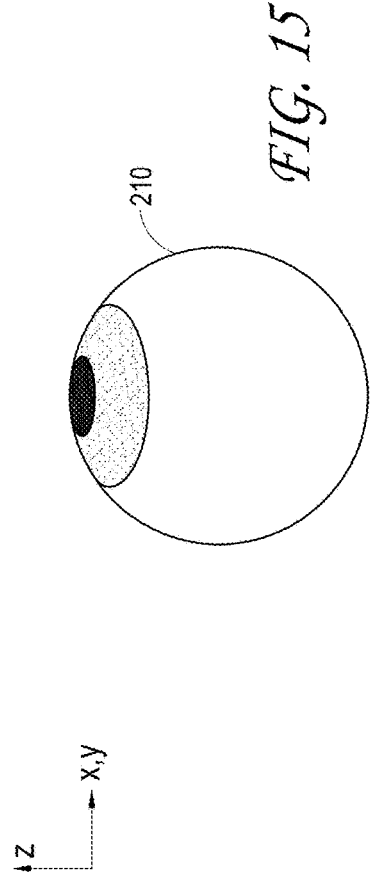

FIG. 15 illustrates an example of a display device comprising a pair of adaptive lens assemblies each comprising alternatingly stacked waveplate lenses and switchable waveplates, according to some embodiments. The display device 1500A is similar to the display device 1400A/1400B described above with respect to FIGS. 14A and 14B, except, each of the first and second adaptive lens assemblies 1504, 1508 comprises a plurality of waveplate lenses, e.g., first to fourth waveplate lenses 1308-1, 1308-2, 1308-3, 1308-4, each of which may be a half-waveplate lens, that are alternatingly stacked with a plurality of switchable waveplates, e.g., first to third switchable waveplates 1312-1, 1312-2, 1312-3, each of which may be a switchable half waveplate. In some implementations, the waveguide assembly 1012 may include a stack of waveguides 1012a, 1012b, and 1012c, which may correspond to waveguides configured for providing component color images by incoupling and subsequently outcoupling, e.g., red, green and blue light, respectively, in any suitable order. Each of the plurality of switchable waveplates 1312 may be independently activated using a switching circuit 1316, 1316' (FIGS. 14A/14B). Electrically activating different ones of switchable waveplates diverges or converges the light passing through the adaptive lens assembly according to different net optical powers having magnitudes that are about sums of magnitudes of optical powers of immediately adjacent waveplate lenses interposed by the different ones of switchable waveplates.

Advantageously, by selectively activating one or more of the switchable waveplates 1312-1, 1312-2, 1312-3, one or more of substacks 1504-1, 1504-2, 1504-3, may be selected, respectively, to serve as one or more adaptive lens subassemblies, where each substack comprises one of the switchable waveplates 1312-1, 1312-2, 1312-3 and a pair of immediately adjacent waveplate lenses. For example, when the first switchable waveplate 1312-1 is activated, the first substack 1504-1 comprising the first and second waveplate lenses 1308-1, 1308-2, and the first waveplate lens 1312-1 serves as an adaptive lens subassembly, in a similar manner as described above with respect to FIG. 13C. In addition, as described above with respect to FIG. 13B, when a switchable waveplate (1312A in FIG. 13B) is deactivated, the corresponding adaptive lens assembly 1300A comprising first and second waveplates 1304, 1308, interposed by the switchable waveplate 1312A may be configured to substantially pass light without providing a net converges, divergence, or alteration of the polarization. Thus, when one or more of the switchable waveplates 1312-1, 1312-2, 1312-3 are activated, corresponding one or more of the substacks 1504-1, 1504-2, 1504-3 serve as an adaptive lens subassembly, while the others of the substacks 1504-1, 1504-2, 1504-3 do not substantially affect the light passing therethrough. Furthermore, by activating corresponding ones of the switchable waveplates 1312-1, 1312-2, 1312-3 on opposite sides of the waveguide assembly 1012 in the first and second adaptive lens assemblies 1504, 1508, the first and second net optical powers of the first and second switchable waveplate lens assemblies 1504, 1508, may be compensated, in a similar manner as described above with respect to FIGS. 14A and 14B. For example, a controller may be configured such that, when one of the switchable waveplates 1312-1, 1312-2, 1312-3 in the first adaptive lens assembly 1504 is activated such that the first adaptive lens assembly 1004 has a first net optical power (Pnet1), a corresponding one of the switchable waveplates 1312-1, 1312-2, 1312-3 in the second adaptive lens assembly 1508 is activated such that the second adaptive lens assembly 1008 has a first net optical power (Pnet2), where the combined optical power (Pnet1+Pnet2) remains about constant, e.g., about zero.

Advantageously, by selecting different ones of one or more of the substacks 1508-1, 1508-2, 1508-3 in the second adaptive lens assembly 1508, virtual images at different depth planes may be displayed to a user, and by additionally selecting different corresponding pairs of substacks 1504-1, 1504-2, 1504-3 in the first adaptive lens assembly 1504, defocusing or distortion of real world images that may result from the optical powers of the substacks 1508-1, 1508-2, 1508-3 may be compensated or reduced. As mentioned above with reference to FIGS. 14A and 14B, in some embodiments, a single waveplate lens may function both as a waveplate lens and as a switchable half waveplate. Similarly, in some embodiments, one or more of substacks 1504-1, 1504-2, 1504-3, 1508-1, 1508-2, and 1508-3 may each take the form of a single, integrated optical element that provides the functionality of the respective first and/or second waveplate lenses, as well as the respective switchable waveplate.

Still referring to FIG. 15, in an analogous manner as discussed above with reference to FIGS. 14A and 14B, in some implementations, one or both of first and second adaptive lens assemblies 1504, 1508 may include or be positioned adjacent to at least one polarization selective turning element (e.g., polarizer) for blocking or otherwise filtering out certain unwanted components of light passing therethrough toward the eye 210 from the world 510 and optionally also from the waveguide assembly 1012. For example, in such implementations, the display device 1500 may include a polarization selective turning element interposed between the waveguide assembly 1012 and the fourth waveplate lens (L1/HWP1) 1308-4 of the second adaptive lens assembly 1508, a polarization selective turning element interposed between the first waveplate lens 1308-1 of the second adaptive lens assembly 1508 and eye 210, or both. Furthermore, alternatively or additionally, the display device 1500 may include a polarization selective turning element interposed between the waveguide assembly 1012 and the first waveplate lens 1308-1 of the first adaptive lens assembly 1504, a polarization selective turning element interposed between the fourth waveplate lens 1308-4 of the first adaptive lens assembly 1204 and the world 510, or both. The polarization selective turning element may include one or more polarization gratings, diffractive optical elements, and/or holographic optical elements and may comprise liquid crystal structures such as liquid crystal polarization gratings. In some embodiments, the waveguide assembly 1012 may be configured to outcouple polarized light.

Figure 16:
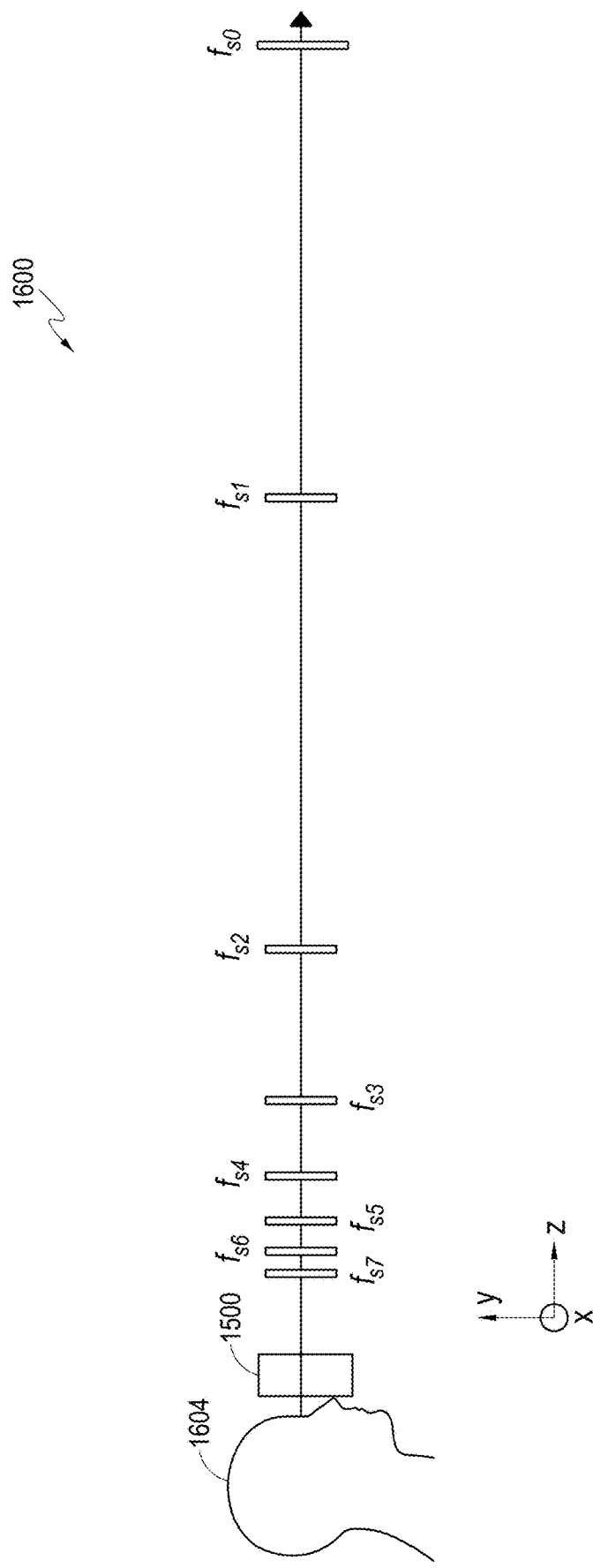
FIG. 16 illustrates an example of a plurality of virtual depth planes that may be generated using the display device of FIG. 15.

FIG. 16 schematically illustrates an example of a default virtual depth of image fs0 and first to sixth virtual image depths fs1-fs6 that may be selected for a user 1604, by selecting one or more of substacks 1508-1, 1508-2, 1508-3 in the second adaptive lens assembly 1508 in the display device illustrated above with respect to FIG. 15, as described below in detail with respect to FIGS. 17A-17H. In addition, a selected one of the substacks 1508-1, 1508-2, 1508-3 in the second adaptive lens assembly 1508 is paired with a corresponding substack one of the substacks 1504-1, 1504-2, 1504-3 in the first adaptive lens assembly 1504, such that undesirable defocusing or distortion of the views of the real world is reduced or minimized.

Figure 17A:
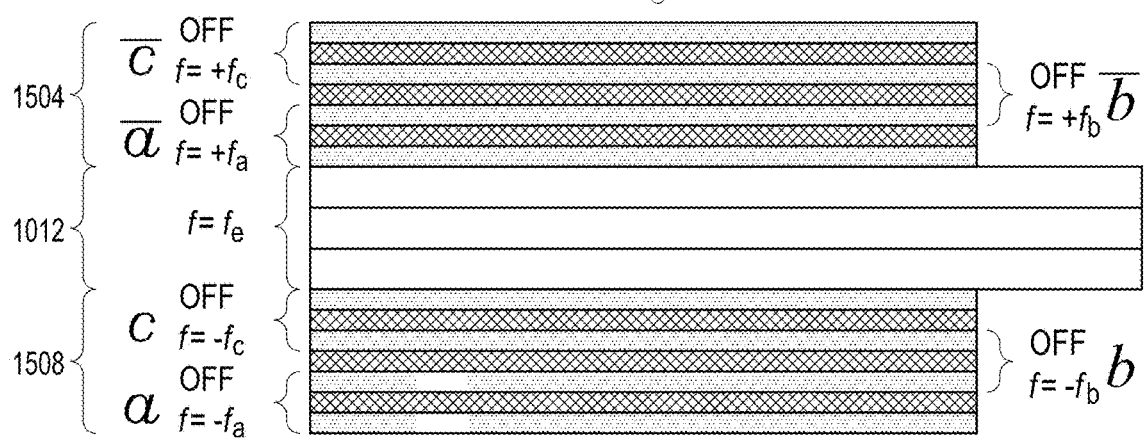
FIGS. 17A-17H illustrates an example of the display device of FIG. 15 under various configurations for generating the plurality of virtual depth planes illustrated in FIG. 15.
Figure 17A:

FIG. 17A illustrates an example of a zeroth state 1500A of the display device 1500 illustrated in FIG. 15, in which no substack is selected in either of the first and second adaptive lens assemblies 1504, 1508. In this state, none of the substacks 1508-1, 1508-2, 1508-3 substantially converge or diverge light outcoupled from the waveguide assembly 1012 prior to being focused into the eye. A virtual image may be displayed at a default depth of image fs0. In some examples, displaying an image at the default depth of image fs0 may be equivalent to displaying the image at a focal length having infinite or close to infinite values (e.g., fs0 may be optical infinity, which may have advantages for conserving resources by allowing content in a large portion of the field of view encompassed by optical infinity to be displayed without requiring activation of the switchable waveplates of the first and second adaptive lens assemblies 1504, 1508).

Figure 17B:
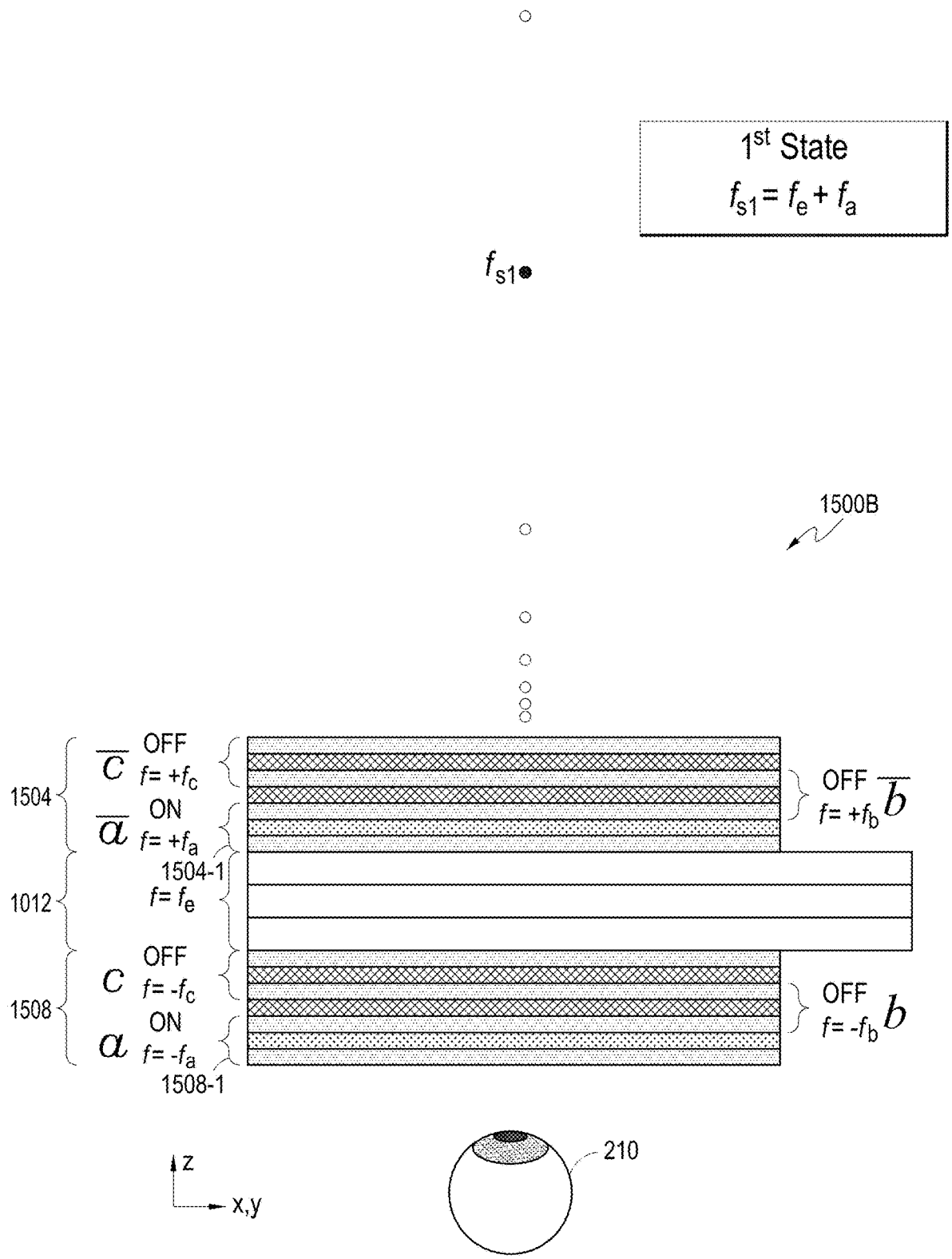

FIG. 17B illustrates an example of a first state 1500B of the display device 1500 illustrated in FIG. 15, in which a first substack 1508-1 is selected in the second adaptive lens assembly 1508 by activating the first switchable waveplate 1312-1 of the first substack 1508-1, such that the virtual image generated by focusing the light outcoupled from waveguide assembly 1012 is displayed to the eye 210 at a first image depth fs1 closer to the eye 210 than the default image depth fs0, resulting from a negative optical power of the first substack 1508-1. To compensate for defocusing of real world images resulting therefrom, a corresponding first substack 1504-1 is selected in the first adaptive lens assembly 1508 by activating the first switchable waveplate 1312-1 of the first substack 1504-1, such that undesirable defocusing of real world views is reduced or minimized, according to a compensated difference in net optical powers of the first and second adaptive lens assemblies 1504, 1508.

Figure 17C:
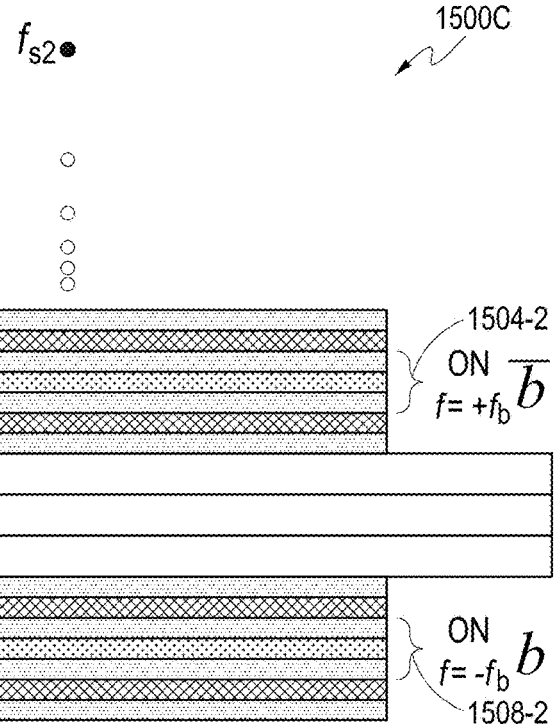
Figure 17C:

FIG. 17C illustrates an example of a second state 1500C of the display device 1500 illustrated in FIG. 15, in which a second substack 1508-2 is selected in the second adaptive lens assembly 1508 by activating the second switchable waveplate 1312-2 of the second substack 1508-2, such that the virtual image generated by focusing the light outcoupled from waveguide assembly 1012 is displayed to the eye 210 at a second image depth fs2 closer to the eye 210 than the first image depth fs1, resulting from a negative optical power of the second substack 1508-2. To compensate for defocusing of real world images resulting therefrom, a corresponding second substack 1504-2 is selected in the first adaptive lens assembly 1508 by activating the second switchable waveplate 1312-2 of the first substack 1504-1, such that undesirable defocusing of real world views is reduced or minimized according to a difference in net optical powers of the first and second adaptive lens assemblies 1504, 1508.

Figure 17D:
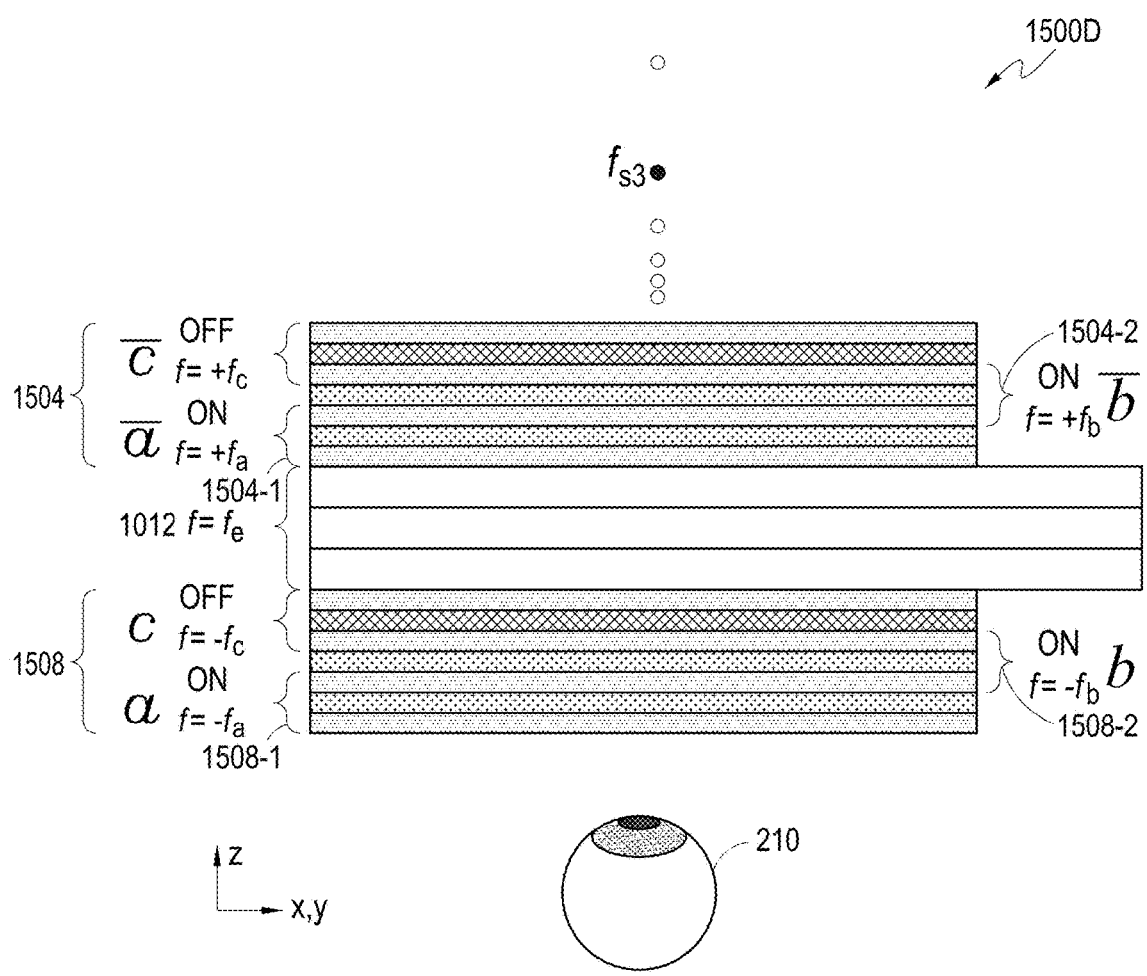

FIG. 17D illustrates an example of a third state 1500D of the display device 1500 illustrated in FIG. 15, in which a plurality of substacks, i.e., first and second substacks 1508-1, 1508-2 are selected in the second adaptive lens assembly 1508 by activating the first and second switchable waveplates 1312-1, 1312-2 of the first and second substacks 1508-1, 1508-2, such that the virtual image generated by focusing the light outcoupled from waveguide assembly 1012 is displayed to the eye 210 at a third image depth fs3 closer to the eye 210 than the second image depth fs2, resulting from combined negative optical powers of the first and second substacks 1508-1, 1508-2. To compensate for defocusing of real world images resulting therefrom, corresponding first and second substacks 1504-1, 1504-2 are selected in the first adaptive lens assembly 1508 by activating the first and second switchable waveplates 1312-1, 1312-2 of the first and second substacks 1504-1, 1504-2, such that undesirable defocusing of real world images is reduced or minimized according to a compensated difference in net optical powers of the first and second adaptive lens assemblies 1504, 1508.

Figure 17E:
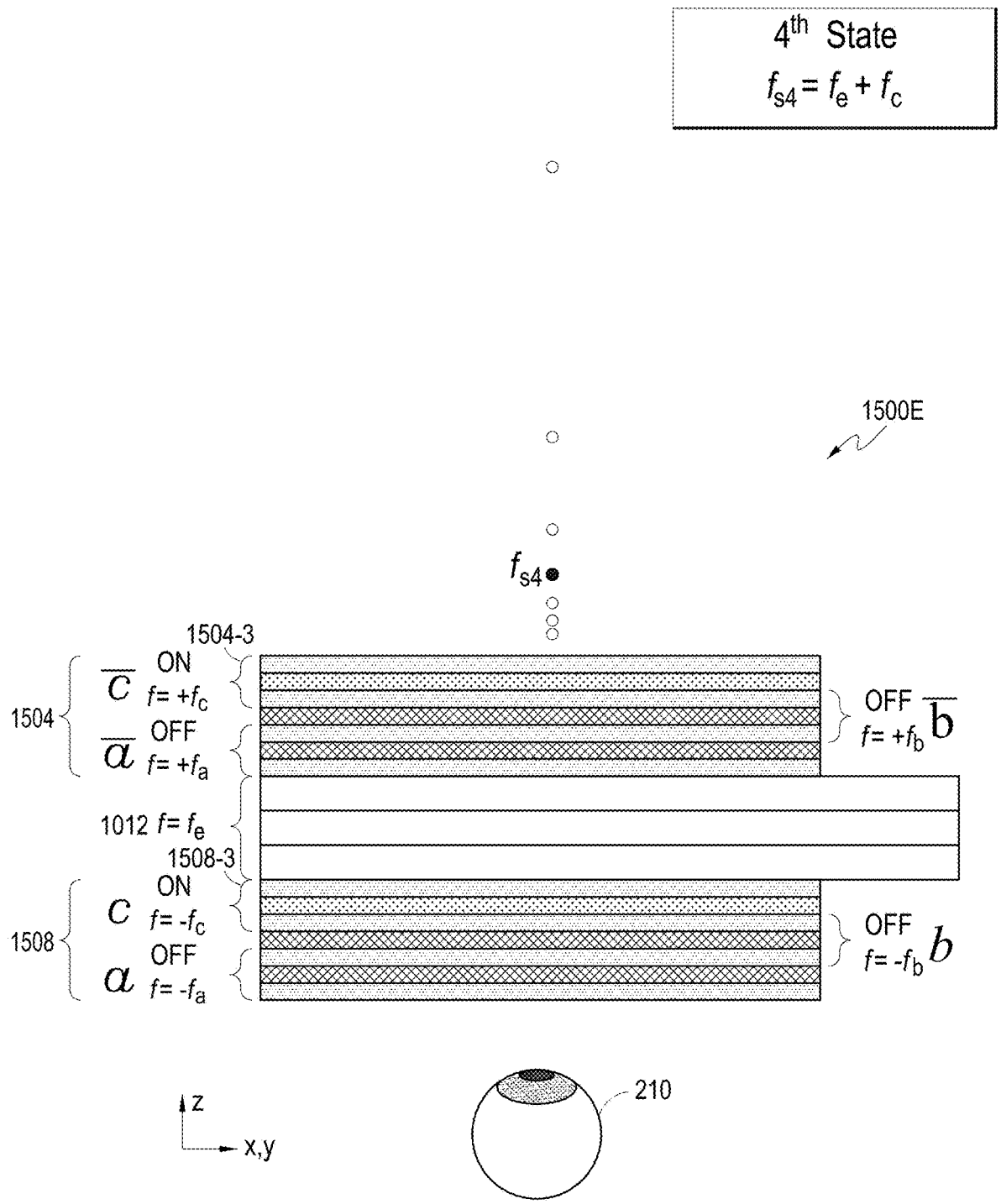

FIG. 17E illustrates an example of a fourth state 1500E of the display device 1500 illustrated in FIG. 15, in which a third substack 1508-3 is selected in the second adaptive lens assembly 1508 by activating the third switchable waveplate 1312-3 of the second substack 1508-2, such that the virtual image generated by focusing the light outcoupled from waveguide assembly 1012 is displayed to the eye 210 at a fourth image depth fs4 closer to the eye 210 than the third image depth fs3, resulting from a negative optical power of the third substack 1508-3. To compensate for defocusing of real world images resulting therefrom, a corresponding third substack 1504-3 is selected in the first adaptive lens assembly 1508 by activating the third switchable waveplate 1312-2 of the third substack 1504-3, such that undesirable defocusing of real world images is reduced or minimized according to a difference in net optical powers of the first and second adaptive lens assemblies 1504, 1508.

Figure 17F:
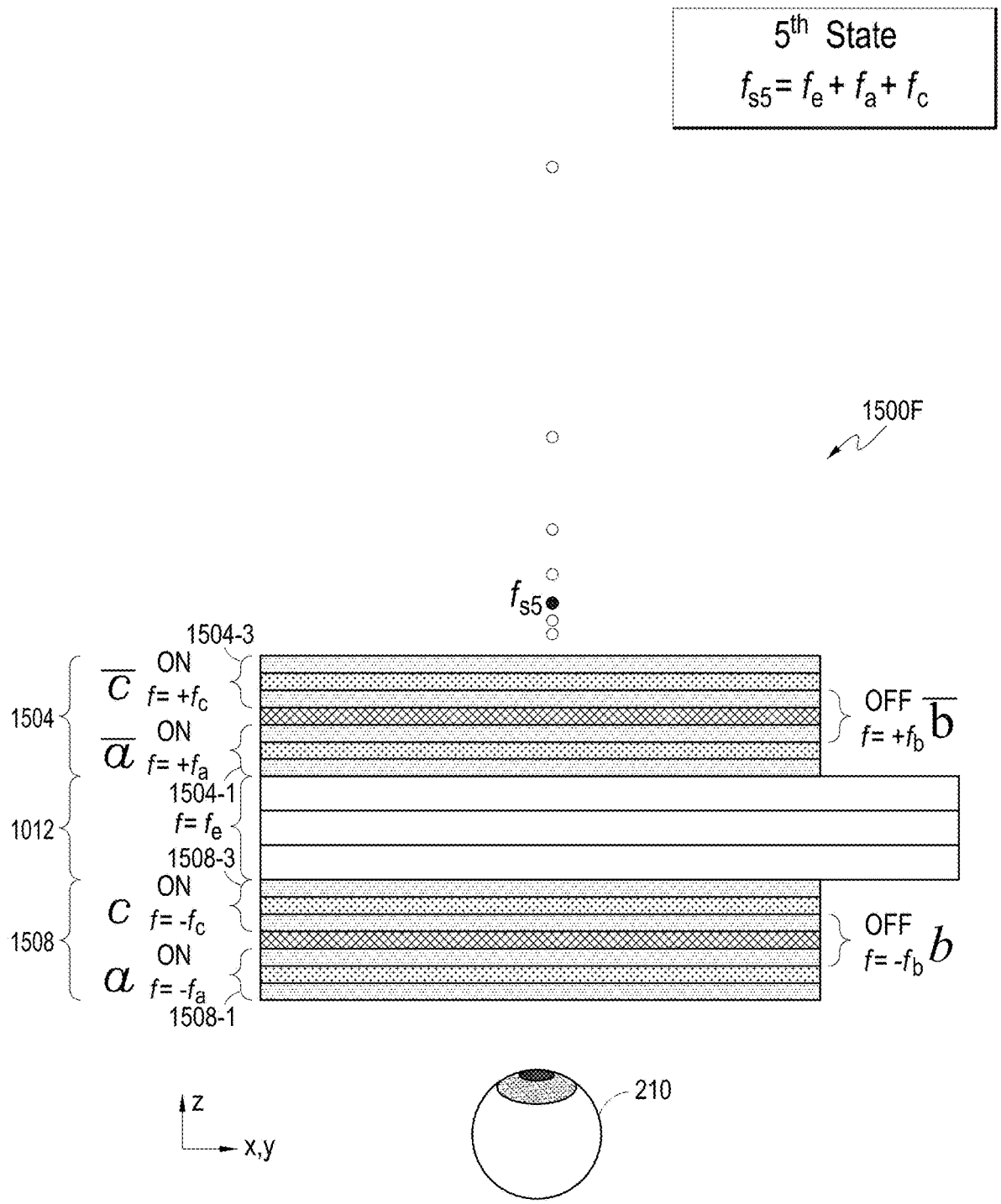

FIG. 17F illustrates an example of a fifth state 1500E of the display device 1500 illustrated in FIG. 15, in which a plurality of substacks, i.e., first and third substacks 1508-1, 1508-3 are selected in the second adaptive lens assembly 1508 by activating the first and third switchable waveplates 1312-1, 1312-3 of the first and third substacks 1508-1, 1508-3, such that the virtual image generated by focusing the light outcoupled from waveguide assembly 1012 is displayed to the eye 210 at a fifth image depth fs5 closer to the eye 210 than the fourth image depth fs4, resulting from negative optical powers of the first and third substacks 1508-1, 1508-3. To compensate for defocusing of real world images resulting therefrom, corresponding first and third substacks 1504-1, 1504-3 are selected in the first adaptive lens assembly 1508 by activating the first and third switchable waveplates 1312-1, 1312-3 of the first and third substacks 1504-1, 1504-3, such that undesirable defocusing of real world images is reduced or minimized according to a difference in net optical powers of the first and second adaptive lens assemblies 1504, 1508.

Figure 17G:

FIG. 17G illustrates an example of a sixth state 1500F of the display device 1500 illustrated in FIG. 15, in which a plurality of substacks, i.e., second and third substacks 1508-2, 1508-3 are selected in the second adaptive lens assembly 1508 by activating the second and third switchable waveplates 1312-2, 1312-3 of the second and third substacks 1508-2, 1508-3, such that the virtual image generated by focusing the light outcoupled from waveguide assembly 1012 is displayed to the eye 210 at a sixth image depth fs6 closer to the eye 210 than the fifth image depth fs5, resulting from negative optical powers of the second and third substacks 1508-2, 1508-3. To compensate for defocusing of real world images resulting therefrom, corresponding second and third substacks 1504-2, 1504-3 are selected in the first adaptive lens assembly 1508 by activating the second and third switchable waveplates 1312-2, 1312-3 of the second and third substacks 1504-2, 1504-3, such that undesirable defocusing of real world images is reduced or minimized according to a difference in net optical powers of the first and second adaptive lens assemblies 1504, 1508.

Figure 17H:
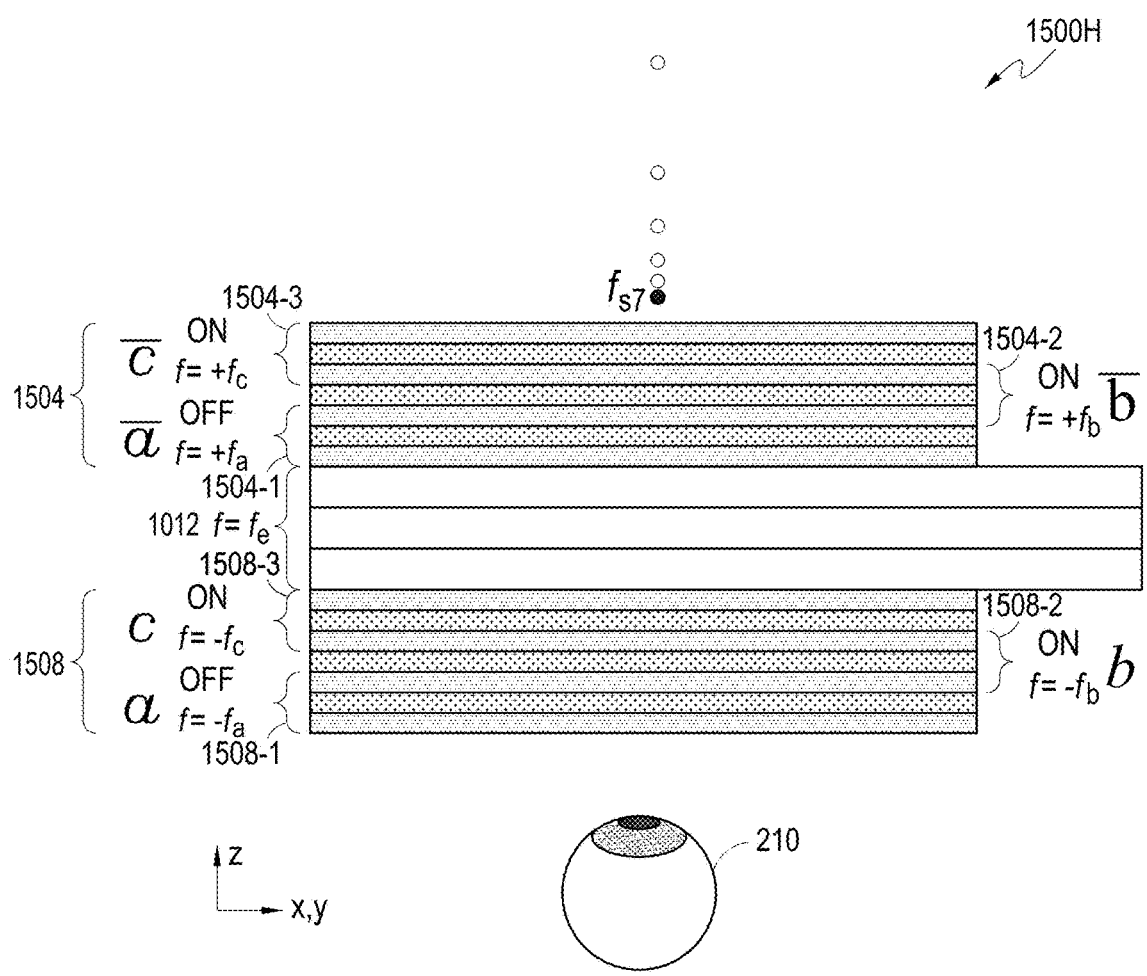

FIG. 17H illustrates an example of a seventh state 1500G of the display device 1500 illustrated in FIG. 15, in which a plurality of substacks, i.e., first, second and third substacks 1508-1, 1508-2, 1508-3 are selected in the second adaptive lens assembly 1508 by activating the first, second and third switchable waveplates 1312-1, 1312-2, 1312-3 of the first, second and third substacks 1508-1, 1508-2, 1508-3, such that the virtual image generated by focusing the light outcoupled from waveguide assembly 1012 is displayed to the eye 210 at a seventh image depth fs7 closer to the eye 210 than the sixth image depth fs6, resulting from negative optical powers of the first, second and third substacks 1508-1, 1508-2, 1508-3. To compensate for defocusing of real world images resulting therefrom, corresponding first, second and third substacks 1504-1, 1504-2, 1504-3 are selected in the first adaptive lens assembly 1504 by activating the first, second and third switchable waveplates 1312-1, 1312-2, 1312-3 of the first, second and third substacks 1504-1, 1504-2, 1504-3, such that undesirable defocusing of real world images is reduced or minimized according to a difference in net optical powers of the first and second adaptive lens assemblies 1504, 1508.

With reference to FIGS. 17A-17H, in some embodiments, the distance separating pairs of activated or deactivated switchable waveplates of the first and second adaptive lens assemblies 1504, 1508, e.g., the distance separating pairs of switchable waveplate that have optical power of substantially equal magnitudes, are substantially equal. For example, with reference to FIG. 17D, the distance (in the thickness direction, z-axis, of the stack of adaptive lens substacks) between the sub-stacks of the pair of deactivated sub-stacks having optical power $+/-f_c$ is equal to the distance in the thickness direction between the sub-stacks of the pair of deactivated sub-stacks having optical power $+/-f_a$, which in turn is equal to the distance in the thickness direction between the sub-stacks of the pair of deactivated sub-stacks having optical power $+/-f_c$.

It will be appreciated that, while in the illustrated embodiment, each of the first and second adaptive lens assemblies 1504, 1508 includes three substacks for illustrative purposes, embodiments are not so limited. That is, in other embodiments, first and second adaptive lens assemblies 1504, 1508 can include first to nth substacks 1504-1, 1504-2, . . . 1504-*n*, and 1508-1, 1508-2, . . . 1508-*n*, respectively, where n is a suitable number for delivering a corresponding number of image depths fs1, fs2, . . . fsn.

In some embodiments, the optical powers of each of the substacks may be selected such that some or all of the image depths fs1-fs7 are spaced at equal or substantially equal distances apart from one another in diopter space. In some embodiments, in diopter space, the image depths fs1-fs7 may be spaced about 0.5 diopter apart from one another. For instance, the image depths fs1-fs7 could correspond to 0.5, 1, 1.5, 2, 2.5, 3, and 3.5 diopters, respectively.

Display Devices Including Adaptive Lens Assemblies and Fixed Lenses

In the example display devices described above including adaptive lens assemblies, the adaptive lens assemblies included waveplate lenses and switchable waveplates that have, among other advantages, reducing the number of waveguides, which in turn reduces the overall device weight and thickness. In some embodiments, additional fixed lenses may be stacked on the one or more adaptive lens assemblies. Advantageously, the additional lenses provide various possible benefits. For example, under some circumstances, such lenses may be provided to add additional optical power. In addition, some users using wearable display devices according to some embodiments, such as the wearable device 1000 described with respect to FIG. 10, have eyes with refractive errors that prevent light from correctly focusing on their eyes' retinas. In some embodiments, the additional lens elements may be configured to provide a particular prescription optical power to allow the user to clearly view the image information projected by the display and/or transmitted through the display from the real world. In addition, the additional lenses may be provided with surfaces having curvatures to better conform the device to the user's facial contours, to integrate better with normal frames for eyewear, and/or for provide more aesthetically pleasing appearance the display device.

Figure 18A:
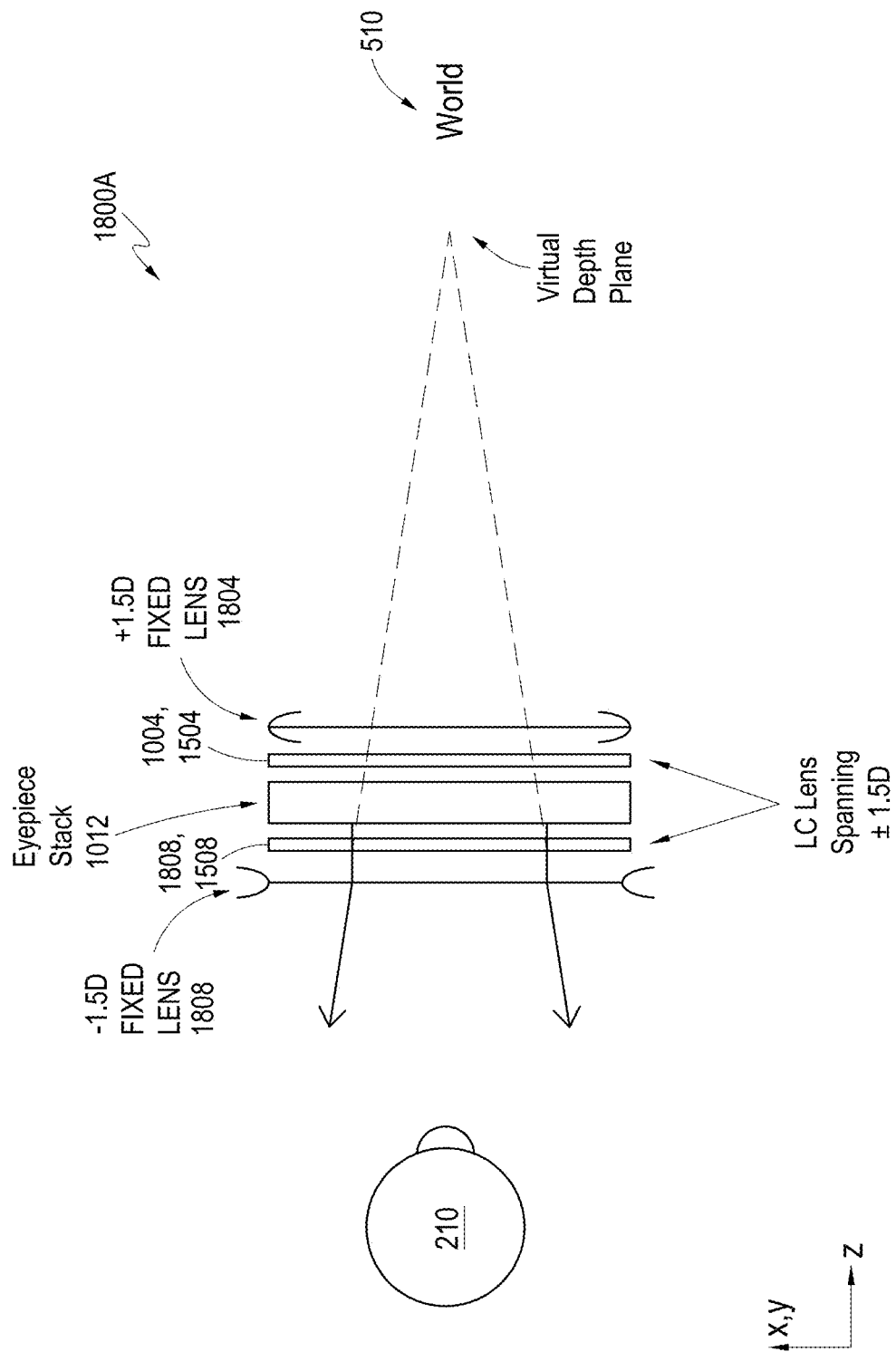
FIGS. 18A and 18B illustrate an example of a display device comprising a pair of adaptive lens assemblies and a pair of fixed lenses.
Figure 18B:
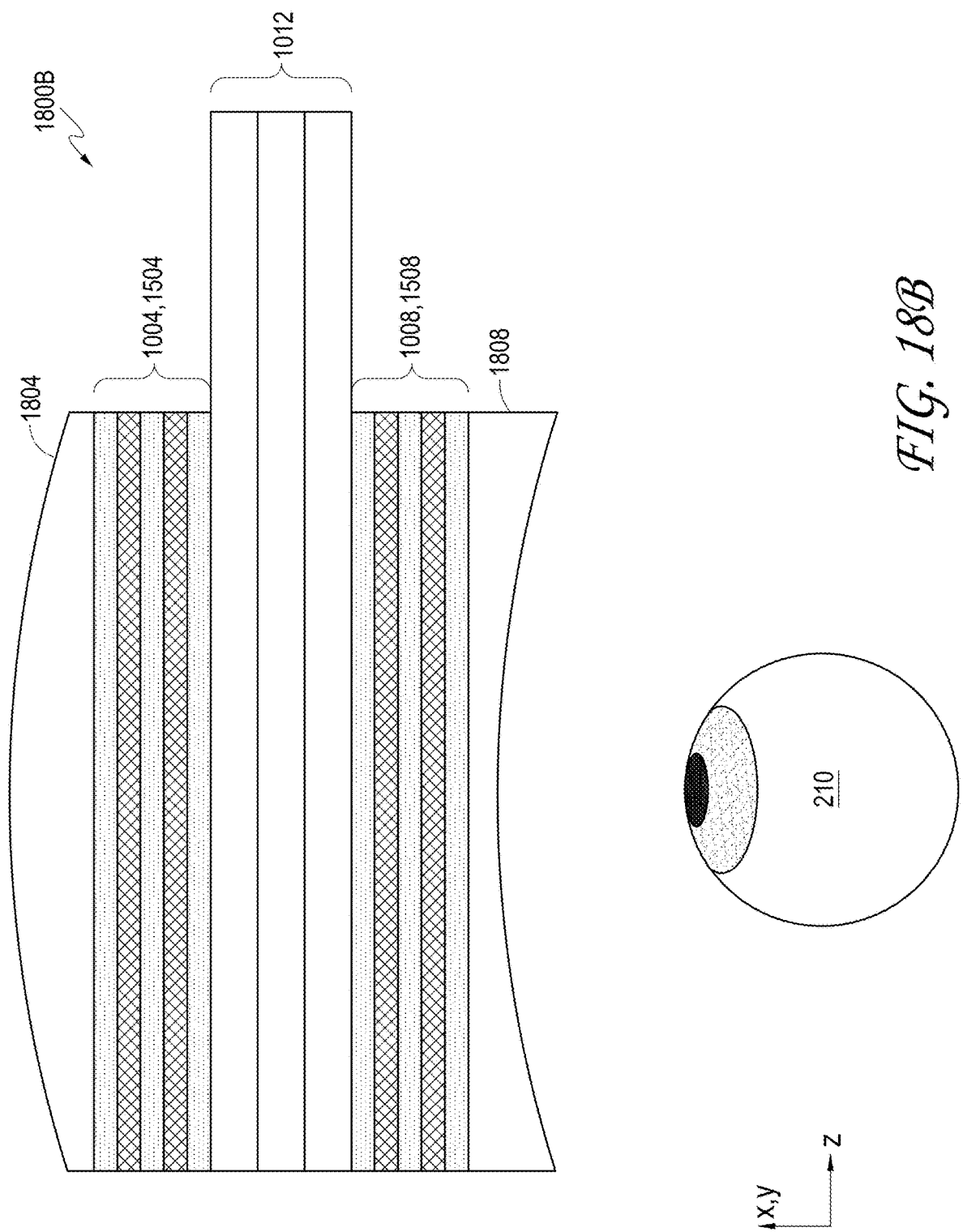

FIGS. 18A and 18B illustrate a display device comprising a pair of adaptive lens assemblies and a pair of fixed lenses, according to some embodiments. As discussed above, the display device 1800A/1800B comprises a pair of adaptive lens assemblies (e.g., 1004, 1008 in FIGS. 14A/14B, 1504, 1508 in FIG. 15) and a waveguide assembly 1012 interposed between the pair of the adaptive lens assemblies, where the waveguide assembly comprises a waveguide configured to propagate light under total internal reflection and to out-couple the light into one of the pair of the adaptive lens assemblies, to display virtual content at a plurality of virtual depth planes. Each of the pair of adaptive lens assemblies comprises a switchable waveplate configured to alter a polarization state of light passing therethrough when electrically activated.

As discussed above, under some circumstances, it may be desirable to add additional fixed lenses, e.g., corrective lenses, to allow the user to see more clearly. In some embodiments, a first fixed focus lens element 1808 may be provided between the waveguide assembly 1012 and the viewer's eye 210. The addition of the first fixed focus lens element may provide appropriate adjustment, to adjust the light outcoupled from the waveguide assembly 1012, which may include virtual content, to be correctly focused for the viewer's eye 210. The first fixed lens element 1808, however, is also in the path of light propagating from the world 510 to the viewer's eye 210. As a result, the first lens element may modify the light from the surrounding environment, thereby causing aberrations in the viewer's view of the world. To correct such aberrations, a second fixed focus lens element 1804 may be disposed on the opposite side of waveguide assembly 1012 from the first variable focus lens element 1808. The second fixed focus lens element 1804 may be configured to compensate for aberrations caused by the first fixed focus lens element 1808.

In some embodiments, the focus of the second fixed focus lens element 1804 may be inverse or opposite the focus of the first fixed focus lens element 1808. For example, if the first fixed focus lens element 1808 has a positive optical power, then the second fixed focus lens element 1804 may have a negative optical power, and vice versa, which may be of similar magnitude in some embodiments.

In some embodiments, the display device 1800A/1800B without the fixed focus lens elements 1804, 1808, may not have sufficient optical power, and the first variable focus lens elements may be configured to provide the appropriate amount of additional divergence to the light for image information to be interpreted by the viewer as being on a particular depth plane.

It will be appreciated that the first and second fixed focus lens elements 1804, 1808 may be provided for one of the viewer's eyes, and that third and fourth fixed focus lens elements (not shown) that are similar to the first and second fixed focus lens elements, respectively, may be provided for the other of the viewer's eyes.

In various embodiments, each of the first and second fixed focus lens elements may provide a net optical power (positive or negative) in the range between about ±5.0 diopters and 0 diopters, ±4.0 diopters and 0 diopters, ±3.0 diopters and 0 diopters, ±2.0 diopters and 0 diopters, ±1.0 diopters and 0 diopters, including any range defined by these values, for instance ±1.5 diopters.

In some embodiments, such as the embodiment in FIGS. 18A and 18B, the optical power of the first fixed focus lens element 1804, which may be, e.g., a concave or a plano-concave lens, has a positive value, and the optical power of the second fixed focus lens element 1808, which may be, e.g., a convex or a plano-convex lens, has a negative value, such that the optical powers of the first and second focus lens elements 1804, 1808 compensate each other. However, in some other embodiments, the optical power of the second fixed focus lens element 1808 may have a positive value, and the optical power of the first fixed focus lens element 1804 may have a negative value, such that the optical powers of the first and second focus lens elements 1804, 1808 compensate each other.

Figure 19:
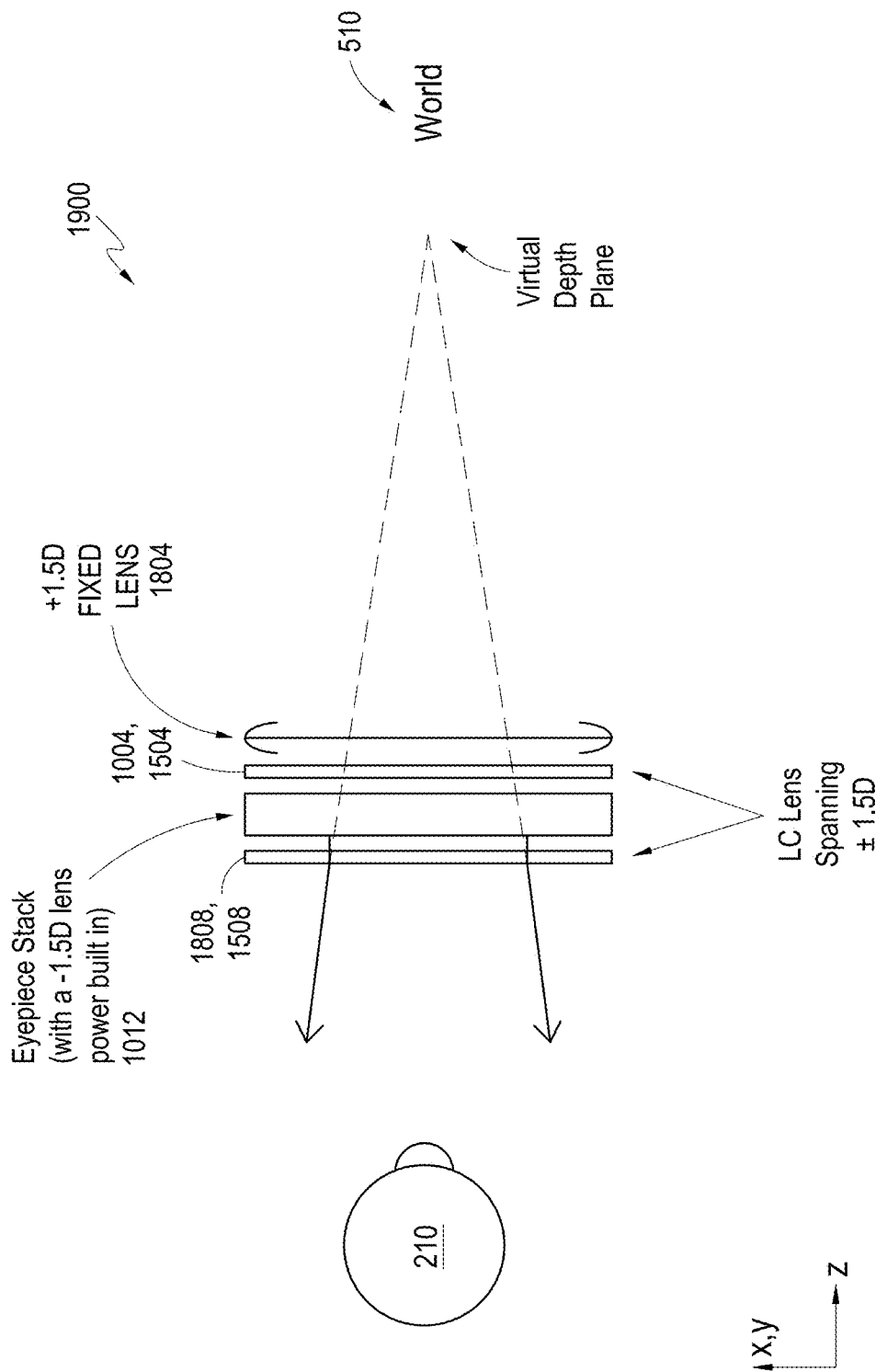
FIG. 19 illustrates an example of a display device comprising a pair of adaptive lens assemblies and a fixed lens.

FIG. 19 illustrates a display device 1900 according to some other embodiments. Similar to the display device 1800A/1800B described above with respect to FIGS. 18A, 18B, the display device 1900 includes a pair of adaptive lens assemblies (e.g., 1004, 1008 in FIGS. 14A/14B, 1504, 1508 in FIG. 15) and a waveguide assembly 1012 interposed between the pair of the adaptive lens assemblies. However, unlike the display device 1800A/1800B of FIGS. 18A, 18B, to adjust the light outcoupled from the waveguide assembly 1012, which may include virtual content, to be correctly focused for the viewer's eye 210, the waveguide assembly 1012 may be configured to have a built-in optical power instead of having a first fixed focus lens element 1808 between the waveguide assembly 1012 and the viewer's eye 210. Similar to the display device 1800A/1800B described above, the built-in optical power in the waveguide assembly 1012 may modify the wavefront of the light from the surrounding environment and, thereby cause aberrations in the viewer's view of the world. To correct such aberrations, a fixed focus lens element 1804 similar to the second fixed focus lens element 1804 described above with respect to FIGS. 18A, 18B may be disposed between the world and the waveguide assembly 1012. The fixed focus lens element 1804 may be configured to compensate for aberrations caused by the built-in optical power in the waveguide assembly 1012, similar to the compensating mechanism described above with respect to FIGS. 18A, 18B. In some embodiments, the built-in optical power in the waveguide assembly 1012 may have a negative value, and the optical power of the fixed focus lens element 1804 may have a positive value, such that the optical powers of the waveguide assembly and the fixed focus lens element compensate each other. Various characteristics of the fixed focus lens element 1804 are similar to those described above with respect to FIGS. 18A, 18B.

It will be appreciated that, in the embodiment illustrated in FIG. 19, while the fixed focus lens element 1804 is disposed between the world 510 and the waveguide assembly 1012, other embodiments are possible. For example, a fixed focus lens element 1808 may be disposed between the eye 210 and the waveguide assembly 1012, similar to the first fixed focus lens element 1808 described above with respect to FIGS. 18A, 18B. In these embodiments, the built-in optical power in the waveguide assembly 1012 may have a positive value, and the optical power of the fixed focus lens element 1808 may have a negative value, such that the optical powers of the waveguide assembly and the fixed focus lens element compensate each other.

Referring back to the display device 1800A/1800B illustrated with respect to FIGS. 18A/18B and to the display device 1900 illustrated with respect to FIG. 19, in an analogous manner as discussed above with reference to FIGS. 14A and 14B, in some implementations, one or both of first and second adaptive lens assemblies may include or be positioned adjacent to at least one polarization selective turning element (e.g., polarizer) for blocking or otherwise filtering out certain unwanted components of light passing therethrough toward the eye 210 from the world 510 and optionally also from the waveguide assembly 1012. For example, in such implementations, the display device 1800A/1800B (FIGS. 18A/18B) and/or the display device 1900 (FIG. 19) may include a polarization selective turning element interposed between the waveguide assembly 1012 and a waveplate lens adjacent thereto on the user side, a polarization selective turning element interposed between the user (the eye 210) and a waveplate lens adjacent thereto, or both. Furthermore, alternatively or additionally, the display device the display device 1800A/1800B (FIGS. 18A/18B) and/or the display device 1900 (FIG. 19) may include a polarization selective turning element interposed between the waveguide assembly 1012 and a waveplate lens adjacent thereto on the world side, a polarization selective turning element interposed between the world 510 and a waveplate lens adjacent thereto, or both. The polarization selective turning element may include one or more polarization gratings, diffractive optical elements, and/or holographic optical elements and may comprise liquid crystal structures such as liquid crystal polarization gratings. In some embodiments, the waveguide assembly 1012 may be configured to outcouple polarized light.

Additional Examples

In a $1^{st}$ example, an augmented reality system comprises at least one waveguide that is configured to receive and redirect light towards a user, wherein the at least one waveguide is further configured to allow ambient light from an environment of the user to pass therethrough toward the user. The system additionally comprises a first adaptive lens assembly positioned between the at least one waveguide and the environment, wherein the first adaptive lens assembly is selectively switchable between a state in which the first adaptive lens assembly is configured to impart a first optical power to light passing therethrough, and at least one other state in which the first adaptive lens assembly is configured to impart optical power different from the first optical power to light passing therethrough. The system additionally comprises a second adaptive lens assembly positioned between the at least one waveguide and the user, wherein the second adaptive lens assembly is selectively switchable between a state in which the second adaptive lens assembly is configured to impart a second optical power different from the first optical power to light passing therethrough, and at least one other state in which the second adaptive lens assembly is configured to impart optical power different from the second optical power to light passing therethrough. The system further comprises at least one processor operatively coupled to the first and second adaptive lens assemblies, wherein the at least one processor is configured to cause the first and second adaptive lens assemblies to synchronously switch between different states in a manner such that the first and second adaptive lens assemblies impart a substantially constant net optical power to ambient light from the environment passing therethrough.

In a $2^{nd}$ example, the augmented reality system of the $1^{st}$ example further comprises a micro-display, wherein the at least one waveguide is configured to receive and redirect light from the micro-display toward the user.

In a $3^{rd}$ example, in the augmented reality system of any one of the $1^{st}$ to $2^{nd}$ examples, the first optical power and the second optical power are opposite in sign.

In a $4^{th}$ example, in the augmented reality system of any one of the $1^{st}$ to $3^{rd}$ examples, the first optical power and the second optical power are substantially equal in magnitude.

In a $5^{th}$ example, in the augmented reality system of any one of the $1^{st}$ to $4^{th}$ examples, each of the first and second adaptive lens assemblies is configured to receive one or more control signals from the at least one processor as input and, in response thereto, switch from one state to another state within a period of time thereafter of less than 400 milliseconds.

In a $6^{th}$ example, in the augmented reality system of the $5^{th}$ example, the period of time within which each of the first and second adaptive lens assemblies is configured to switch from one state to another state is less than 200 milliseconds.

In a $7^{th}$ example, in the augmented reality system of the $6^{th}$ example, the period of time within which each of the first and second adaptive lens assemblies is configured to switch from one state to another state is less than 100 milliseconds.

In an $8^{th}$ example, in the augmented reality system of any one of the $1^{st}$ to $7^{th}$ examples, the at least one waveguide comprises an output area through which the at least one waveguide is configured to redirect light toward the user and allow ambient light from the environment of the user to pass therethrough toward the user. The output area of the at least one waveguide is positioned between a portion of the first adaptive lens assembly within which a clear aperture of the first adaptive lens assembly is formed and a portion of the second adaptive lens assembly within which a clear aperture of the second adaptive lens assembly is formed.

In a $9^{th}$ example, in the augmented reality system of the $8^{th}$ example, each of the portions of the first and second adaptive lens assemblies within which clear apertures of the first and second adaptive lens assemblies are formed, respectively, is larger in size than the output area of the at least one waveguide.

In a $10^{th}$ example, in the augmented reality system of any one of the $1^{st}$ to $9^{th}$ examples, each of the first and second adaptive lens assemblies includes at least one optical element that is single-pole switchable between two states.

In an $11^{th}$ example, in the augmented reality system of the $10^{th}$ example, the at least one optical element is single-pole switchable between a first state in which the at least one optical element is configured to impart a first polarization state to light passing therethrough toward the user, and a second state in which the at least one optical element is configured to impart a second polarization state different from the first polarization state to light passing therethrough.

In a $12^{th}$ example, in the augmented reality system of any one of the $1^{st}$ to $11^{th}$ examples, each of the first and second adaptive lens assemblies includes at least one waveplate lens positioned between the at least one optical element and the user, wherein the at least one waveplate lens is configured to impart one optical power to light of the first polarization state passing therethrough and another, different optical power to light of the second polarization state passing therethrough.

In a $13^{th}$ example, in the augmented reality system of any one of the $1^{st}$ to $12^{th}$ examples, each of the first and second adaptive lens assemblies includes a quantity of optical elements that are single-pole switchable between two states, wherein the quantity of optical elements included in each of the first and second adaptive lens assemblies being equal to a first value, and wherein each of the first and second adaptive lens assemblies is selectively switchable between states from among a quantity of different states, the quantity of different states being equal to a second value that exponentially depends upon the first value.

In a $14^{th}$ example, in the augmented reality system of the $13^{th}$ example, the second value is equal to an exponentiation of two with an exponent, the exponent being equal to the first value.

In a $15^{th}$ example, in the augmented reality system of any one of the $1^{st}$ to $14^{th}$ examples, the at least one waveguide is configured to receive and redirect light representing virtual content toward the user, wherein the at least one processor is configured to cause the first and second adaptive lens assemblies to synchronously switch between different states from among the quantity of different states to adjust a distance away from the user at which virtual content represented by light passing therethrough is to be perceived by the user.

In a $16^{th}$ example, in the augmented reality system of the $15^{th}$ example, the distance away from the user at which virtual content represented by light passing therethrough to be perceived by the user is selectively switchable to any of a quantity of different distances, the quantity of different distances being equal to the second value.

In a $17^{th}$ example, a display device comprises a waveguide assembly comprising a waveguide configured to output outcoupled light along an output surface of the waveguide. The display device additionally comprises a first adaptive lens assembly having a first major surface facing the output surface, where the first adaptive lens assembly comprises a first waveplate lens, a second waveplate lens and a first switchable waveplate interposed between the first waveplate lens and the second waveplate lens, wherein the switchable waveplate is selectively switchable between a first state configured to pass the outcoupled light without altering a polarization state of the outcoupled light, and a second state configured to alter the polarization state of the outcoupled light passing therethrough. The display device additionally comprises a second adaptive lens assembly having a second major surface facing an external scene opposite the output surface, and a second minor surface facing the first major surface, wherein the second adaptive lens assembly comprises a third waveplate lens, a fourth waveplate lens and a second switchable waveplate interposed between the third waveplate lens and the fourth waveplate lens, wherein the second switchable waveplate is selectively switchable between a third state configured to pass light from the external scene without altering a polarization state of the light from the external scene and a fourth state configured to alter the polarization state of the light from the external scene passing therethrough.

In an $18^{th}$ example, in the display device of the $17^{th}$ embodiment, each of the first and second waveplate lenses is configured to alter a polarization state of the outcoupled light passing therethrough, and to converge or diverge the outcoupled light.

In a $19^{th}$ example, in the display device of any one of the $17^{th}$ and $18^{th}$ examples, each of the third and fourth waveplate lenses is configured to alter a polarization state of the light from the external scene passing therethrough, and to converge or diverge the outcoupled light.

In a $20^{th}$ example, a display device comprises a pair of adaptive lens assemblies in an optical path, wherein each of the adaptive lens assemblies comprises a corresponding switchable waveplate configured to switch between first and second states to selectively alter a polarization state of light passing therethrough, wherein the adaptive lens assemblies have optical powers with opposite signs.

In a $21^{st}$ example, in the display device of the $20^{th}$ example, each of the adaptive lens assemblies has a respective optical power that is adjustable based upon a state of the switchable waveplate of the adaptive lens assembly.

In a $22^{nd}$ example, the display device of any one of the $20^{th}$ to $21^{st}$ examples further comprises a controller configured such that, when a first optical power of a first one of the pair of adaptive lens assemblies is a first value, a second optical power of a second one of the pair of adaptive lens assemblies is correspondingly adjusted to a second value.

In a $23^{rd}$ example, in the display device of any one of the $20^{th}$ to $22^{nd}$ example, a net optical power from a combination of the first one of the pair of adaptive lens assemblies with the second one of the pair of adaptive lens assemblies remains at about a constant value.

In a $24^{th}$ example, in the display device of the $23^{rd}$ example, the constant value is about $0$ $m^{-1}$.

In a $25^{th}$ example, in the display device of any one of the $20^{th}$ to $24^{th}$ examples, each of the adaptive lens assemblies comprises first and second waveplate lenses, wherein the corresponding switchable waveplate of the each of the adaptive lens assemblies is interposed between the first and second waveplate lenses, wherein each of the waveplate lenses is configured to alter a polarization state of light passing therethrough.

In a 26th example, the display device of any one of the 20th to 25th examples further comprises a waveguide assembly interposed between the pair of adaptive lens assemblies, wherein the waveguide assembly comprises a waveguide configured to outcouple the light propagating therein into one of the adaptive lens assemblies.

In a 27th example, in the display device of any of the 20th to 26th examples, each of the adaptive lens assemblies comprises a plurality of waveplate lenses and a plurality of switchable waveplates, wherein the waveplate lenses and the switchable waveplates are alternatingly stacked.

In a 28th example, in the display device of any one of the 20th to 27th examples, different ones of the switchable waveplates and waveplate lenses have different optical powers.

In a 29th example, an adaptive lens assembly comprises one or more waveplate lenses and one or more switchable waveplates aligned in an optical path, wherein each of the one or more waveplate lenses is configured to alter a polarization state of light passing therethrough, to provide a first optical power for light having a first polarization, and to provide a second optical power for light having a second polarization. Each of the one or more switchable waveplates is selectively switchable between a first state configured to pass the light therethrough without altering a polarization state of the light, and a second state configured to alter the polarization state of the light passing therethrough.

In a 30th example, in the adaptive lens assembly of the 29th example, one or both of the waveplate lenses and the switchable waveplates comprise liquid crystals.

In a 31st example, in the lens assembly of any one of the 29th and 30th examples, each of the one or more switchable waveplates in the second state is a switchable half waveplate configured to invert a handedness of circularly polarized light when activated.

In a 32nd example, in the adaptive lens assembly of any one of the 29th to 31st examples, each of the switchable waveplates is interposed between a pair of the one or more waveplate lenses.

In a 33rd example, in the adaptive lens assembly of any one of the 29th to 32nd examples, the adaptive lens assembly comprises a plurality of the waveplate lenses and a plurality of the switchable waveplates, wherein the waveplate lenses and the switchable waveplate are alternatingly stacked.

In a 34th example, a wearable augmented reality head-mountable display system comprises a light modulating system configured to output light to form an image, a head mountable frame, one or more waveguides attached to the frame and configured to receive and redirect the image from the light modulating system to outside the head mountable frame and a pair of adaptive lens assemblies, wherein the one or more waveguides are disposed between the pair of adaptive lens assemblies. Each of the pair of adaptive lens assemblies comprises one or more waveplate lenses in an optical path, wherein each of the one or more waveplate lenses is configured to provide a first optical power for light having a first polarization, and to provide a second optical power for light having a second polarization. Each of the pair of adaptive lens assemblies additionally comprises one or more switchable waveplates in the optical path, wherein each of the one or more switchable waveplates is configured to selectively alter a polarization state of light passing therethrough. Each of the pair of adaptive lens assemblies is configured to provide a respective optical power that is adjustable upon application of a respective electrical signal to respective ones of the one or more switchable waveplates.

In a 35th example, the wearable augmented reality head-mountable display system of the 34th example further comprises at least one processor operatively coupled to the pair of adaptive lens assemblies, wherein the at least one processor is configured to cause the pair of adaptive lens assemblies to synchronously switch between different states in a manner such that the pair of adaptive lens assemblies impart a substantially constant net optical power to ambient light from an environment passing therethrough.

In a 36th example, the wearable augmented reality head-mountable display system of any one of the 34th and 35th examples further comprises a micro-display, wherein the one or more waveguides are configured to receive and redirect light from the micro-display toward a user.

In a 37th example, in the wearable augmented reality head-mountable display system of any one of the 34th to 36th examples, the pair of adaptive lens assemblies are configured to provide optical powers that are opposite in sign.

In a 38th example, in the wearable augmented reality head-mountable display system of the 37th example, the optical powers that are opposite in sign are substantially equal in magnitude.

In a 39th example, in the wearable augmented reality head-mountable display system of any one of the 35th to 38th examples, each of the pair of adaptive lens assemblies is configured to receive one or more control signals from the at least one processor as input and, in response thereto, switch from one state to another state within a period of time thereafter of less than 400 milliseconds.

In a 40th example, in the wearable augmented reality head-mountable display system of any one of the 34th to 39th examples, the one or more waveguides are configured to receive and redirect the image representing virtual content toward a user, wherein the at least one processor is configured to cause the pair of adaptive lens assemblies to synchronously switch between different states from among the quantity of different states to adjust a distance away from the user at which virtual content represented by light passing therethrough is perceived by the user.

In a 41st example, in the wearable augmented reality head-mountable display system of the 40th example, the distance away from the user at which the virtual content is perceived by the user is selectively switchable between a plurality of different distances.

In a 42nd example, an augmented reality system comprises a first adaptive lens assembly and a second adaptive lens assembly, wherein the second adaptive lens assembly is positioned between the first adaptive lens assembly and a user. Each of the adaptive lens assemblies comprises at least one switchable optical element that is selectively switchable between at least (i) a first state in which the at least one switchable optical element is configured to impart a first polarization state to light passing therethrough toward the user, and (i) a second state in which the at least one switchable optical element is configured to impart a second polarization state to light passing therethrough toward the user. Each of the adaptive lens assemblies additionally comprises at least one waveplate lens that is positioned between the at least one switchable optical element and the user, wherein the at least one waveplate lens is configured to impart a first respective optical power to light of the first polarization state passing therethrough toward the user, and to impart a second respective optical power to light of the second polarization state passing therethrough toward the user. The system further comprises at least one waveguide positioned between the first adaptive lens assembly and the second adaptive lens assembly, wherein the at least one waveguide is configured to direct light representing virtual content through the second lens assembly and toward the user.

In a $43^{rd}$ example, the augmented reality system of the $42^{nd}$ example further comprises at least one processor operatively coupled to the first and second adaptive lens assemblies, wherein the at least one processor is configured to cause the first and second adaptive lens assemblies to synchronously switch between different states in a manner such that the first and second adaptive lens assemblies impart a substantially constant net optical power to ambient light from an environment passing therethrough.

In a $44^{th}$ example, the augmented reality system of any one of the $42^{nd}$ to $43^{rd}$ examples further comprises a micro-display, wherein the at least one waveguide is configured to receive and redirect light from the micro-display toward the user.

In a $45^{th}$ example, in the augmented reality system of any one of the $42^{nd}$ to $44^{th}$ examples, the first and second adaptive lens assemblies are configured to provide optical powers that are opposite in sign.

In a $46^{th}$ example, in the augmented reality system of the $45^{th}$ example, the optical powers that are opposite in sign are substantially equal in magnitude.

In a $47^{th}$ example, in the augmented reality system of any one of the $43^{rd}$ to $46^{th}$ examples, each of the first and second adaptive lens assemblies is configured to receive one or more control signals from the at least one processor as input and, in response thereto, switch from one state to another state within a period of time thereafter of less than 400 milliseconds.

In a $48^{th}$ example, in the augmented reality system of any one of the $42^{nd}$ to $47^{th}$ examples, each of the first and second adaptive lens assemblies includes a quantity of optical elements that are single-pole switchable between two states. The quantity of optical elements included in each of the first and second adaptive lens assemblies is equal to a first value. Each of the first and second adaptive lens assemblies is selectively switchable between states from among a quantity of different states, the quantity of different states being equal to a second value that exponentially depends upon the first value.

In a $49^{th}$ example, in the augmented reality system of the $48^{th}$ example, the second value is equal to an exponentiation of two with an exponent, the exponent being equal to the first value.

In a $50^{th}$ example, in the augmented reality system of any one of $43^{rd}$ to $49^{th}$ examples, the one or more waveguides are configured to receive and redirect light representing virtual content toward the user, wherein the at least one processor is configured to cause the pair of adaptive lens assemblies to synchronously switch between different states from among the quantity of different states to adjust a distance away from the user at which virtual content represented by light passing therethrough is perceived by the user.

In a $51^{st}$ example, in the augmented reality system of the $50^{th}$ example, the distance away from the user at which virtual content is perceived by the user is selectively switchable to any of a quantity of different distances, wherein the quantity of different distances is equal to the second value.

In a $52^{nd}$ example, a display device comprises a waveguide assembly comprising a waveguide configured to output outcoupled light along an output surface of the waveguide. The display device additionally comprises an adaptive lens assembly having a major surface facing the output surface. The adaptive lens assembly comprises a first waveplate lens, a second waveplate lens and a switchable waveplate interposed between the first waveplate lens and the second waveplate lens. The switchable waveplate is selectively switchable between a first state configured to pass the outcoupled light without altering a polarization state of the outcoupled light and a second state configured to alter the polarization state of the outcoupled light passing therethrough.

In a $53^{rd}$ example, in the display device of the $52^{nd}$ example, each of the first and second waveplate lenses is configured to alter a polarization state of the outcoupled light passing therethrough, and to converge or diverge the outcoupled light.

In a $54^{th}$ example, in the display device of the $52^{nd}$ example or the $53^{rd}$ example, the outcoupled light is circularly polarized light having a polarization handedness, wherein each of the first and second waveplate lenses, and the switchable waveplate in the second state, are half waveplates configured to invert the handedness of the outcoupled light passing therethrough.

In a $55^{th}$ example, in the display device of any one of the $52^{nd}$ to $54^{th}$ examples, each of the first and second waveplate lenses is configured to provide a first optical power for light having a first handedness, and to provide a second optical power for light having a second handedness opposite the first handedness.

In a $56^{th}$ example, in the display device of any one of the $52^{nd}$ to $55^{th}$ examples, when the switchable waveplate is in the second state, the outcoupled light incident on the first waveplate lens has the same handedness as the outcoupled light incident on the second waveplate, while when the switchable waveplate is in the first state, the outcoupled light incident on the first waveplate lens has the opposite handedness as the outcoupled light incident on the second waveplate.

In a $57^{th}$ example, in the display device of any one of the $52^{nd}$ to $56^{th}$ examples, when the switchable waveplate is in the second state, the first and second waveplate lenses both diverge the outcoupled light passing therethrough, while when the switchable waveplate is in the first state, one of the first and second waveplate lenses converges the outcoupled light passing therethrough while the other of the first and second waveplate lenses diverges the outcoupled light passing therethrough.

In a $58^{th}$ example, in the display device of any one of the $52^{nd}$ to $57^{th}$ examples, when the switchable waveplate is in the second state, the adaptive lens assembly has a net optical power having a magnitude that is about a sum of magnitudes of optical powers of the first and second waveplate lenses, while when the switchable waveplate is in the first state, the adaptive lens assembly has a net optical power having a magnitude that is about a difference between magnitudes of optical powers the first and second waveplate lenses.

In a $59^{th}$ example, in the display device of any one of the $52^{nd}$ to $58^{th}$ examples, the first and second waveplate lenses have optical powers having about the same magnitude, such that when the switchable waveplate is electrically deactivated, the net optical power is about zero.

In a $60^{th}$ example, in the display device of any one of the $52^{nd}$ to $59^{th}$ examples, each of the first and second waveplate lenses and the switchable waveplate comprises elongated liquid crystal molecules elongated in different elongation directions and having different angles of rotation.

In a 61$^{st}$ example, in the display device of any one of the 52$^{nd}$ to 60$^{th}$ examples, each of the first and second waveplate lenses comprises liquid crystal molecules having angles of rotation that are proportional to a radial distance from an optical axis of the adaptive lens assembly to the liquid crystal molecules.

In a 62$^{nd}$ example, in the display device of any one of the 52$^{nd}$ to 61$^{st}$ examples, in the second state, the switchable waveplate comprises a cholesteric liquid crystal (CLC) layer comprising a plurality of chiral structures, wherein each chiral structure comprises a plurality of liquid crystal molecules that extend in a layer depth direction by at least a helical pitch and are successively rotated in a first rotation direction, and wherein the helical pitch is a length in the layer depth direction corresponding to a net rotation angle of the liquid crystal molecules of the chiral structures by one full rotation in the first rotation direction.

In a 63$^{rd}$ example, in the display device of any one of the 52$^{nd}$ to 62$^{nd}$ examples, when activated, the switchable waveplate comprises a Pancharatnam-Berry (PB) optical element (PBOE).

In a 64$^{th}$ example, the augmented reality system of any one of the 17$^{th}$ to 19$^{th}$ examples further comprises one or more polarization selective turning elements disposed between the waveguide assembly and a user, wherein the first waveplate lens is closer to the user than the second waveplate lens.

In a 65$^{th}$ example, in the augmented reality system of the 64$^{th}$ example, a first polarization selective turning element is disposed between the user and the first waveplate lens.

In a 66$^{th}$ example, in the augmented reality system of the 64$^{th}$ example or the 65$^{th}$ example, a second polarization selective turning element is disposed between the waveguide assembly and the second waveplate lens.

In a 67$^{th}$ example, in the augmented reality system of any one of the 64$^{th}$ to 66$^{th}$ examples, the one or more polarization selective turning elements include one or more of a polarization grating, a diffractive optical element, and/or a holographic optical element.

In a 68$^{th}$ example, the augmented reality system of any one of the 17$^{th}$ to 19$^{th}$ examples and the 64$^{th}$ to 67$^{th}$ examples comprises one or more polarization selective turning elements disposed between the waveguide assembly and the external scene, wherein the third waveplate lens is closer to the external scene than the fourth waveplate lens.

In a 69$^{th}$ example, the augmented reality system of any one of the 17$^{th}$ to 19$^{th}$ examples and the 64$^{th}$ to 68$^{th}$ examples further comprises a third polarization selective turning element disposed between the external scene and the third waveplate lens.

In a 70$^{th}$ example, the augmented reality system of any one of the 17$^{th}$ to 19$^{th}$ examples and the 64$^{th}$ to 69$^{th}$ examples further comprises a fourth polarization selective turning element disposed between the waveguide assembly and the fourth waveplate lens.

In a 71$^{st}$ example, in the augmented reality system of any one of the 17$^{th}$ to 19$^{th}$ examples and the 64$^{th}$ to 70$^{th}$ examples, the one or more polarization selective turning elements include one or more of a polarization grating, a diffractive optical element, and/or a holographic optical element.

ADDITIONAL CONSIDERATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. For example, referring to FIG. 15, it will be appreciated that one or more adaptive lens assemblies 1504-1 to 1504-3 may be disposed between individual ones of the waveguides 1012a, 1012b, and/or 1012c.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. An augmented reality system comprising:
   at least one waveguide that is configured to receive and redirect light toward a user, wherein the at least one waveguide is further configured to allow ambient light from an environment of the user to pass therethrough toward the user;
   a first adaptive lens assembly positioned between the at least one waveguide and the environment, wherein the first adaptive lens assembly is selectively switchable between:
      a state in which the first adaptive lens assembly is configured to impart a first optical power to light passing therethrough; and
      at least one other state in which the first adaptive lens assembly is configured to impart optical power different from the first optical power to light passing therethrough;
   a second adaptive lens assembly positioned such that the second adaptive lens assembly is between the at least one waveguide and the user upon wearing of the augmented reality system by the user, wherein the second adaptive lens assembly is selectively switchable between:
      a state in which the second adaptive lens assembly is configured to impart a second optical power different from the first optical power to light passing therethrough; and
      at least one other state in which the second adaptive lens assembly is configured to impart optical power different from the second optical power to light passing therethrough; and
   at least one processor operatively coupled to the first and second adaptive lens assemblies, wherein the at least one processor is configured to cause the first and second adaptive lens assemblies to synchronously switch between different states in a manner such that the first and second adaptive lens assemblies impart a substantially constant net optical power to ambient light from the environment passing therethrough.

2. The augmented reality system of claim 1, further comprising a micro-display, wherein the at least one waveguide is configured to receive and redirect light from the micro-display toward the user.

3. The augmented reality system of claim 1, wherein the first optical power and the second optical power are opposite in sign.

4. The augmented reality system of claim 3, wherein the first optical power and the second optical power are substantially equal in magnitude.

5. The augmented reality system of claim 1, wherein each of the first and second adaptive lens assemblies is configured to receive one or more control signals from the at least one processor as input and, in response thereto, switch from one state to another state within a period of time thereafter of less than 400 milliseconds.

6. The augmented reality system of claim 5, wherein the period of time within which each of the first and second adaptive lens assemblies is configured to switch from one state to another state is less than 200 milliseconds.

7. The augmented reality system of claim 6, wherein the period of time within which each of the first and second adaptive lens assemblies is configured to switch from one state to another state is less than 100 milliseconds.

8. The augmented reality system of claim 1, wherein the at least one waveguide comprises an output area through which the at least one waveguide is configured to redirect light toward the user and allow ambient light from the environment of the user to pass therethrough toward the user, the output area of the at least one waveguide being positioned between a portion of the first adaptive lens assembly within which a clear aperture of the first adaptive lens assembly is formed and a portion of the second adaptive lens assembly within which a clear aperture of the second adaptive lens assembly is formed.

9. The augmented reality system of claim 8, wherein each of the portions of the first and second adaptive lens assemblies within which clear apertures of the first and second adaptive lens assemblies are formed, respectively, is larger in size than the output area of the at least one waveguide.

10. The augmented reality system of claim 1, wherein each of the first and second adaptive lens assemblies includes at least one optical element that is single-pole switchable between two states.

11. The augmented reality system of claim 10, wherein the at least one optical element is single-pole switchable between:
    a first state in which the at least one optical element is configured to impart a first polarization state to light passing therethrough toward the user; and
    a second state in which the at least one optical element is configured to impart a second polarization state different from the first polarization state to light passing therethrough.

12. The augmented reality system of claim 11, wherein each of the first and second adaptive lens assemblies include at least one waveplate lens positioned such that the at least one waveplate lens is between the at least one optical element and the user upon wearing of the augmented reality system by the user,
    wherein the at least one waveplate lens is configured to impart one optical power to light of the first polarization state passing therethrough and another, different optical power to light of the second polarization state passing therethrough.

13. The augmented reality system of claim 10, wherein each of the first and second adaptive lens assemblies includes a quantity of optical elements that are single-pole switchable between two states, the quantity of optical elements included in each of the first and second adaptive lens assemblies being equal to a first value, and
    wherein each of the first and second adaptive lens assemblies is selectively switchable between states from among a quantity of different states, the quantity of different states being equal to a second value that exponentially depends upon the first value.

14. The augmented reality system of claim 13, wherein the second value is equal to an exponentiation of two with an exponent, the exponent being equal to the first value.

15. The augmented reality system of claim 13, wherein the at least one waveguide is configured to receive and redirect light representing virtual content toward the user, wherein the at least one processor is configured to cause the first and second adaptive lens assemblies to synchronously switch between different states from among the quantity of different states to adjust a distance away from the user at which virtual content represented by light passing therethrough is to be perceived by the user.

16. The augmented reality system of claim 15, wherein the distance away from the user at which virtual content represented by light passing therethrough to be perceived by the user is selectively switchable to any of a quantity of different distances, the quantity of different distances being equal to the second value.

* * * * *